United States Patent
Sepe, Jr.

(10) Patent No.: US 7,969,103 B2
(45) Date of Patent: Jun. 28, 2011

(54) BLOCK SWITCHING TRANSIENT MINIMIZATION FOR LINEAR MOTORS AND INDUCTIVE LOADS

(75) Inventor: Raymond B. Sepe, Jr., Medfield, MA (US)

(73) Assignee: Electro Standards Laboratories, Cranston, RI (US)

( * ) Notice: Subject to any disclaimer, the term of this patent is extended or adjusted under 35 U.S.C. 154(b) by 523 days.

(21) Appl. No.: 12/120,531

(22) Filed: May 14, 2008

(65) Prior Publication Data
US 2008/0284360 A1    Nov. 20, 2008

Related U.S. Application Data

(60) Provisional application No. 60/917,874, filed on May 14, 2007.

(51) Int. Cl.
    *H02P 25/06* (2006.01)
(52) U.S. Cl. .................................. 318/135; 318/687
(58) Field of Classification Search ............... 318/38, 318/135, 687; 310/12; 104/290
    See application file for complete search history.

(56) References Cited

U.S. PATENT DOCUMENTS

| | | | | |
|---|---|---|---|---|
| 4,876,966 A | * | 10/1989 | Okawa et al. | 104/290 |
| 5,118,055 A | * | 6/1992 | Veraart | 246/31 |
| 5,125,347 A | * | 6/1992 | Takahashi et al. | 104/298 |
| 5,136,217 A | * | 8/1992 | Hoffmann et al. | 318/135 |
| 5,237,252 A | * | 8/1993 | Tanaka et al. | 318/587 |
| 5,712,514 A | * | 1/1998 | Fischperer et al. | 307/69 |
| 7,245,093 B2 | * | 7/2007 | Engel et al. | 318/135 |

* cited by examiner

*Primary Examiner* — Bentsu Ro
(74) *Attorney, Agent, or Firm* — IP Authority, LLC; Ramraj Soundararajan

(57) ABSTRACT

A block switch controller for a linear motor is disclosed, the block switch controller having a motor current threshold profile controlling the switching of a plurality of block switches in a linear motor. Also, a block switch controller for a linear motor comprising a closed loop vector current controller that incorporates a delay state having a feedback gain is disclosed. Additionally, a method of switching a plurality of block switches that minimizes switching transients is provided. Finally, an article of manufacture containing computer code implementing a modeling and simulation program for modeling a linear motor system is provided.

19 Claims, 47 Drawing Sheets

BLOCK SWITCHING TRANSIENT MINIMIZATION FOR LINEAR MOTORS AND INDUCTIVE LOADS

RELATED APPLICATIONS

This application claims priority from U.S. Provisional Application 60/917,874 filed May 14, 2007.

BACKGROUND OF THE INVENTION

1. Field of Invention

The present invention relates generally to the field of linear motors. More specifically, the present invention is related to a block switch controller for a linear motor that minimizes block switching transients.

2. Discussion of Prior Art

There are many types of linear motor systems including synchronous linear motors, switched reluctance linear motors, permanent magnet linear motors, and linear induction motors (LIM). In each case, the linear motor can be visualized as a rotary motor that has been sliced axially and "unwrapped". A set of stator coils are energized and a force is generated that propels the moving shuttle across the stator windings but in a linear path rather than in a circular path. FIG. 1 shows a block diagram of a typical linear induction motor system 100 with a series of stationary stator coils called motor blocks 102 and a moving shuttle 104 which is analogous to the rotor of a rotary induction motor. The shuttle is often composed of a layer of aluminum and a layer of steel or conductive bars embedded in a steel back plate. The voltages are selectively applied to the stator coils by block switch triacs 106, also referred to herein as motor block switches with the two terms being used interchangeably, the applied voltages generating currents in the conductors and ultimately generate electromagnetic force that propels the shuttle along the track. Force is generated on the shuttle only by the stator blocks that are energized below the shuttle. The stator blocks are therefore energized directly beneath the shuttle and one block ahead of the shuttle so that the force is relatively constant as the shuttle traverses the track. The switching of applied voltage along sequential motor blocks is termed block switching. Some linear motor systems use a set of discrete sensors 110 such as optical or hall-effect sensors in order to determine the position of the shuttle relative to the motor blocks so that the proper motor blocks can be energized. Typically, there would be one or two of these sensors per motor block since only a crude measurement is required.

For vector current control and for precise motion control, a finer measure of position is generated from a device such a linear encoder 112. These might typically sense position down to a fraction of an electrical cycle. Encoder position feedback 130, stator current feedback 132, voltage feedback 134, and in some cases, coarse block sensor feedback 136 are available to control system 120. A typical control system consists of a processing element 122 such a computer or digital signal processor engine in combination with sensor conditioning and power electronics inverter 124 that provide voltages and currents suitable to operate the linear motor, including an operating voltage 140 to be supplied to the motor blocks, and block switching control signals 142 that control the activation and deactivation of the motor block switches 106. While not explicitly illustrated in FIG. 1, a block switch controller is a subcomponent of the control system which is known in the art and is responsible for determining when the block switches should be activated and deactivated.

Switching inductive motor blocks in and out of the circuit as the shuttle travels along the track creates transient conditions that can affect motor performance. Two main areas of concern are transient saturation of the core as the new coil is engaged and transient load imbalance. These effects can result in transient current surges that lead to component damage and transient forces that upset smooth operation. The resultant effects on the system can also be dependent upon the degree of interaction with the control algorithm being used and the operating point of the linear motor.

Prior work on linear motor systems does not address the practical issues of linear motor block switching. Many previous applications with linear motors are of limited length and limited power and therefore can energize all coil segments without too much of a power loss penalty. Others employ a single moving coil design with a long fixed reaction plate such that no block switching is needed. These prior art systems require long wires carrying power that are attached to the moving shuttle and eventually wear down due to mechanical stress. Neither of these architectures is suitable for use in a high power, high acceleration application, such as an electromagnetic aircraft launch system (EMALS) application.

Whatever the precise merits, features, and advantages of the above cited references, none of them achieves or fulfills the purposes of the present invention.

SUMMARY OF THE INVENTION

The present invention addresses minimization of the block switching transients by first analyzing the source of the problem, developing modeling and simulation methods, and developing innovative techniques that will greatly reduce the generation of undesirable transient behavior. Next, an innovative enhancement to the closed loop current controller is developed that compensates for remaining undesirable transients. Taken together, the novel techniques to model and simulate the problem, to design systems that reduce the frequency and severity of the transients, along with the closed loop techniques designed to further mitigate any remnant transients, constitute a novel system that minimizes block switching transients for linear motors. The focus application for this discussion will be a long linear induction motor suitable for electromagnetic aircraft launch systems (EMALS). However, the techniques apply to other types of linear motors such as permanent magnet and switched reluctance linear motors, and in fact can be applied to any system where inductive loads must be switched in and out of a system in real time. Other applications of particular interest include maglev transportation systems, linear aircraft arrest systems, long linear motors for materials handling, and rail guns.

The present invention, in a preferred embodiment, provides for a block switch controller for a linear motor, the linear motor comprising a plurality of motor blocks, a shuttle which is propelled by the magnetic forces generated by a motor current passing through the motor blocks, a plurality of motor block switches selectively passing the motor current through the motor blocks, and a plurality of position sensors determining the position of the shuttle relative to the motor blocks, wherein the controller comprises: (a) a memory storing a motor current threshold profile, the motor current threshold profile providing for variable current detection thresholds; (b) a communications interface enabling external communication; and (c) a processing core controlling the plurality of motor block switches, the processing core comparing a measurement of the motor current against the motor current threshold profile stored in memory to determine an effective zero crossing point of the motor current, and the processing core controlling the plurality of motor block switches based on the determined effective zero crossing point of the motor current and shuttle position information obtained from the position sensors.

Also, the present invention provides for a block switch controller for a linear motor, the linear motor comprising a plurality of motor blocks, a shuttle which is propelled by the magnetic forces generated by a motor current passing through the motor blocks, a plurality of motor block switches selectively passing the motor current through the motor blocks, and a plurality of position sensors determining the position of the shuttle relative to the motor blocks, wherein the controller comprises a closed loop vector controller that incorporates a delay state having a feedback gain.

Additionally, the present invention provides a method of controlling a plurality of motor block switches in a linear motor with a block switch controller, the linear motor comprising a plurality of motor blocks, a motor current, a shuttle which is propelled by the magnetic forces generated when the motor current is passed through the motor blocks, a plurality of motor block switches which selectively pass the motor current through the motor blocks, and a plurality of position sensors which determine the position of the shuttle relative to the motor blocks, wherein the method implemented in the block switch controller comprises the following steps: (a) receiving a measurement of the motor current and position data indicating the position of the shuttle; (b) retrieving a motor current threshold profile from memory, the motor current threshold profile providing for variable current detection thresholds; (c) comparing the received motor current measurement with the retrieved motor current threshold profile to determine an effective zero crossing point of the motor current; and (d) controlling the plurality of block switches based on the determined effective zero crossing point of the motor current and the received shuttle position data.

Finally, the present invention additionally provides for an article of manufacture comprising a computer usable medium having computer readable program code embodied therein which implements modeling of a system, the system comprising at least a linear motor and a block switching controller, the medium comprising: (a) computer readable program code generating a model of the system, the model having a plurality of sub-models, the plurality of sub-models comprising at least a sub-model of the linear motor and a sub-model of the block switching controller; (b) computer readable program code inserting at least one simulation artifact into the system model between two sub-models, the simulation artifact creating a virtual voltage state; and (c) computer readable program code simulating the operation of the system using the generated model.

DESCRIPTION OF THE PREFERRED EMBODIMENTS

Figure 1:
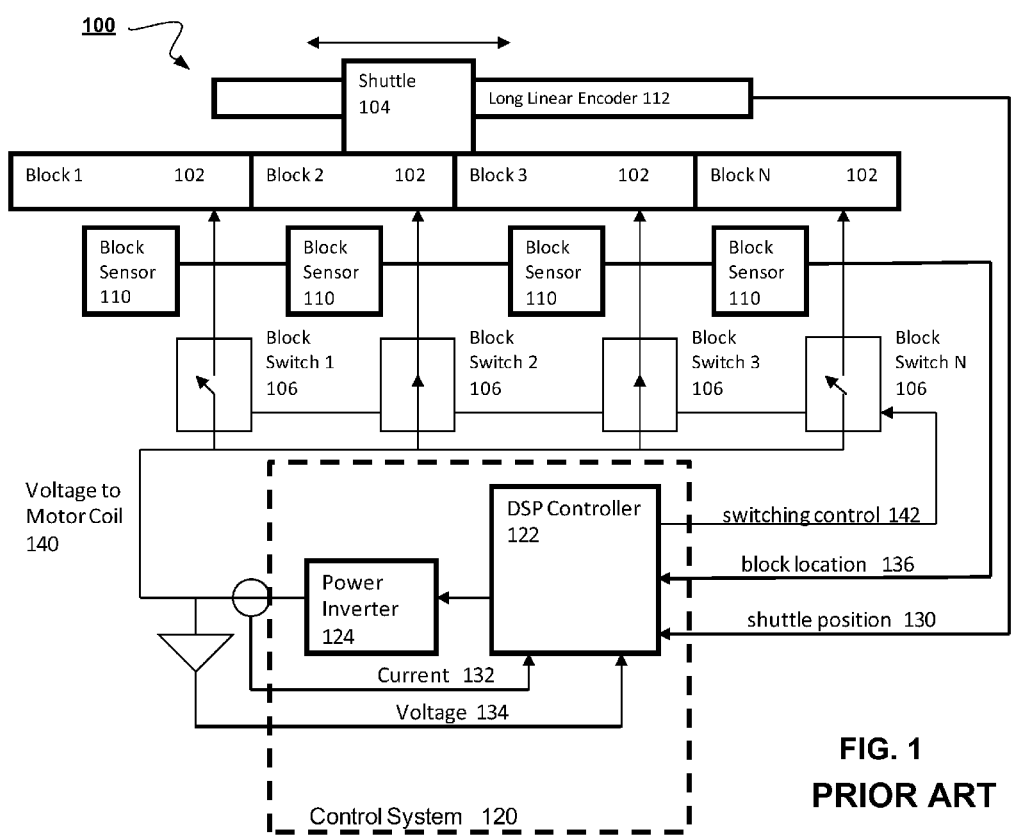
FIG. 1 illustrates the typical setup of a known linear motor system.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

1.0 Analysis of Block Switching Transients Problem

Referring to FIG. 1, as the shuttle moves along its stroke from block 2 to block 3, block switch 1 is turned off and block switch 3 is turned on, while block switch 2 remains on. The steady state result is that current flows in block 2 and block 3 and the motor's force is relatively constant. The transient in force due to a transient in the currents can occur as the current is commutated from block 1 to block 3. This effect is analyzed using a single phase of the linear motor represented by the simplified system shown in FIG. 2. The motor blocks are modeled by inductors L1 and L3, respectively, and equivalent series resistor R is included. Since we are focused on the switching of current from block 1 to block 3, block 2 is omitted for simplicity and two switches, SW 1 and SW 3, are triac switches that are used for block switching.

Figure 2:
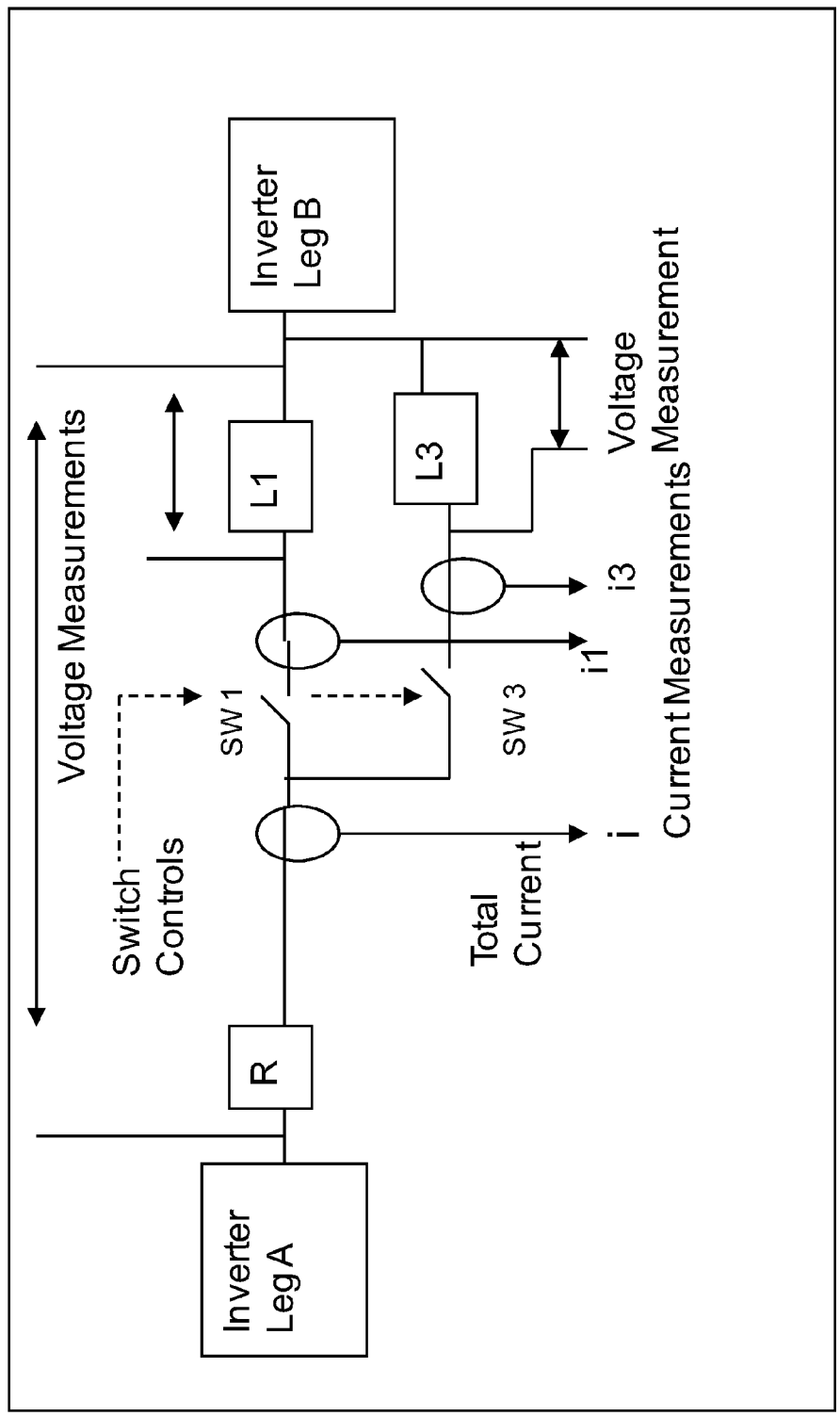
FIG. 2 illustrates a single phase block switching test setup.
Figure 3A:
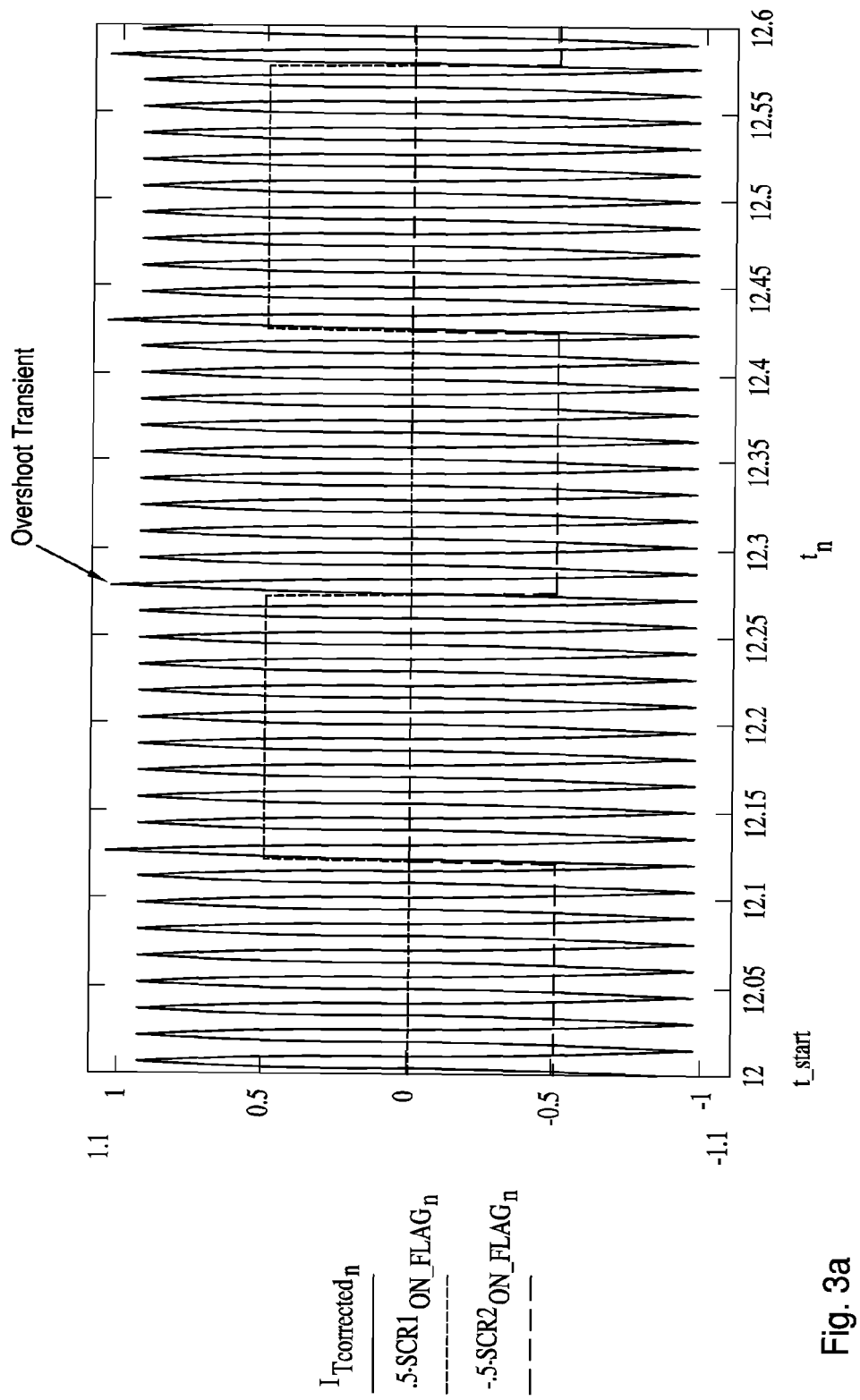
FIG. 3a is a graph of the total measured current commutated between the inductors in the block switching test setup of FIG. 2 when the block switch of the third motor block is activated at a 39 degree phase angle.
Figure 3B:
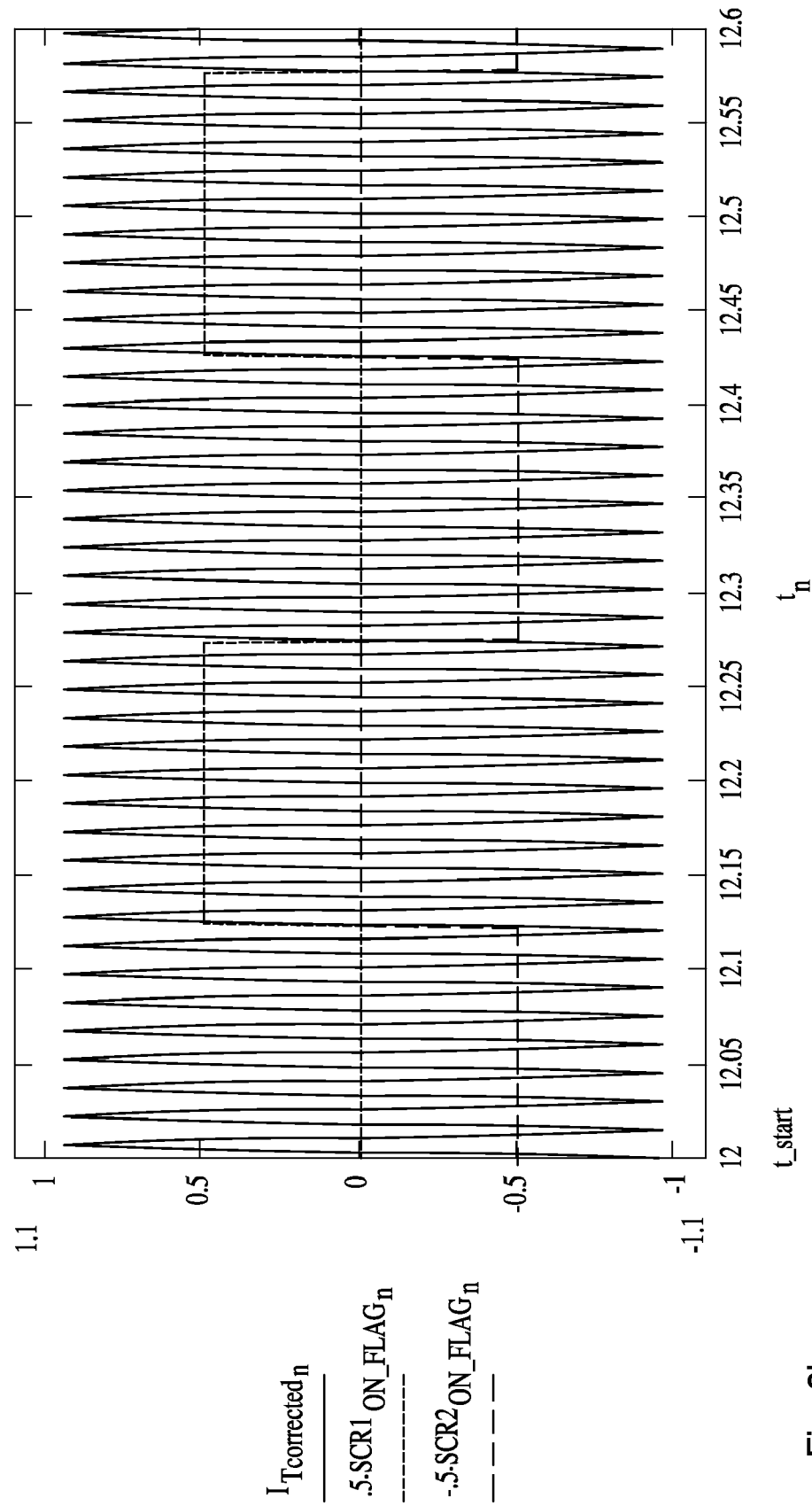
FIG. 3b is a graph of the total measured current commutated between the inductors in the block switching test setup of FIG. 2 when the block switch of the third motor block is activated at a 53 degree phase angle.
Figure 3C:
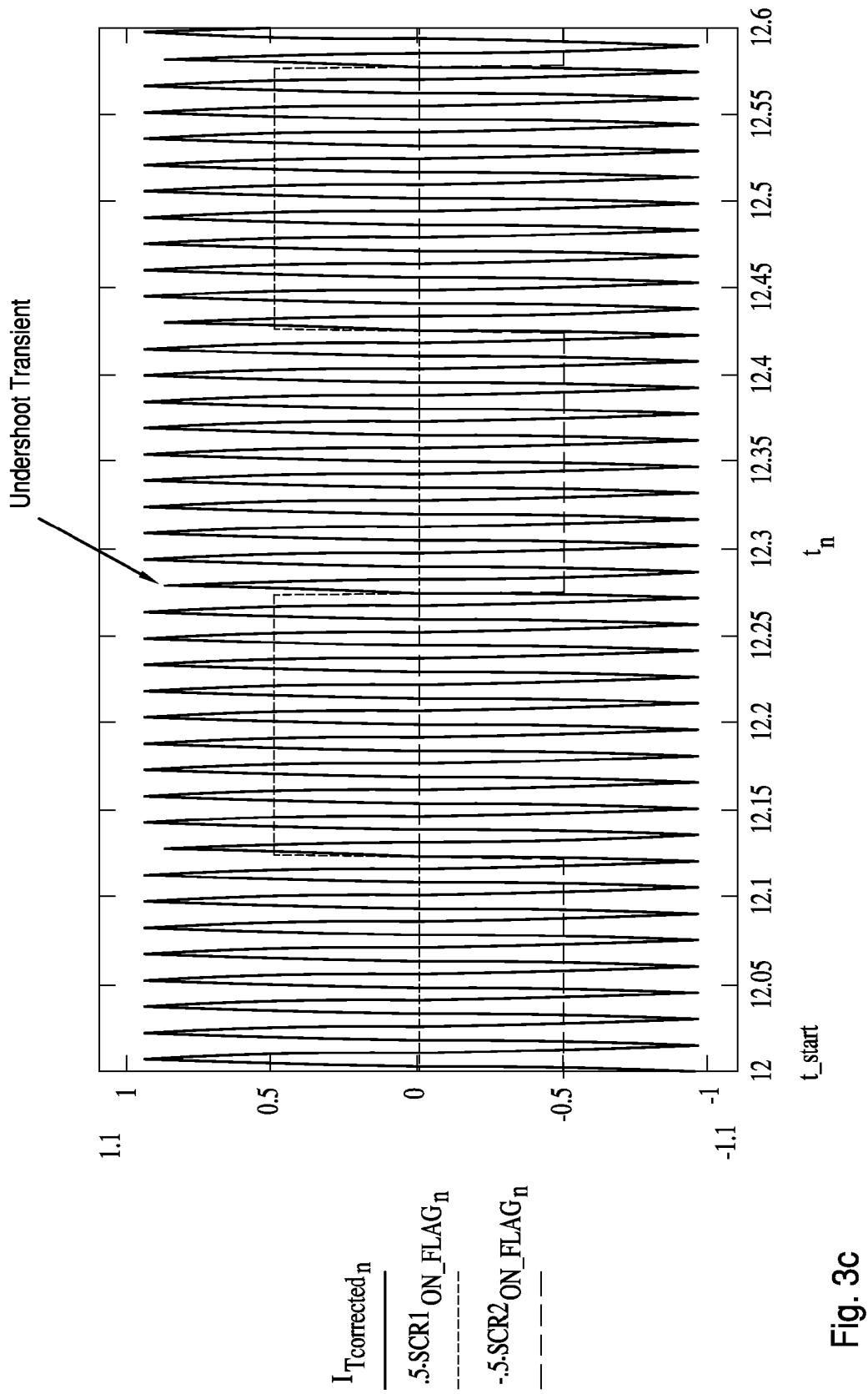
FIG. 3c is a graph of the total measured current commutated between the inductors in the block switching test setup of FIG. 2 when the block switch of the third motor block is activated at a 64 degree phase angle.

FIGS. 3a-3c plot the total current i, which is the sum of the currents i1 and i3, measured from the setup of FIG. 2 when the current is commutated from inductor L1 to inductor L3 at a series of fixed phase angles. The frequency of excitation is 66 Hz, L1=52.73 mH, L2=51.27 mH, and R=2.5 ohms. FIG. 3a shows the total current when the triac gate for SW 3 is commanded on at a 39-degree phase angle on the commanded voltage waveform. If the current commutation is ideal, there would be a perfect sine wave of constant amplitude. The superimposed square wave signals are the triac gate commands. The triac switches are activated when the magnitude of the gate command is 0.5. The switching instants occur on the rising and falling edges of the gate commands. Notice that there is a single positive half cycle transient in the current amplitude when the switching occurs. This transient will produce unwanted force "bumps" in the linear motor, and can stress the power electronics. FIG. 3b shows that there is no transient when the triac is activated at 53-degrees while FIG. 3c shows that there is a large undershoot (negative transient) at 64-degrees.

There is a large change in transient performance within about 15 degrees of the optimal switching point. In order to prevent the transient from occurring, the activation of the switch must be properly synchronized on the voltage waveform. The desired switching point on the voltage waveform depends upon the phase angle between the current and the voltage. This varies with load and excitation frequency. It also varies based upon circuit non-ideal switching behavior. If all the sources of delay can be adequately identified, then it would be possible to use the commanded voltage angle to activate the triac switching. However, regardless of the source of the phase angle variations, the point on the voltage waveform that corresponds to switching at the proper phase angle occurs when the current crosses zero. Therefore, the current crossing zero can be used to synchronize the activation and deactivation of the triac switches with the voltage waveform.

The challenge in synchronizing the block switching with the zero crossing of the currents is to detect that point accurately enough and to activate the block switch with minimal delay. In order to detect the zero crossing, a current magnitude threshold is established around zero, and the motor currents are compared to that threshold. It is important to realize that the rate of change of the current waveform is at its maximum around zero. This can be seen by calculating the derivative of the current. For a sinusoidal current, $$i = A\sin\theta \qquad (1)$$

$$\frac{di}{dt} = \frac{di}{d\theta}\frac{d\theta}{dt} = A\omega\cos\theta \qquad (2)$$

The zero cross point of (1) occurs at 0-degrees so that (2) becomes $$\left.\frac{di}{dt}\right|_{\theta=0} = A\omega \qquad (3)$$

At higher amplitudes and frequencies, the rate of change of current can be quite fast and therefore places requirements on the acceptable delay in order to detect the current "near" zero. For instance, with A=5 A, a frequency of 60 Hz, the current changes by 0.28A, or 5.7% of its amplitude within 152 microseconds, which corresponds to a 6.6 kHz sample rate if the implementation is done with a digital system. This corresponds to an angle of 3.3-degrees in (1).

1.1 Inductor Switching Analytical Results

The switching transient response that is observed when applying a sine wave of voltage to the LR circuit can be derived analytically. The behavior of the circuit is described by $$L\frac{di}{dt} = -Ri + v \quad (4)$$

where L is the inductance, R is the resistance, i is the current, and the applied voltage is v. The input voltage is $$v = V\sin(\omega t + \phi) \quad (5)$$

Assuming that the initial inductor current is zero, the complete solution to (4) with input (5) is $$i(t) = e^{-(\frac{R}{L})t}\left[\frac{-V}{\sqrt{R^2 + \omega^2 L^2}}\sin\left(\phi - \tan^{-1}\left(\frac{\omega L}{R}\right)\right)\right] + \frac{V}{\sqrt{R^2 + \omega^2 L^2}}\sin\left(\omega t + \phi - \tan^{-1}\left(\frac{\omega L}{R}\right)\right) \quad (6)$$

The first term in (6) is the transient response and the second term is the steady state response. Notice that the transient decays at the L/R time constant. The impedance of the circuit described by (4) is $$Z = R + j\omega L \quad (7)$$

so that $$|Z| = \sqrt{R^2 + \omega^2 L^2} \quad (8)$$

$$\angle Z = \tan^{-1}\left(\frac{\omega L}{R}\right) \quad (9)$$

are the magnitude and angle of the impedance, respectively. From (9) and (6), it can be seen that setting the phase $\phi = \angle Z$ results in the elimination of the transient response. This agrees with the experimental results that show no current overshoot occurs if the AC voltage is applied when the phase of the voltage corresponds to the phase angle between the voltage and the current.

Figure 4A:
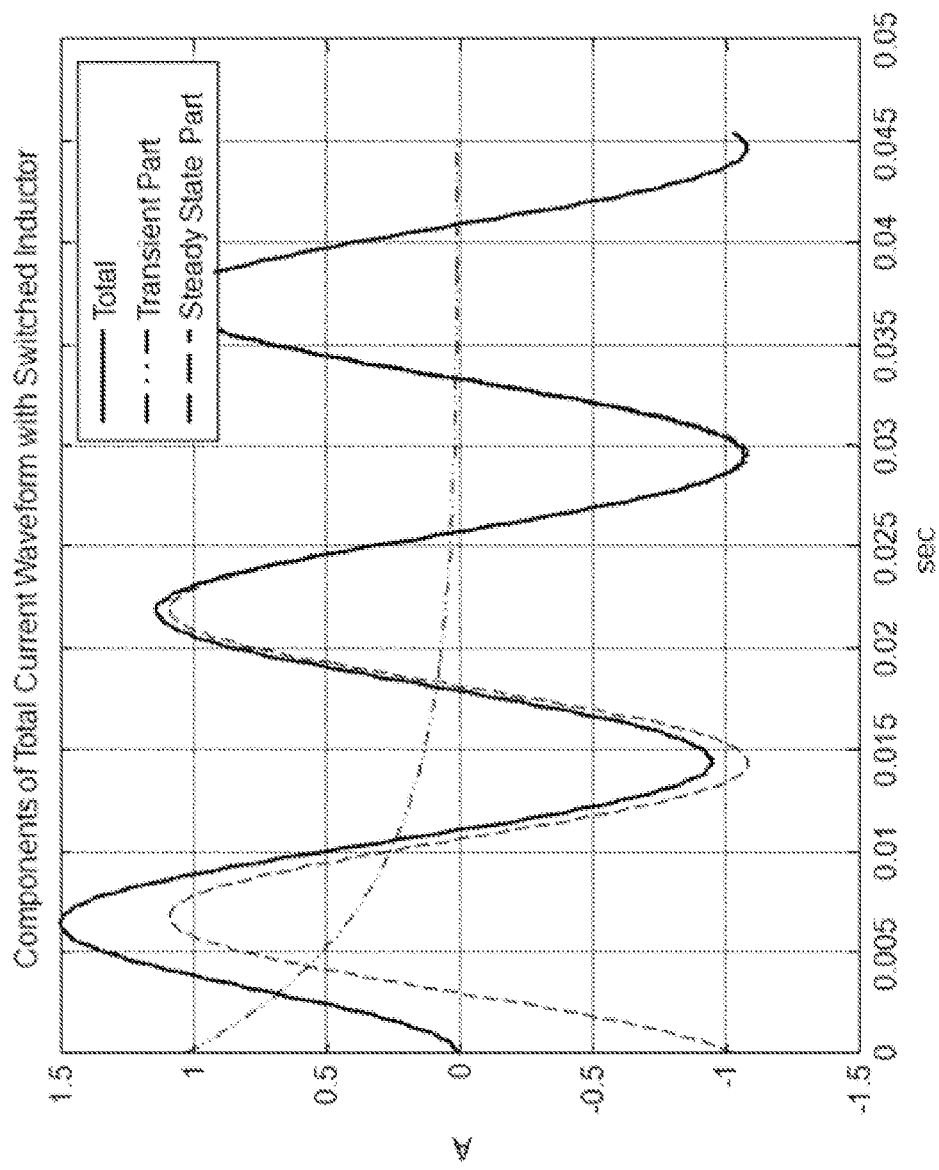
FIG. 4a illustrates total current response with transient and steady state components for AC applied voltage at $\phi=0$ degrees and with LR circuit $\angle Z=71.5$ degrees.

FIG. 4a shows the results of implementing (6) in a simulation with f=66 Hz, L=52.56 mH, and R=7.3 ohms. The AC voltage is applied at an angle of $\phi$=0 degrees, yet the $\angle Z$=71.5 degrees. The contribution of the decaying transient component and the sinusoidal steady state component are clearly shown. The initial overshoot occurs as these two components are summed together to give the total response. This gives an overshoot transient that agrees with the measured response shown in FIG. 3a.

Figure 4B:
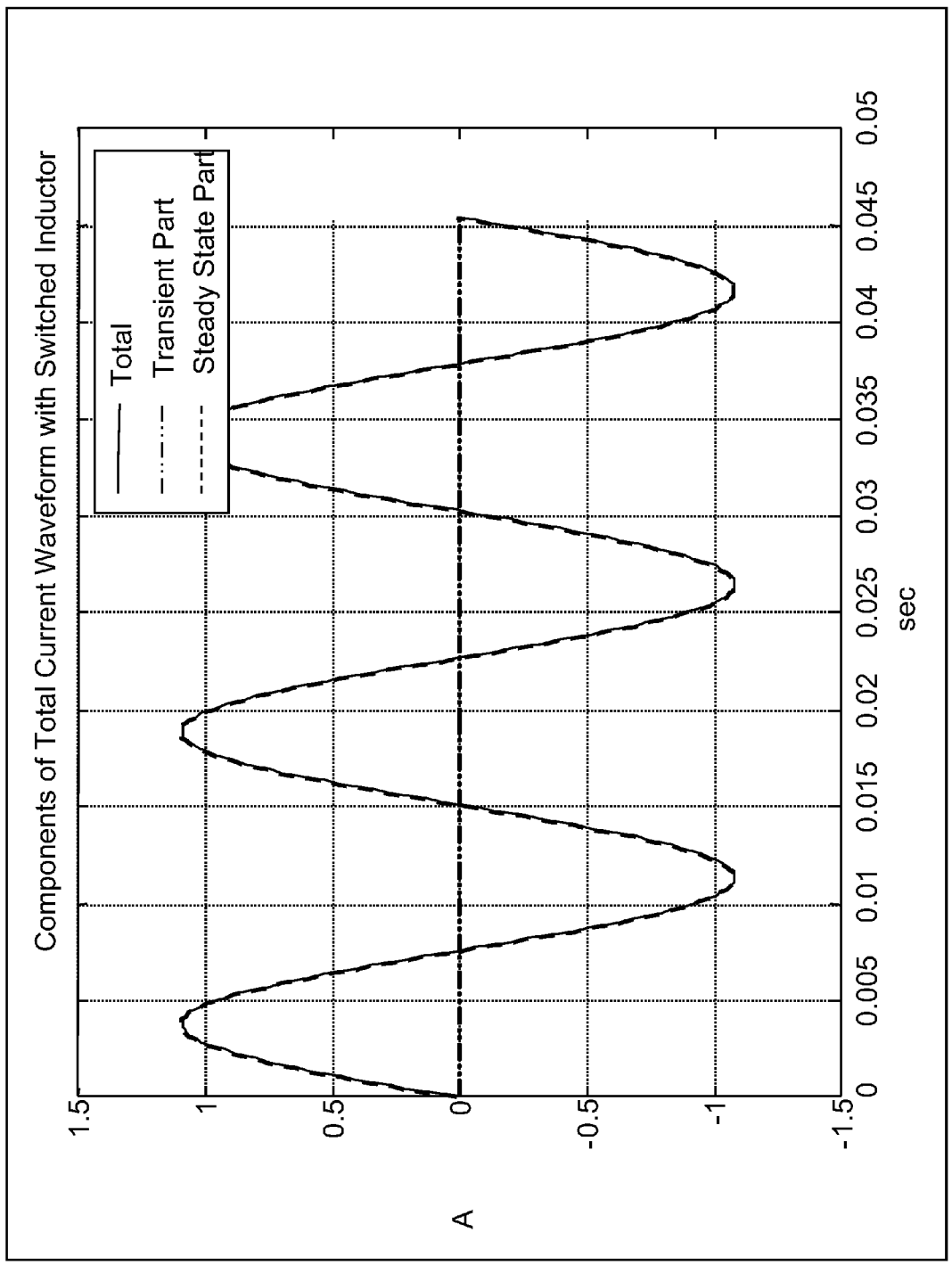
FIG. 4b illustrates total current response with transient and steady state components for AC applied voltage at $\phi=71.5$ degrees and with LR circuit $\angle Z=71.5$ degrees.

FIG. 4b shows the response of (6) when the AC voltage is applied at an angle of $\phi$=71.5 degrees, with the $\angle Z$=71.5 degrees. This corresponds to using the zero current cross to synchronize the switching. The transient is completely eliminated and the current waveform immediately goes into its steady state response.

Figure 4C:
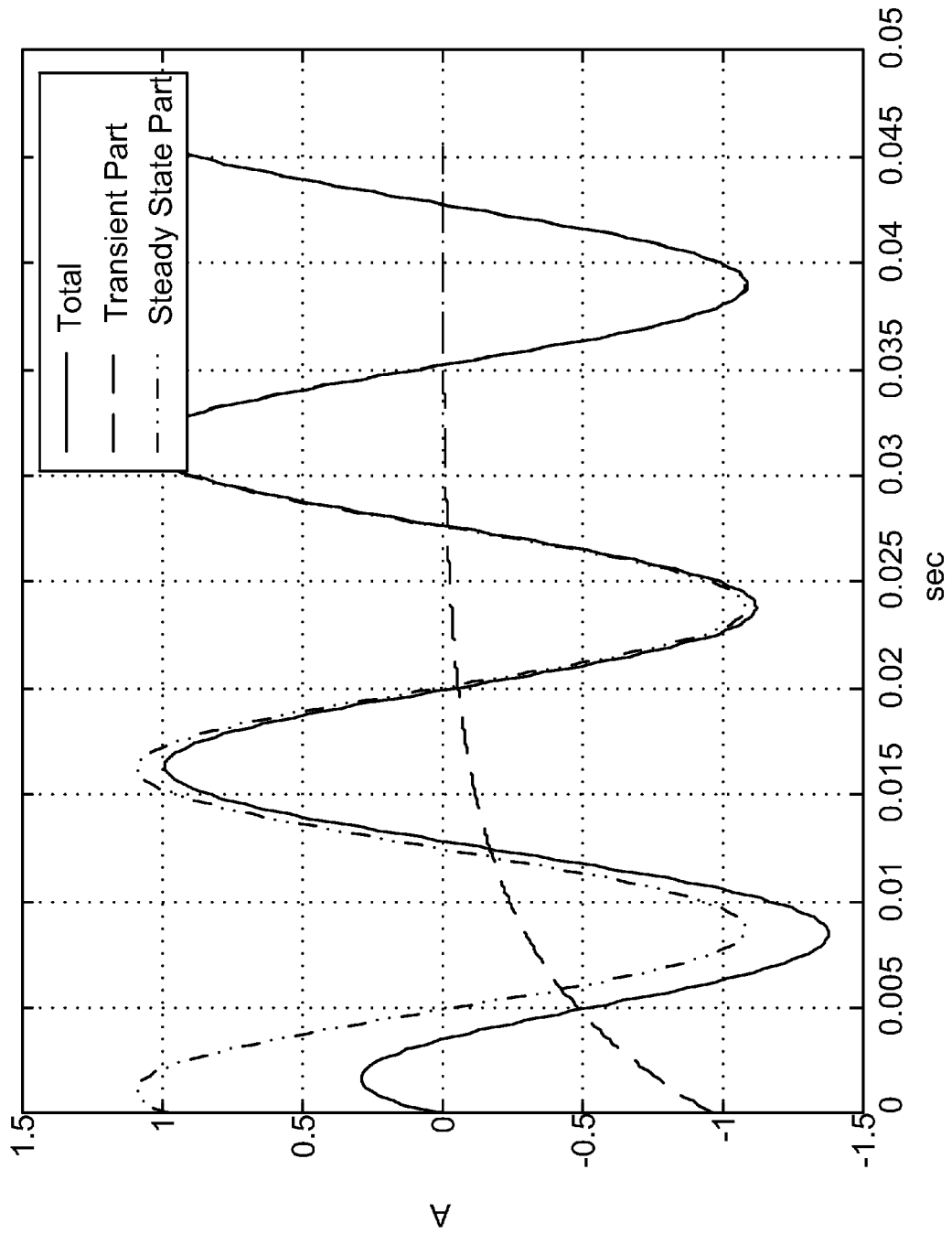
FIG. 4c illustrates total current response with transient and steady state components for AC applied voltage at $\phi=135$ degrees and with LR circuit $\angle Z=71.5$ degrees.

FIG. 4c shows the response of (6) when the AC voltage is applied at an angle of $\phi$=135 degrees, with the $\angle Z$=71.5 degrees. The transient starts negative resulting in an initial undershoot for the first positive half cycle of the current. This agrees with the measured response shown in FIG. 3c.

For very low excitation frequencies relative to the L/R time constant, the transient component will become insignificant well before the peak of the sine wave and therefore will not have as much effect. For very high excitation frequencies relative to the L/R time constant, the effect of the transient may encompass many cycles of the steady state response.

Further insight can be gained from (6). Define the angle $\Phi$ as $$\Phi = \phi - \tan^{-1}\left(\frac{\omega L}{R}\right) \quad (10)$$

The angle $\Phi$ is the angle of the voltage at the zero crossing point of the current waveform. That is, $\Phi$ is zero when the phase of the applied AC voltage is equal to $\angle Z$ and this occurs when the current waveform is crossing zero. When $\Phi$ is zero, there is no current transient. $\Phi$ is positive if the AC voltage is applied after the zero crossing point of the current waveform. This results in a current undershoot as shown in FIG. 4c. $\Phi$ is negative if the AC voltage is applied before the zero crossing point of the current waveform. This results in a current overshoot as shown in FIG. 4a.

Based on (8), the magnitude of the steady state current can be defined as I such that $$I = \frac{V}{|Z|} \quad (11)$$

so that (6) becomes $$i(t) = e^{-(\frac{R}{L})t}[-I\sin\Phi] + I\sin(\omega t + \Phi) \quad (12)$$

The simplifying assumption that the first half cycle peak of i(t) occurs when the sinusoid in the second term of (12) is at its maximum is reasonable for frequencies w that are not very low and $\Phi$ that are not very large. Over most frequencies of interest, then, the time at which the first half cycle peak occurs is $$t_{pk} \approx \left(\frac{1}{\omega}\right)\left(\frac{\pi}{2} - \Phi\right) \quad (13)$$

Substituting (13) into (12) gives the peak current overshoot over a mid range of frequencies and $\Phi$ as $$I_{PK} \approx i(t_{pk}) = e^{-(\frac{R}{L})t_{pk}}[-I\sin\Phi] + I \quad (14)$$

Define the percent first peak overshoot as $$P_I = \frac{I_{PK} - I}{I} \times 100 \quad (15)$$

Substituting (14) into (15) gives $$P_I = -e^{(\frac{-R}{L})t_{pk}}\sin\Phi \qquad (16)$$

Figure 5:
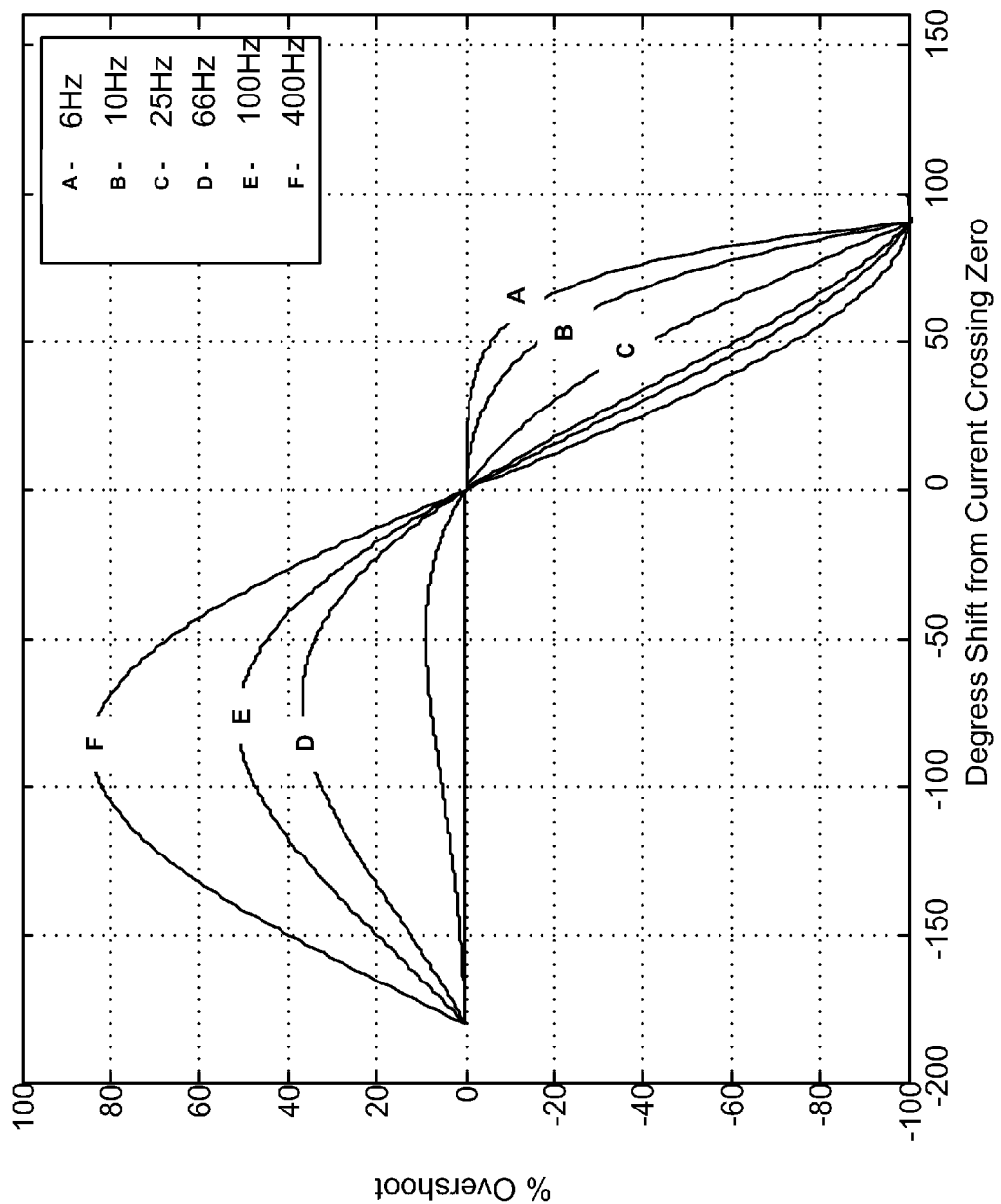
FIG. 5 is a graph of $P_f$ versus $\Phi$ for a range of frequencies and with L=52.56 mH, and R=7.3 ohms.

For a given L-R load, the percent peak overshoot depends upon when the AC voltage is applied to the inductor relative to the zero current cross point. A family of curves can be mapped out that plots the peak overshoot as a function of $\Phi$ for each excitation frequency $\omega$. FIG. 5 plots $P_I$ versus $\Phi$ for a range of frequencies and with L=52.56 mH, and R=7.3 ohms. With this L-R load, the natural frequency or pole of the circuit is at 22 Hz. As the excitation frequency exceeds 22 Hz, the peak overshoot gets very large and perhaps most importantly the slope of the curves is large near $\Phi$=0. This means that small deviations from activating the block switch at the current's zero crossing point results in large peak current transients.

2.0 Design Rules for Block Switch Controller

The experimental and analytical results from Sections 1.0-1.1 can be used to develop a set of design curves that will flow down the theoretical results to hardware requirements for a block switch controller. Given that the acceptable transient current overshoot is specified, requirements on the resolution and sample rate (acceptable delay if the implementation is analog) of the hardware can be determined. These can be used as a guide in selecting processing architecture and components. In long linear motor applications such as EMALS, the block switch controller function is likely to be distributed along the length of the track. There will be no transient generated during the block switching if the new block is switched in at precisely the zero current crossing point of that phase. Of course this also implies that the deactivating block is switched out at this time as well.

Figure 6:
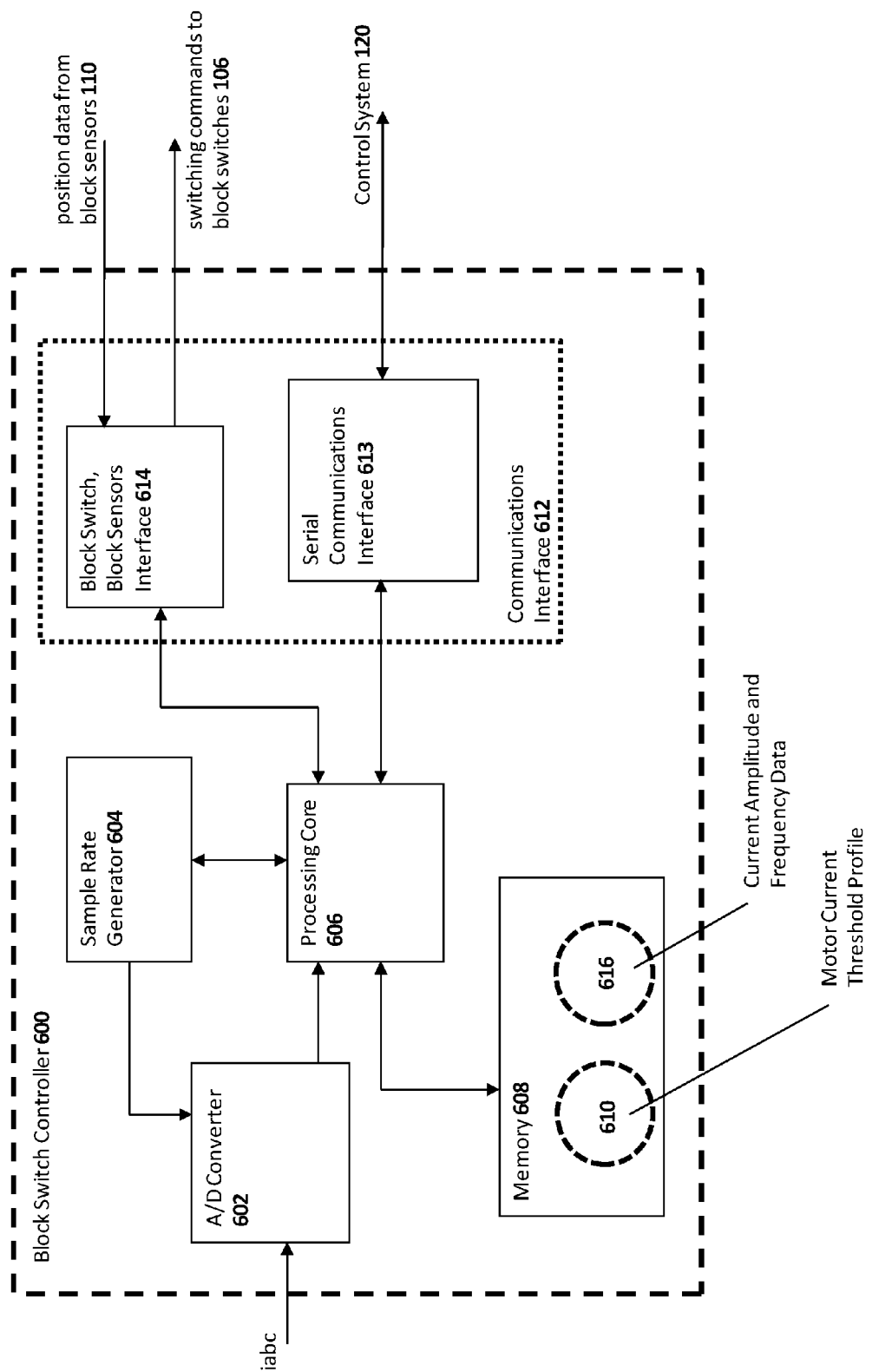
FIG. 6 illustrates a digital implementation of a preferred embodiment of the block switch controller of the present invention.

Each phase of the linear motor will be sensed and switched individually since a balanced three phase system has currents that pass through zero at 120-degrees relative to each other, and therefore at different times. FIG. 6 shows a block diagram of digital implementation of a preferred embodiment of the block switch controller architecture of the present invention. While a digital implementation of block switch controller is shown, an analog embodiment using analog processing for the threshold comparison and switching functions is also possible, but it would involve the use of analog comparators and gating logic that would be less flexible than the digital architecture. Whether implemented with analog or digital circuitry, the same concepts apply.

For the digital architecture of block switch controller 600 in FIG. 6, A/D converter 602 samples the motor currents at a rate determined from Sample Rate Generator 604. Processing Core 606 compares the motor current measurements to a set of thresholds from the motor current threshold profile 610, stored in memory 608, to determine the point where the amplitude of the motor current crosses zero, hereafter referred to as the effective current zero crossing point, or simply the current zero crossing point. Processing core 606 uses the determined effective current zero crossing point and shuttle position data in controlling the activation and deactivation of the motor block switches. Communications interface 612 provides an interface for communications between the processing core and other components of the linear motor system. In the embodiment shown in FIG. 6, the communication interface comprises serial communications interface 613 enabling communications between processing core 606 of the block switch controller and the control system (120 in FIG. 1), and a block switch, block sensors interface 614 enabling processing core 606 to receive shuttle position data from the block sensors (110 in FIG. 1) and to send switching command signals to the block switches (106 in FIG. 1).

While communications interface 612 in the embodiment shown in FIG. 6 comprises serial communications interface 613 and separate block switch, block sensors interface 614, one of skill in the art can easily identify other arrangements that would provide the required functionality. For example, the communications interface may only comprise serial communications interface 613 wherein position data from the block sensors would be received by and the control system and passed to the block switch controller, and the switching commands would be sent through the control system to the block switches. Additionally, instead of a serial communications interface, a parallel interface could be implemented between the processing core of the block switch controller and the control system. Other arrangements for the communications interface can be envisioned by one skilled in the art, and these arrangements should be considered to fall within the scope and spirit of the present invention, and as such, the present invention should not be considered to be limited to any particular arrangement of the communications interface.

Figure 7:
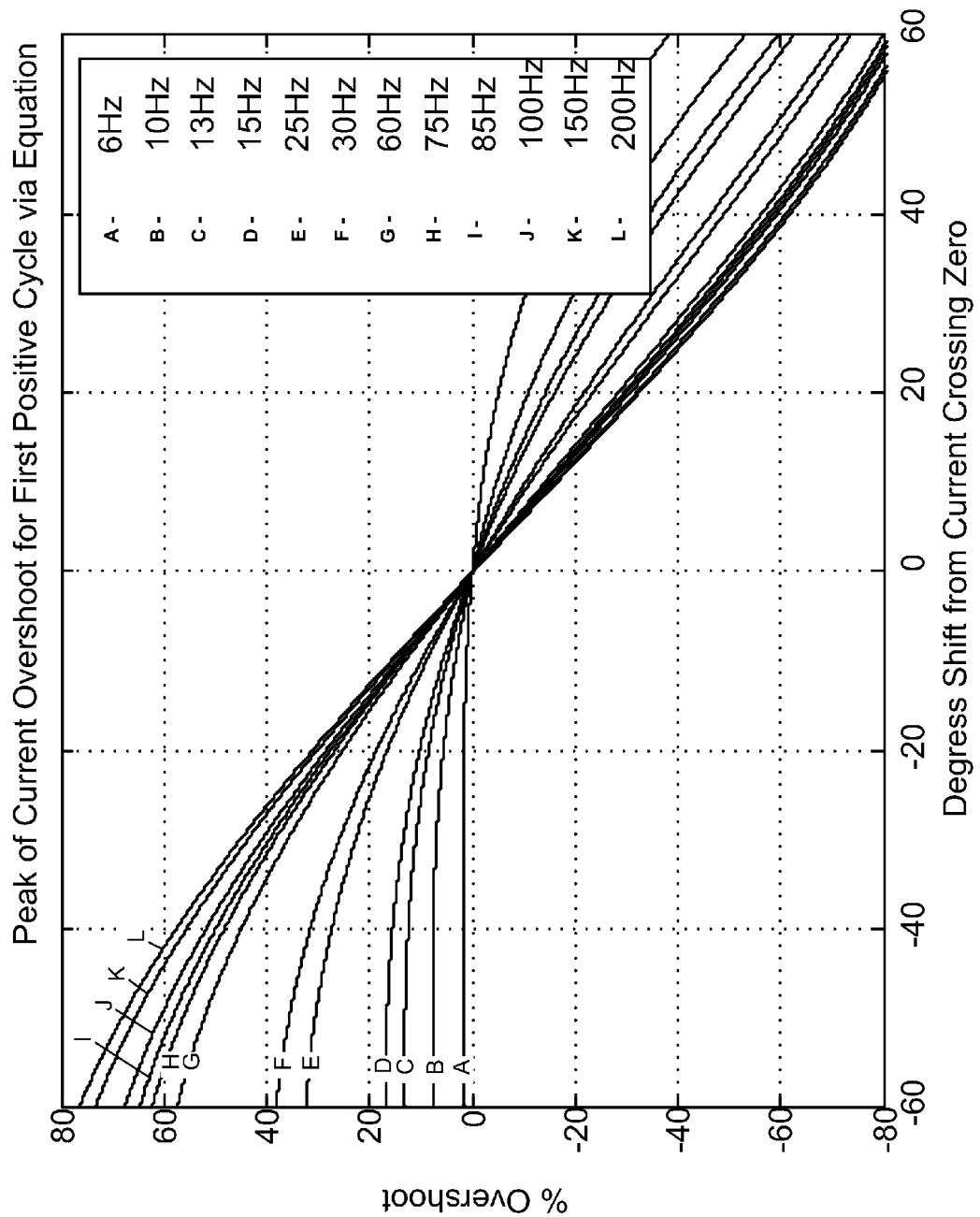
FIG. 7 is a graph of peak percent overshoot, $P_f$, as a function of angular deviation from current zero cross point $\Phi$.

FIG. 5 showed the peak percent overshoot of the current waveform, $P_I$, versus angle deviation from the zero current cross point, $\Phi$. A family of curves is plotted for a range of excitation frequencies from 6 Hz to 400 Hz. FIG. 7 is an expansion of FIG. 5 around an angular deviation of +/−60-degrees and with a higher resolution of excitation frequencies.

During an aircraft launch in an EMALS system, the excitation voltages and resulting currents to the linear motor are a linear ramp up in frequency and amplitude over time. In order to keep transient overshoot $P_I$ less than a specified value during a launch, the angle deviation $\Phi$ that is acceptable varies with excitation frequency. With reference to FIG. 7, this is equivalent to choosing a maximum peak overshoot along the vertical axis and drawing a horizontal line, then forming a locus of intersecting points across the family of excitation frequency curves. Repeating this process for a set of different maximum overshoot values gives the family of curves shown in FIG. 8.

Figure 8:
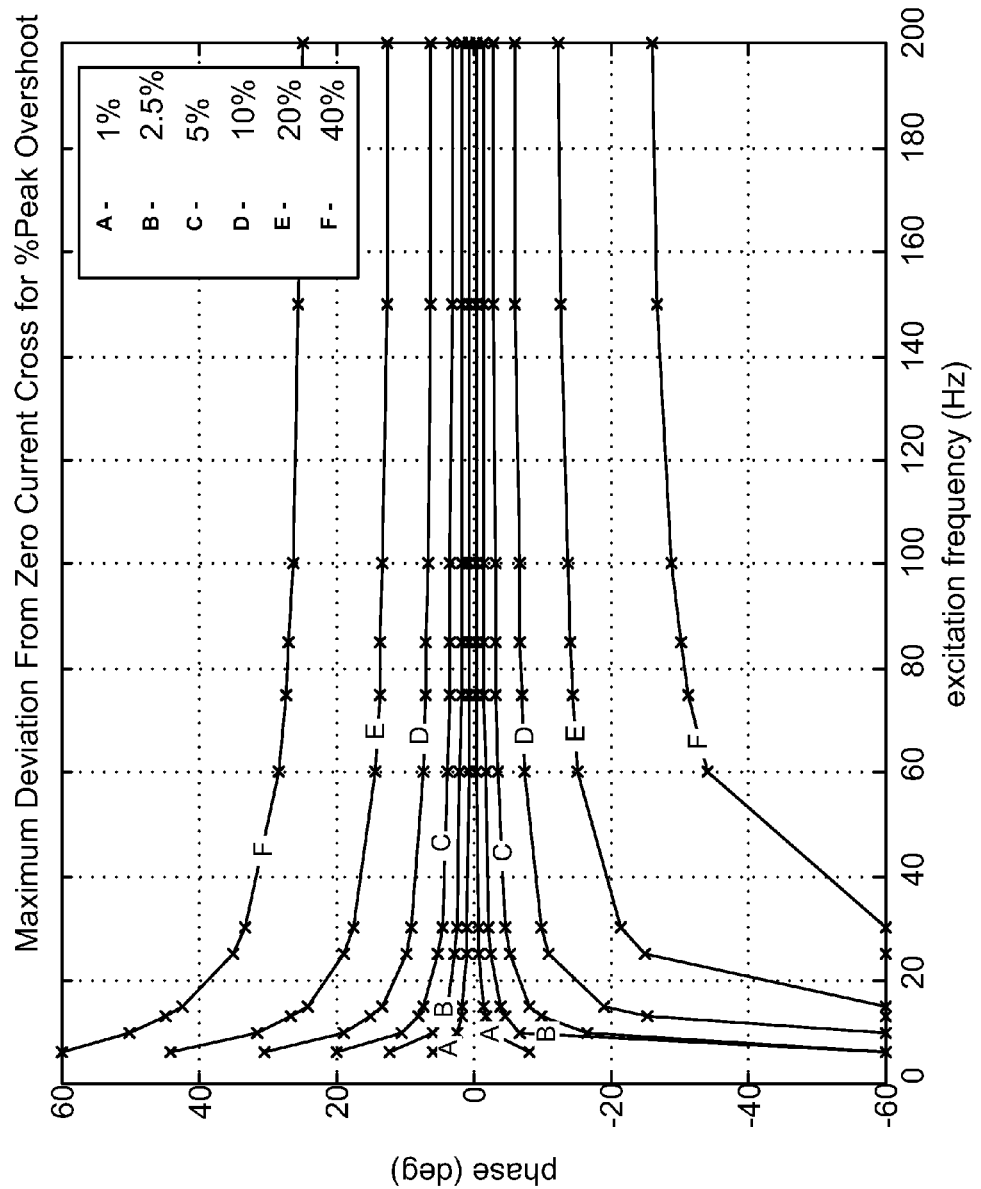
FIG. 8 is a graph showing the maximum deviation from zero current cross for a given maximum percent overshoot as a function of excitation frequency.
Figure 9:
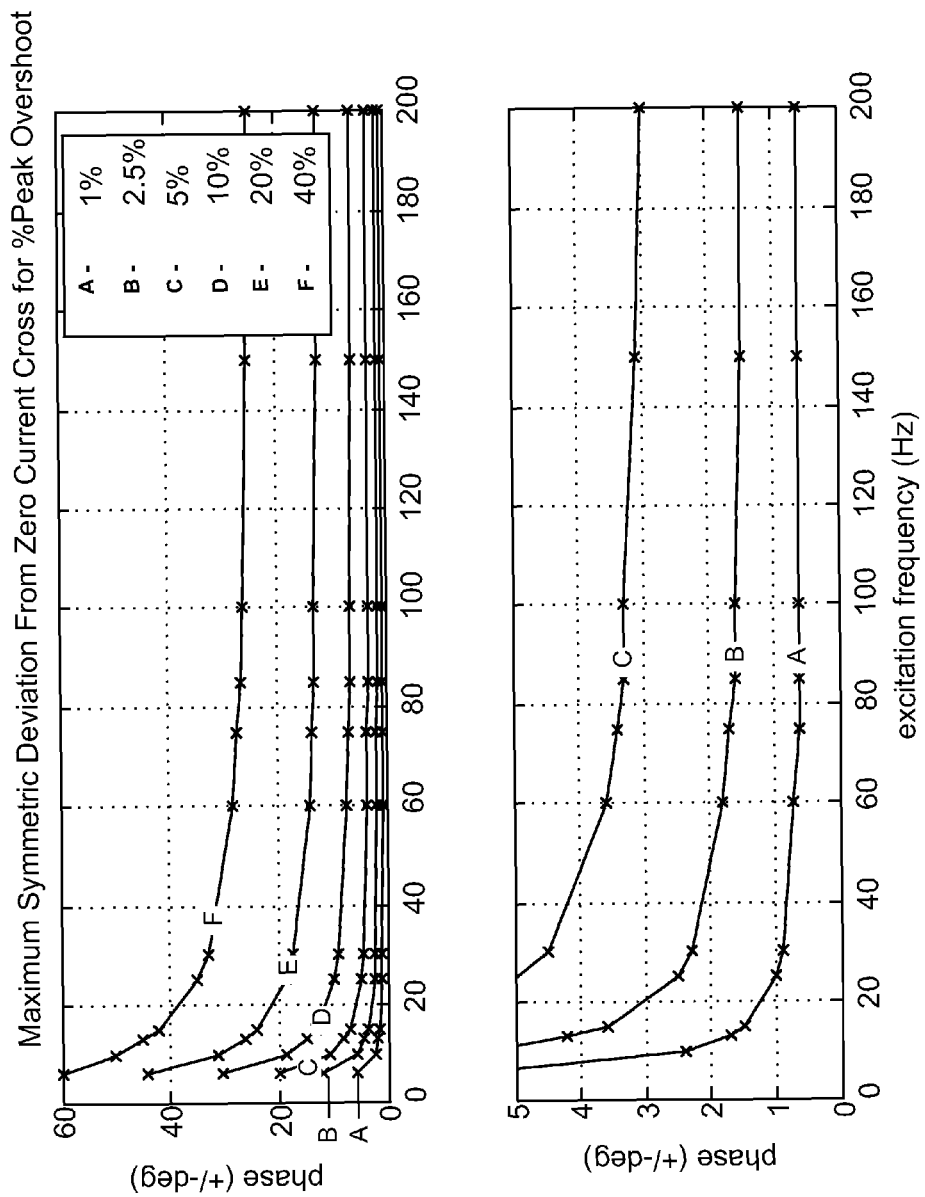
FIG. 9 is a graph showing the symmetric deviation around zero for maximum peak overshoots.

FIG. 8 shows a collapsing band around zero degrees deviation as the excitation frequency is increased. For example, if a maximum current deviation is 40%, then the outermost lines above and below zero form a band around zero in which the maximum angular deviation is about +/−25-degrees at 200 Hz. Some simplification is gained by forming a symmetric band around zero for a given percent overshoot. The symmetric band is generated for each percent overshoot by comparing the corresponding positive and negative value curves and using the most conservative value. This results in the plots shown in FIG. 9. For a maximum peak current overshoot of 2.5% at 60 Hz current, the maximum angular deviation from the zero cross of the current waveform is about +/−1.9-degrees.

In order to stay within a given angular deviation, the current is digitized and compared to a threshold value. For a given angle, the corresponding current is given by (1). The current threshold normalized by the current amplitude and based on the angular deviation $\Phi$ is $$I_T = \frac{I}{A} = \sin\Phi \qquad (17)$$

Figure 10:
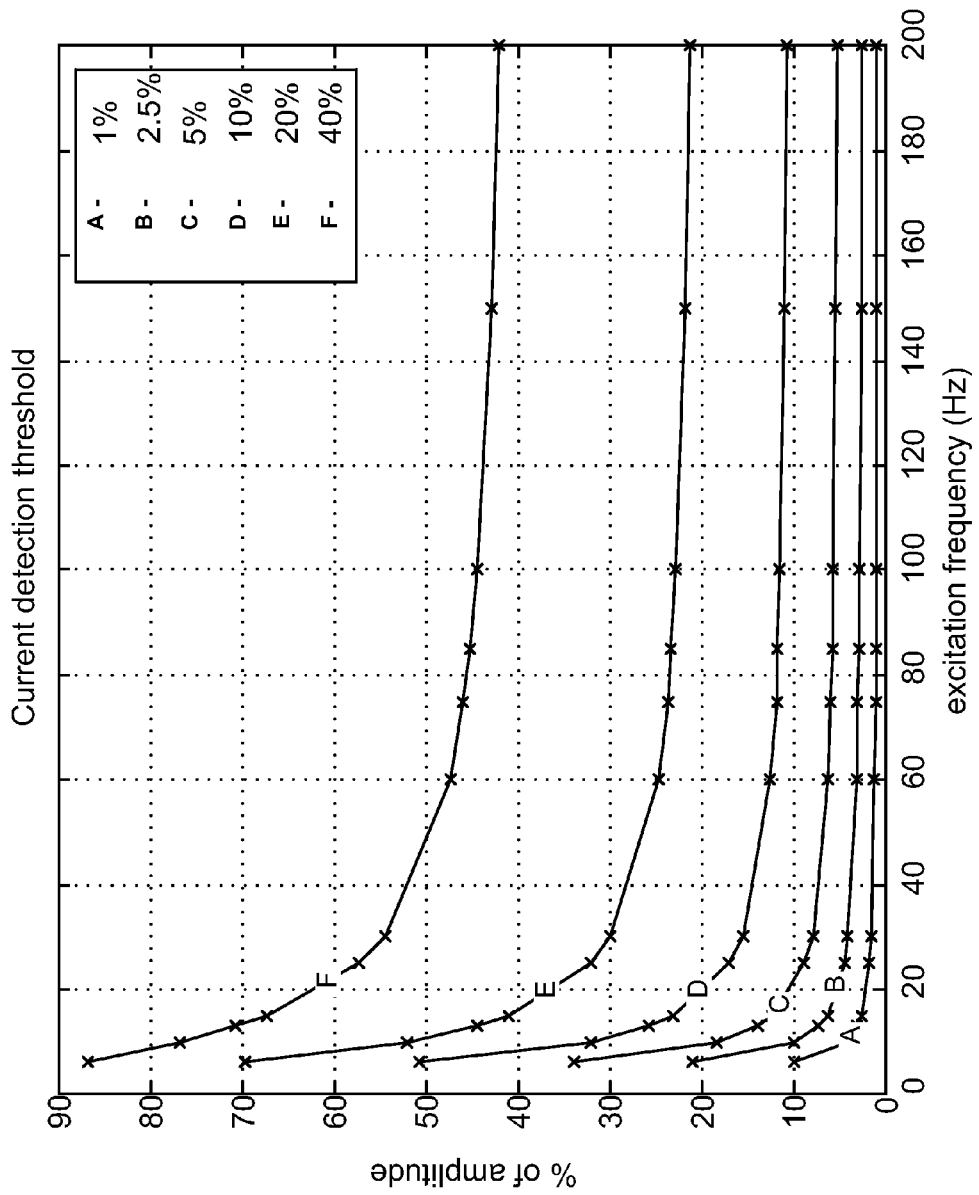
FIG. 10 is a graph showing the current detection thresholds that need to be detected in order to keep the peak current overshoot below a given percentage.

The current detection thresholds for a given percent current overshoot are shown in FIG. 10. This family of curves allows a selection of peak overshoot and, knowing the current amplitude that can be expected over a launch, it allows calculation of the A/D converter resolution needed for current threshold detection. As the current amplitude and frequency ramp up during a launch, the percent current threshold goes down, requiring finer resolution at higher frequencies. The non-normalized (absolute) value of the current thresholds needed by processing core 606 in FIG. 6 to compare to the sensed currents is also changing because the current amplitude is rising during a launch. Therefore, the motor current threshold profile 610 used by the processing core should provide detection thresholds that vary in accordance with the changing excitation frequency and amplitude of the motor current. For this to be accomplished, current amplitude and frequency data 616, shown as being stored in memory 608 in FIG. 6, is provided to the processing core of block switch controller 600 by the control system. The current amplitude and frequency data may be provided prior to a launch and stored in memory along with a synchronized launch time, or alternatively, the current amplitude and frequency data may be provided in real-time by the control system during a launch. In this embodiment, processing core 606 generates motor current threshold profile 610 using the provided current amplitude and frequency data 606 and a specified peak overshoot. In an alternative embodiment, the motor current threshold profile 610 could be generated elsewhere and be pre-stored in memory 608 for use by processing core 606 during a launch. If design limitations do not allow the use of a variable profile, then it may be possible to use the most conservative threshold over the entire launch. However, noise on the currents near the zero crossing points must be considered, and at high excitation frequencies, using the most conservative current value may result in the need for very high speed threshold detection and switch activation. An intermediate approach might be to subdivide the continuous profile into discrete changes in threshold.

Having established the motor current threshold profile that must be used to keep the peak current overshoot within the desired bound, it is necessary to determine the sample rate needed by the controller to ensure that it can adequately locate the current threshold. The detection point is near zero, where the currents are changing at their maximum rate as shown by (3). The time needed for the current to change a given amount can be determined by rearranging (3) as $$\Delta T = \frac{\Delta I}{A\omega} \quad (18)$$

Since the detection is around zero current, $\Delta I$ is the non-normalized current threshold from (17) so that (18) becomes $$\Delta T = \frac{\sin\Phi}{\omega} \quad (19)$$

Figure 11:
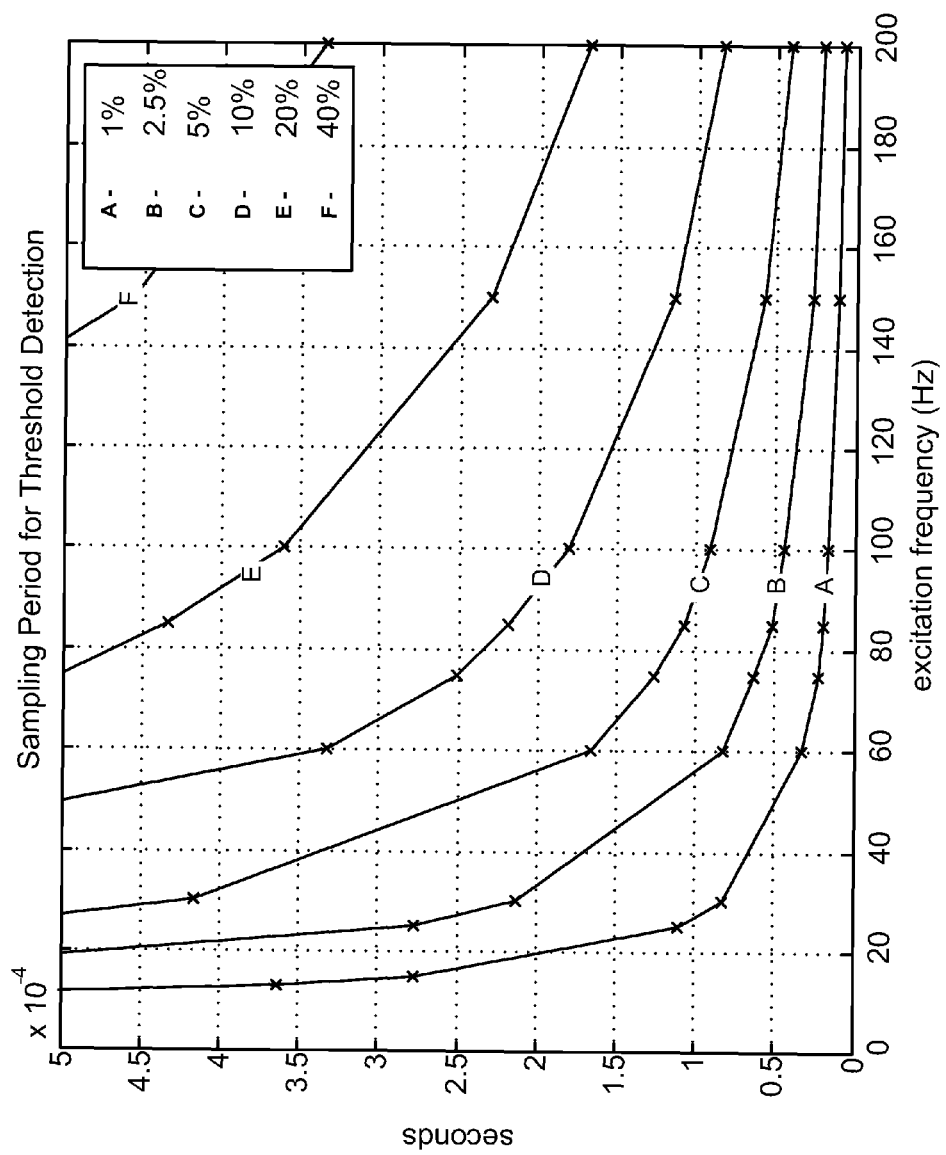
FIG. 11 is a graph showing the sampling period needed to ensure given percent current overshoot as a function of excitation frequency.

The maximum sampling period for the A/D converter to ensure that the current threshold (17) can be detected is given by (19). FIG. 11 plots a family of curves for a given tolerance on the current overshoot. As the frequency of the currents is increased, the required sampling period, or the delay in an analog implementation, decreases (sampling frequency increases). Similarly, lower percentage current overshoot will require a faster sampling frequency.

Figure 12:
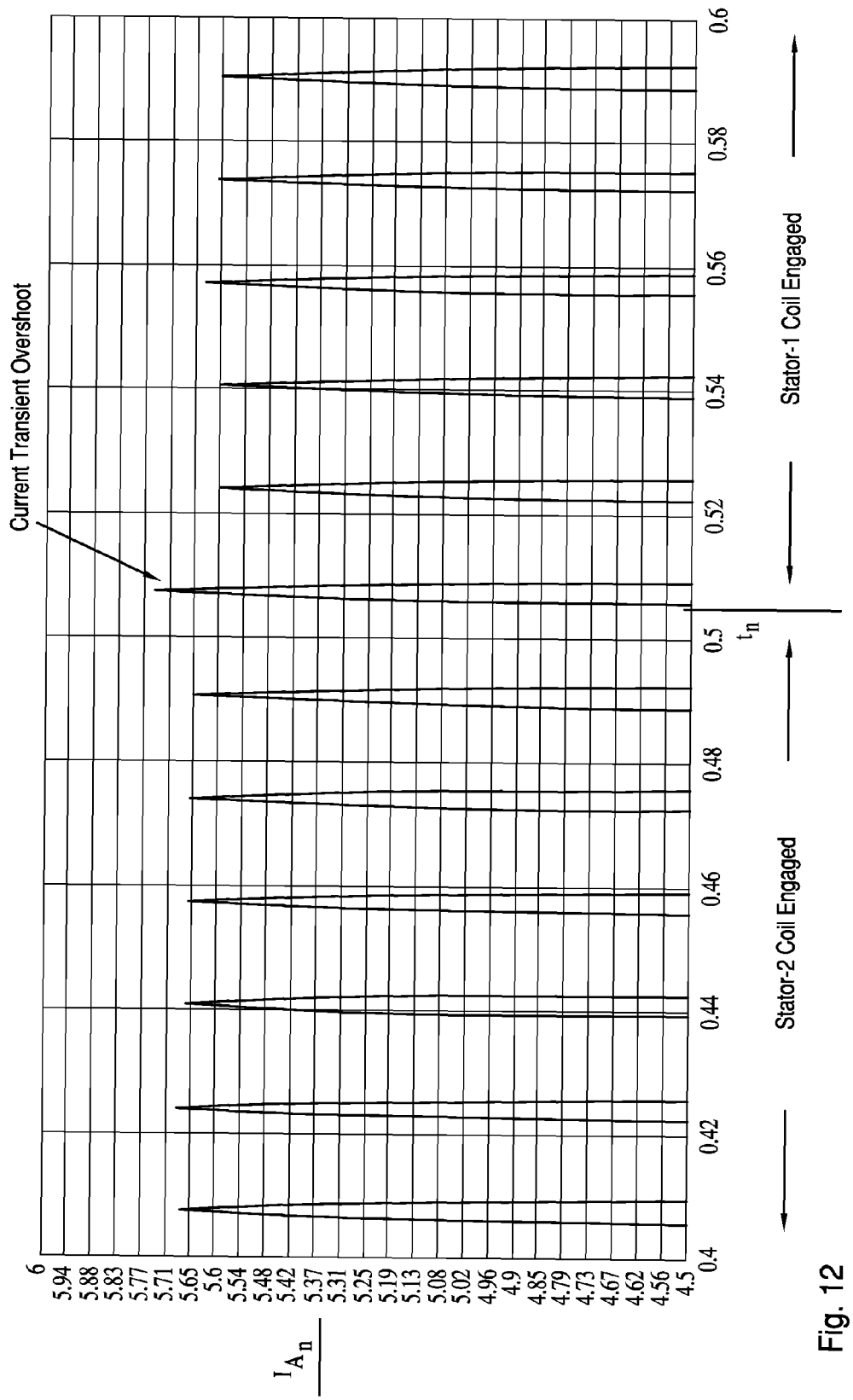
FIG. 12 illustrates current transient overshoot during single phase block switching.

FIG. 12 shows experimental results for a single phase test as current is commutated from one uncovered LIM stator block to another. The experiment is setup as in FIG. 2, but the stator coil parameters are R=0.48 ohms and L=8.1 mH. The sinusoidal steady state current amplitude for stator-2 is 5.6 amps. The peak current transient is 5.74 amps. Therefore the peak percent overshoot is $P_f$=2.5%. The excitation frequency is 60 Hz and the sampling rate for the A/D converter and processor system is 75 µS. Examining FIG. 11 for a 60 Hz excitation and 2.5% peak overshoot (second curve from the bottom), the necessary sampling rate is indeed 75 µS.

Figure 13:
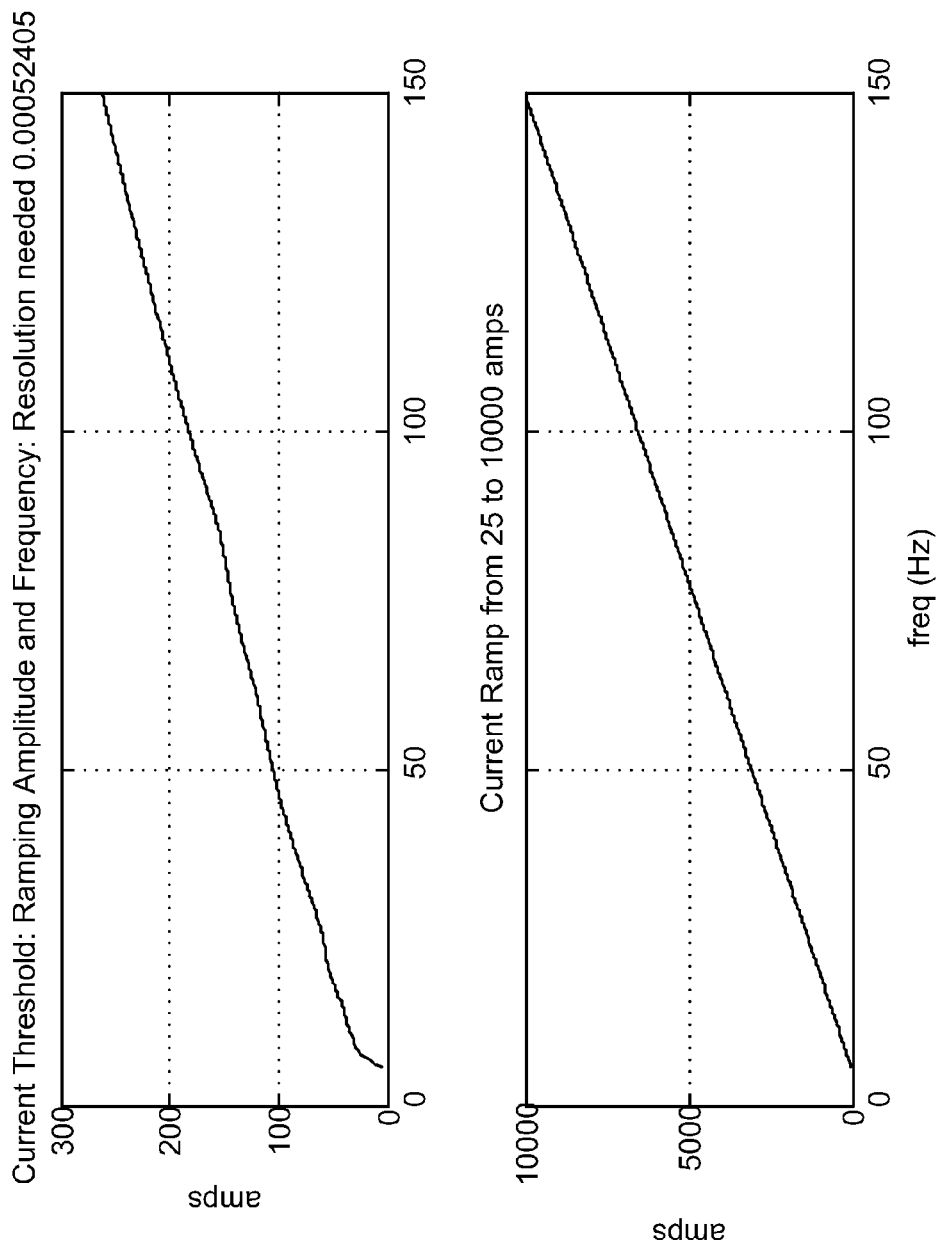
FIG. 13 illustrates the non-normalized current detection threshold during a current ramp in amplitude and frequency.

As an example design calculation, given that a 2.5% peak overshoot is acceptable and that the maximum excitation frequency is 150 Hz, then the plots in FIG. 11 show that the sampling period needed is 25 µS. This is a 40 kHz sampling frequency. The plots in FIG. 10 show that the normalized current detection threshold is a function of excitation frequency. Because both current amplitude and frequency change during an aircraft launch, both the amplitude and frequency ramp waveforms are needed to determine the non-normalized current detection thresholds. Assume that a typical launch profile has an increasing current ramp for 3 seconds. Take the amplitude ramp to be from 25 amps to 10,000 amps, and the frequency ramp to be from 6 Hz to 150 Hz. The lower plot in FIG. 13 shows the current amplitude ramp versus frequency. The ramps are linear in time. The upper plot in FIG. 13 shows the non-normalized current threshold detection profile that would be implemented in the motor current threshold profile, shown stored in memory in FIG. 6. The minimum value of the current threshold is 5.24 amps at 6 Hz excitation. If the range of the A/D converter is set to match the largest current in the system, then the needed A/D resolution is 0.0005 amps. This is one part in 2,000. For a bipolar signal, this would require a dynamic range of one part in 4,000. This can be satisfied with a 12-bit A/D converter.

3.0 Modeling of Block Switching System

Computer simulations are often used to model the dynamic effects of complicated systems in order to develop controls and predict system behavior. The modeling of electric motor systems is often done using mathematical equations that describe the electrical and mechanical operation of the motor. For induction motors, the present state of the art for developing a high performance motor model is to use a mathematical transformation of the electrical dynamic equations into the direct and quadrature reference frame, hereafter referred to as the dq-reference frame. Although there are several variations, a commonly used one is to model the symmetric induction motor in a reference frame that is synchronous with the rotor flux. This simplifies the motor dynamic equations considerably by removing time varying sinusoidal terms and allowing for a linear systems analysis of the dynamics (please see the book *Analysis of Electric Machinery* by P. C. Krause). This approach is most effective for a standard induction motor with electrically balanced impedances on the phases and under the conditions of balanced excitation voltages. This approach is applicable to the linear induction motor as well as the rotary induction motors. However, with a block switched linear induction motor, each phase of the motor is switched at a different time leading to electrically unbalanced transient operation. This electrical unbalance adds considerable complication to the dq-reference frame model of the induction motor and makes computer simulation and analysis difficult. For electrically unbalanced transients, the standard stator (primary) fixed reference frame is best suited, hereafter referred to as the stator stator abc-reference frame. As a result of the block switching operations, it is most effective to model the portion of the linear motor that is covered by the moving shuttle in the dq-reference frame, while it is most effective to model the portion of the linear motor that is being block switched (not covered by the linear motor but still being activated) along with the switches themselves, in the stator abc-reference frame. A method is developed here that allows for compartmentalized modeling and simulation of block switched linear motors where the linear motor and the block switching operations can be modeled separately, each in its most suitable reference frame, without generating algebraic loops or requiring noisy derivative computations. This methodology also applies more generally when the system model being developed has electrically balanced subsystems that need to be modeled in combination with electrically unbalanced subsystems.

When simulating large motor models, it is desirable to separate the model of the switched inductors from the model of the load as much as possible. In this way, localized state equations can be written that are largely independent of the load, thereby allowing for a compartmentalized model development approach. A model development approach is presented here that minimizes subsystem interdependence and breaks potential algebraic loops. This allows the load model to be developed separately from the inductor models, then attached together in a computer simulation packages such as Simulink (please see documentation for Simulink Computer Software by The MathWorks Inc.).

Figure 14:
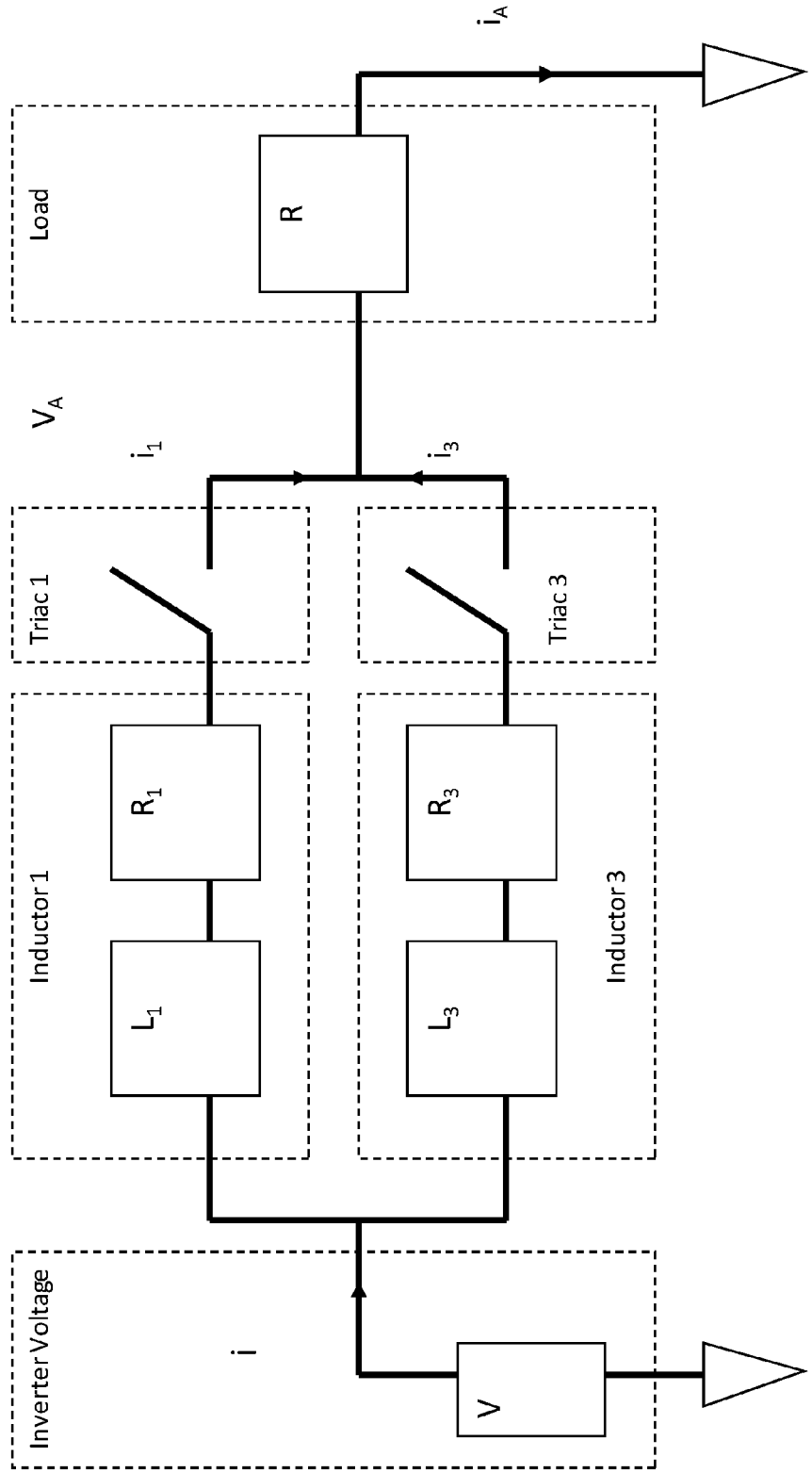
FIG. 14 illustrates a composite block switch model of dual inductor system.

The modeling approach can be visualized by considering one phase of the block switched linear motor shown in FIG. 2, but rearranged as in FIG. 14 with an inverter voltage, the inductors L1 and L3 that represent block switched motor phases, the switching elements triac 1 and triac 3, and the generalized load taken as a resistor R. The equations that model this composite system are $$\frac{d}{dt}\begin{bmatrix} i_1 \\ i_3 \end{bmatrix} = \begin{bmatrix} \frac{-(R_1 + R_{sw1} + R)}{L_1} & \frac{-R}{L_1} \\ \frac{-R}{L_3} & \frac{-(R_3 + R_{sw3} + R)}{L_3} \end{bmatrix}\begin{bmatrix} i_1 \\ i_3 \end{bmatrix} + \begin{bmatrix} \frac{1}{L_1} \\ \frac{1}{L_3} \end{bmatrix}v \quad (20)$$

$$i_A = \begin{bmatrix} 1 & 1 \end{bmatrix}\begin{bmatrix} i_1 \\ i_3 \end{bmatrix} \quad (21)$$

$$V_A = \begin{bmatrix} R & R \end{bmatrix}\begin{bmatrix} i_1 \\ i_3 \end{bmatrix} \quad (22)$$

where $R_{SW1}$ and $R_{SW3}$ are resistances that are used to model the triac switch conduction by setting each to zero for a closed circuit and to a very large value for an open circuit. The resulting load current and the load voltage can be calculated from (21) and (22) respectively.

The load element R appears directly in (20). Changes to the load would require changes throughout (20). For more complicated models, it is desirable to separate the load from the inductor and triac circuits. In this way, the inductors and triacs can be considered as a subsystem and modeled without the requiring the load element as a parameter in their dynamic equations. Similarly, the load element can be added without needing to alter the parameters in its dynamic equations to suite the inductors and triacs.

3.1 Partitioned Block Switch Model

Figure 15:
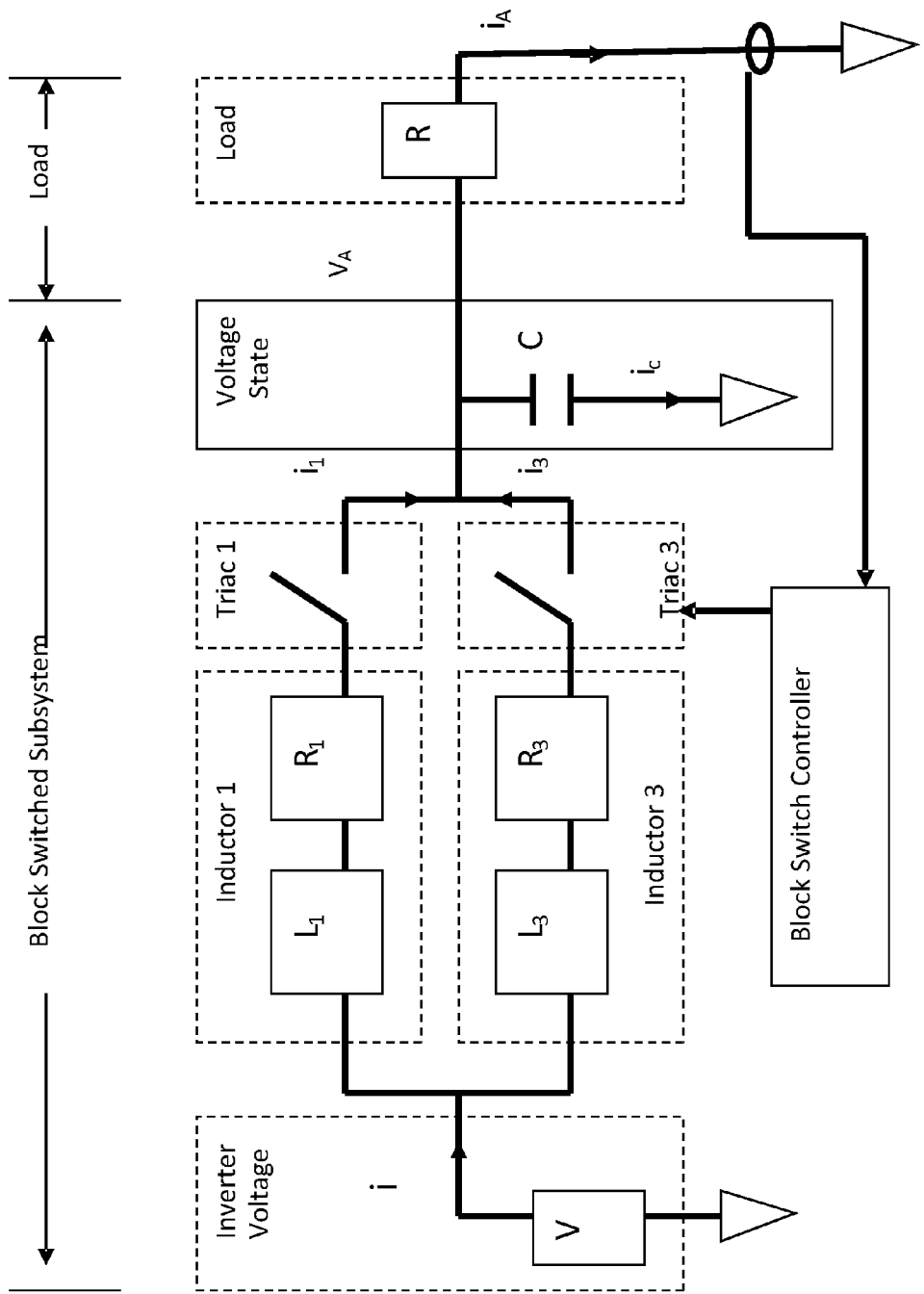
FIG. 15 illustrates a model of block switched dual inductor system with output voltage state generator.

The load can be isolated from the rest of the system without forming an algebraic loop if the output voltage $V_A$ can be generated as a state in the system. In the method developed here, this is accomplished by adding a small capacitor element to the output circuit simply as a simulation artifact. A simulation artifact is an element added to the system model which does not exist in the actual system, but its addition to the model facilitates solving of the system equations of the simulation without significantly altering the results that are achieved. The value of the capacitor can be chosen so that its effect on the output current is negligible. In addition, this has the effect of removing the need to calculate the derivative of the output current. This new architecture is shown in FIG. 15 with the new Voltage State block that contains a capacitive element. The block switch controller which operates the triac switches is also shown.

The block switched subsystem can be modeled as $$\frac{d}{dt}\begin{bmatrix} i_1 \\ i_3 \\ V_A \end{bmatrix} = \begin{bmatrix} \frac{-(R_1 + R_{sw1})}{L_1} & 0 & \frac{-1}{L_1} \\ 0 & \frac{-(R_2 + R_{sw3})}{L_3} & \frac{-1}{L_3} \\ \frac{1}{C} & \frac{1}{C} & 0 \end{bmatrix}\begin{bmatrix} i_1 \\ i_3 \\ V_A \end{bmatrix} + \begin{bmatrix} \frac{1}{L_1} \\ \frac{1}{L_3} \\ 0 \end{bmatrix}V + \begin{bmatrix} 0 \\ 0 \\ \frac{-1}{C} \end{bmatrix}i_A \quad (23)$$

$$Y = \begin{bmatrix} 0 & 0 & 1 \end{bmatrix}\begin{bmatrix} i_1 \\ i_3 \\ V_A \end{bmatrix} \quad (24)$$

where the output of (24) is the voltage $V_A$. As above, the load can be modeled as $$i_A = \left(\frac{1}{R}\right)V_A \quad (25)$$

Figure 16:
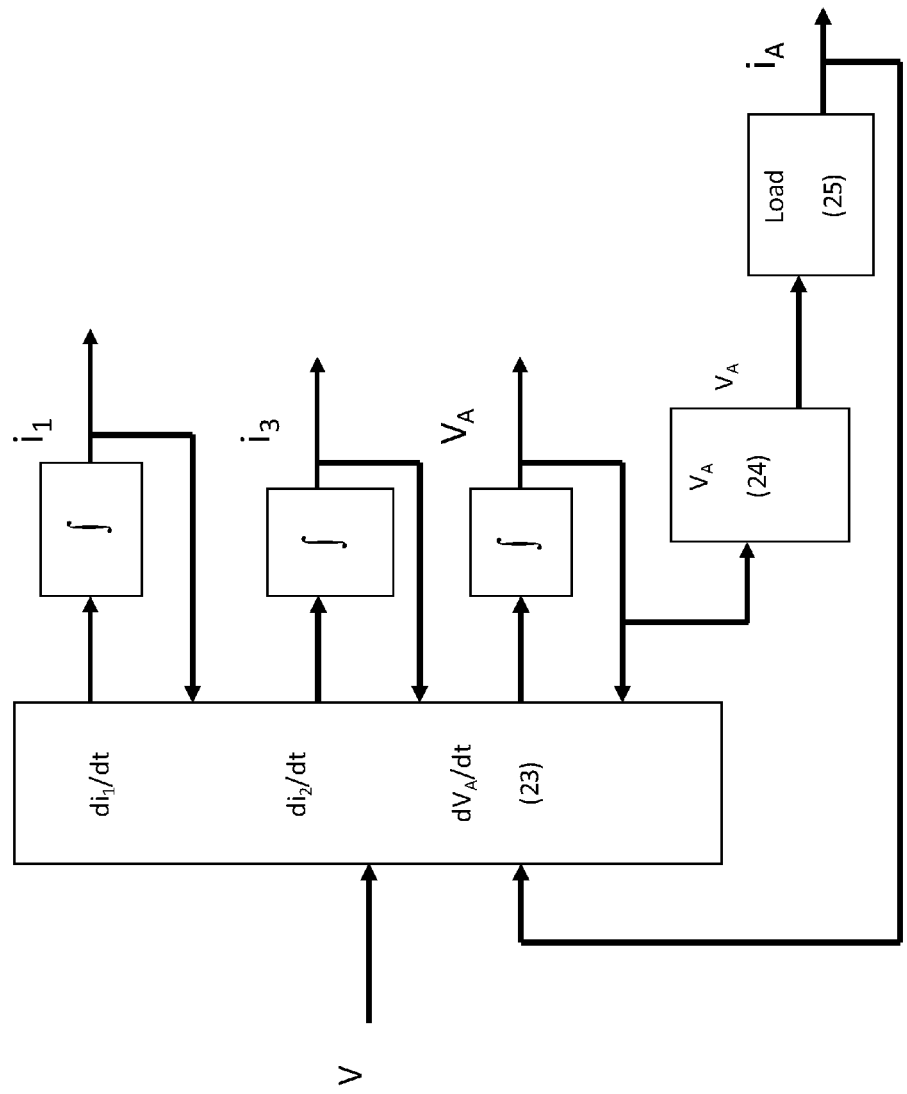
FIG. 16 illustrates the system interconnection with the load modeled separately.

Notice that (23) and (24) do not depend on the load resistance R. There is no dependence on the derivative of the load current. The algebraic loop does not exist. The system interconnection is shown in FIG. 16.

This is a significant improvement over the composite model shown in FIG. 14 and described by (20)-(22). With this configuration, the load can be easily replaced without affecting the block switched subsystem. More complex load models, including motor coils, can replace the simple resistive load shown in this example in a modular fashion.

Alternatively, a resistive or an inductive element may be added to the model as the simulation artifact instead of the capacitor and the use of either as the simulation artifact should be considered to fall within the scope of the present invention.

3.2 Operation of the Partitioned Block Switched Model

Figure 17:
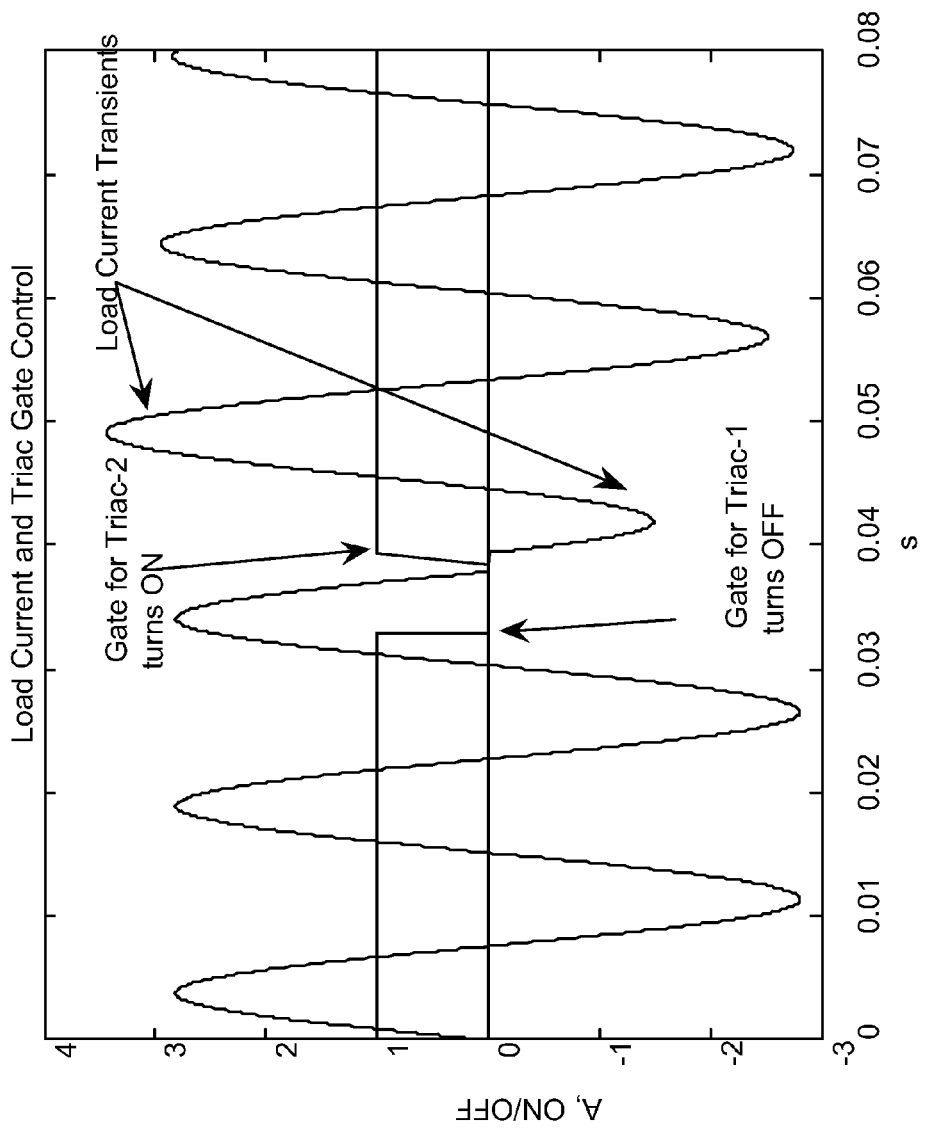
FIG. 17 illustrates the load current and triac gate controls from portioned block switch model.

Performance of the modeling approach from Section 3.1 and shown in FIG. 15 is illustrated here. The system is started with current flowing in inductor 1 and it is then commutated to inductor 3 via the block switch controller. FIG. 17 shows the response of the load current and the triac gate control signals during a block switching event. Before the switching event, the load current is flowing through inductor-1. After the switching event, the load current is flowing through inductor-3. The gate signal for triac-1 switches OFF while the current is positive. The triac doesn't actually stop the current flow until the current subsequently crosses zero. Conduction for triac-3 starts immediately upon receiving its gate ON command. In this simulation, the hardware delay in detecting the block switching instant is modeled by a slight delay in the gate ON command from the zero current cross instant. The simulation predicts the current transient as shown in FIG. 17 which correctly captures the behavior as measured in the laboratory experiments and shown in FIG. 3a.

3.3 Modeling of Linear Motor with Integrated Block Switching

The portioned modeling approach can be extended to the full three phase linear motor with integrated block switching. In the LIM system, the current must be commutated from one uncovered block to another uncovered block as the shuttle traverses the track. This is shown in FIG. 18.

As the shuttle exits the trailing block and it becomes Uncovered-and-Active, the current must be switched off in that block while it is being switched on in the leading block. The leading block will change from INACTIVE to ACTIVE while still being uncovered. Since force is generated only by the blocks that are covered by the shuttle, there will be no interruption of force during travel if the leading uncovered block is ACTIVE before the shuttle gets to it.

Figure 18:
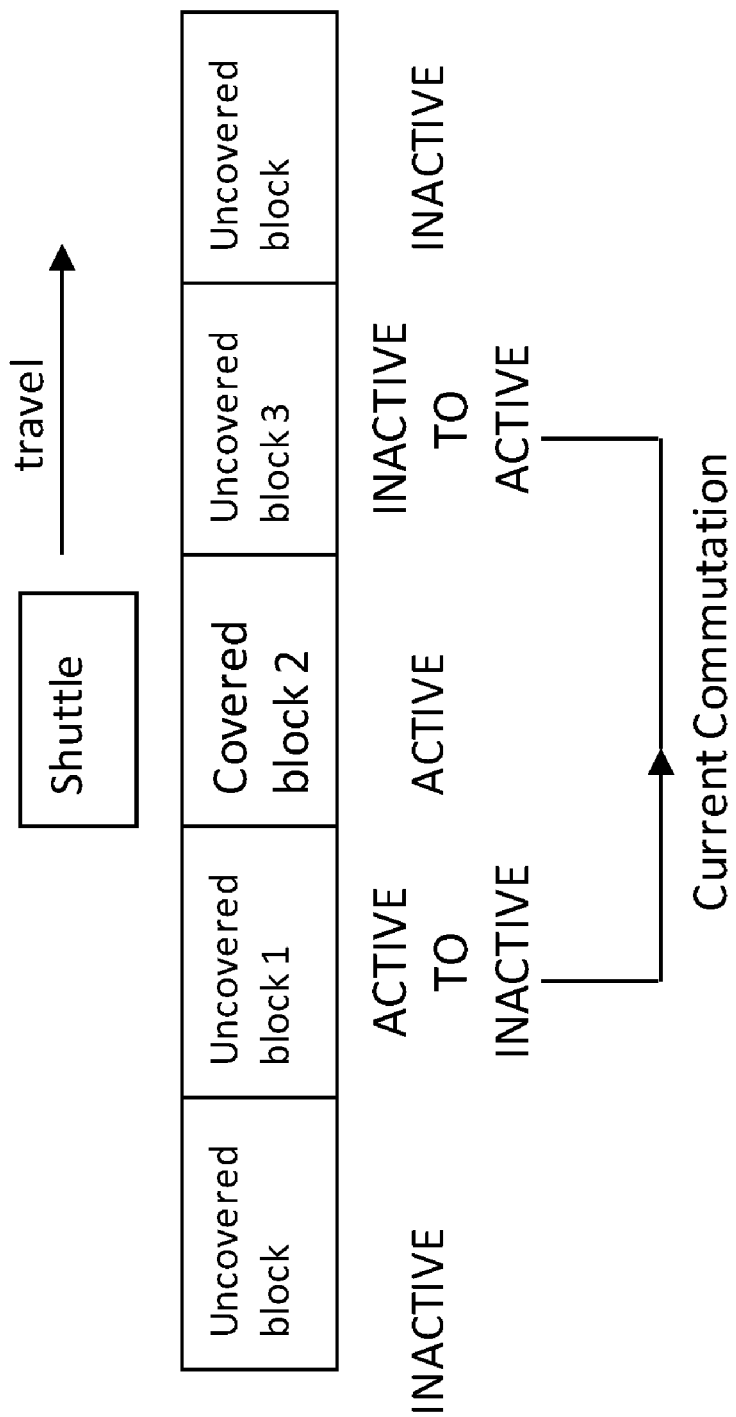
FIG. 18 illustrates a block diagram of a linear induction motor showing the commutation of current between uncovered blocks.

The model shown in FIG. 15 can be applied to the LIM shown in FIG. 18 if the trailing uncovered block is taken in place of inductor-1, the leading uncovered block is taken in place of inductor-3, and the load is taken to be the covered block rather than a simple resistive load. Of course the model of the uncovered blocks is actually a motor model that has its secondary removed. It is most convenient to model both the uncovered and the covered three phase motor blocks in the dq-reference frame. However, it is more convenient to model the triac block switching in the stator abc-reference frame. Since each switch is ideally activated at a zero current crossing, the triacs on each motor phase will be switched in sequence as the current in each phase crosses zero. This means that different phases of the trailing block and the leading block will be conducting simultaneously. In addition, there may also be some transient electrical imbalance since switching of real devices is not instantaneous. Transient imbalance is likely to exist so that the zero sequence current and voltages may not be zero.

Figure 19:
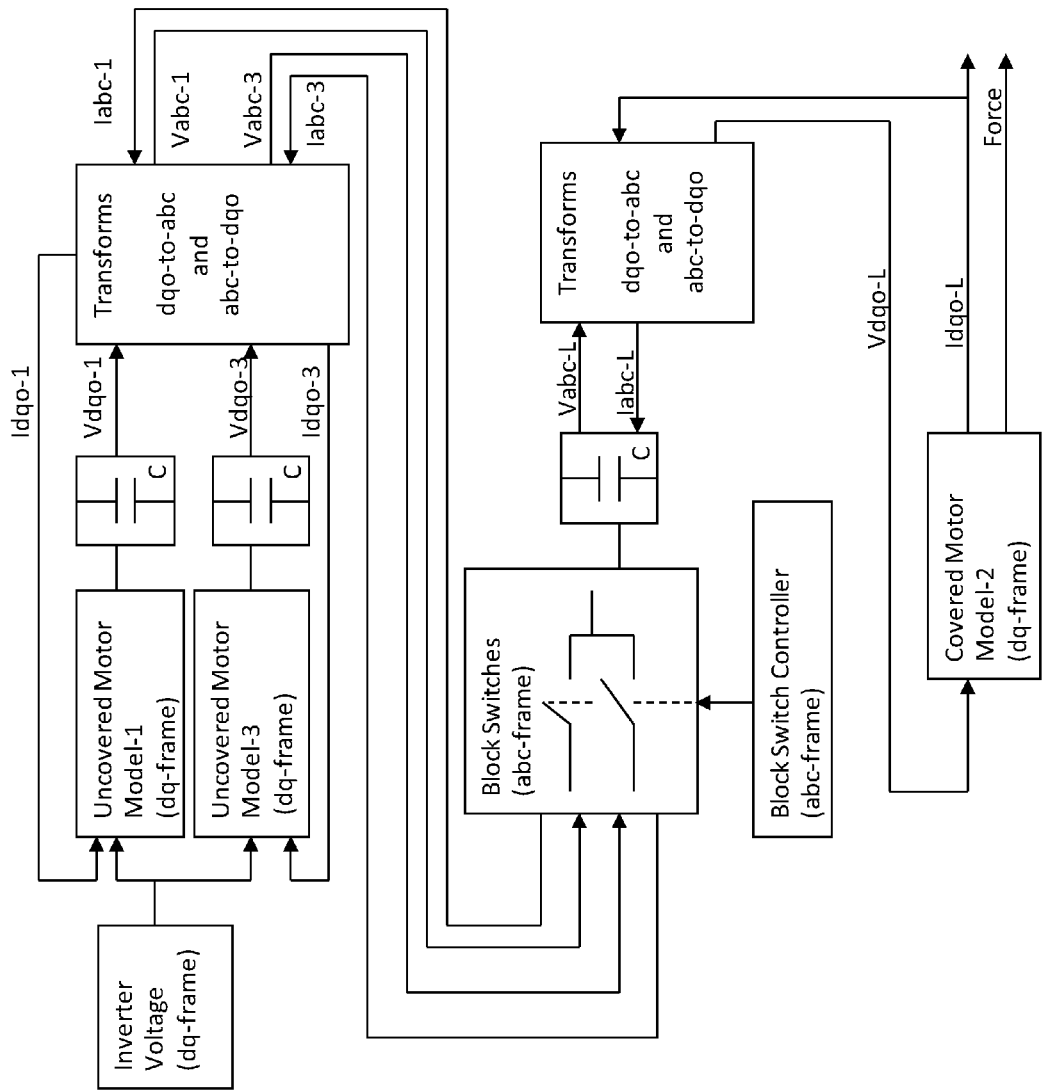
FIG. 19 illustrates a LIM simulation model with voltage state partitioning and with integrated block switching.

An overview of the three phase LIM model with block switching is shown in FIG. 19. The motor models are kept in the dq-reference frame while the block switching is kept in the stator abc-reference frame. Capacitive elements are used as in Section 3.1 to form output voltage states that result in independent subsystems. Only the load current is fed back from one subsystem to the next. The dynamic equations for each subsystem can be formed independently. As the shuttle travels down the track, this can be modeled in the simulation by alternately switching back and forth between the uncovered motor models.

Figure 20:
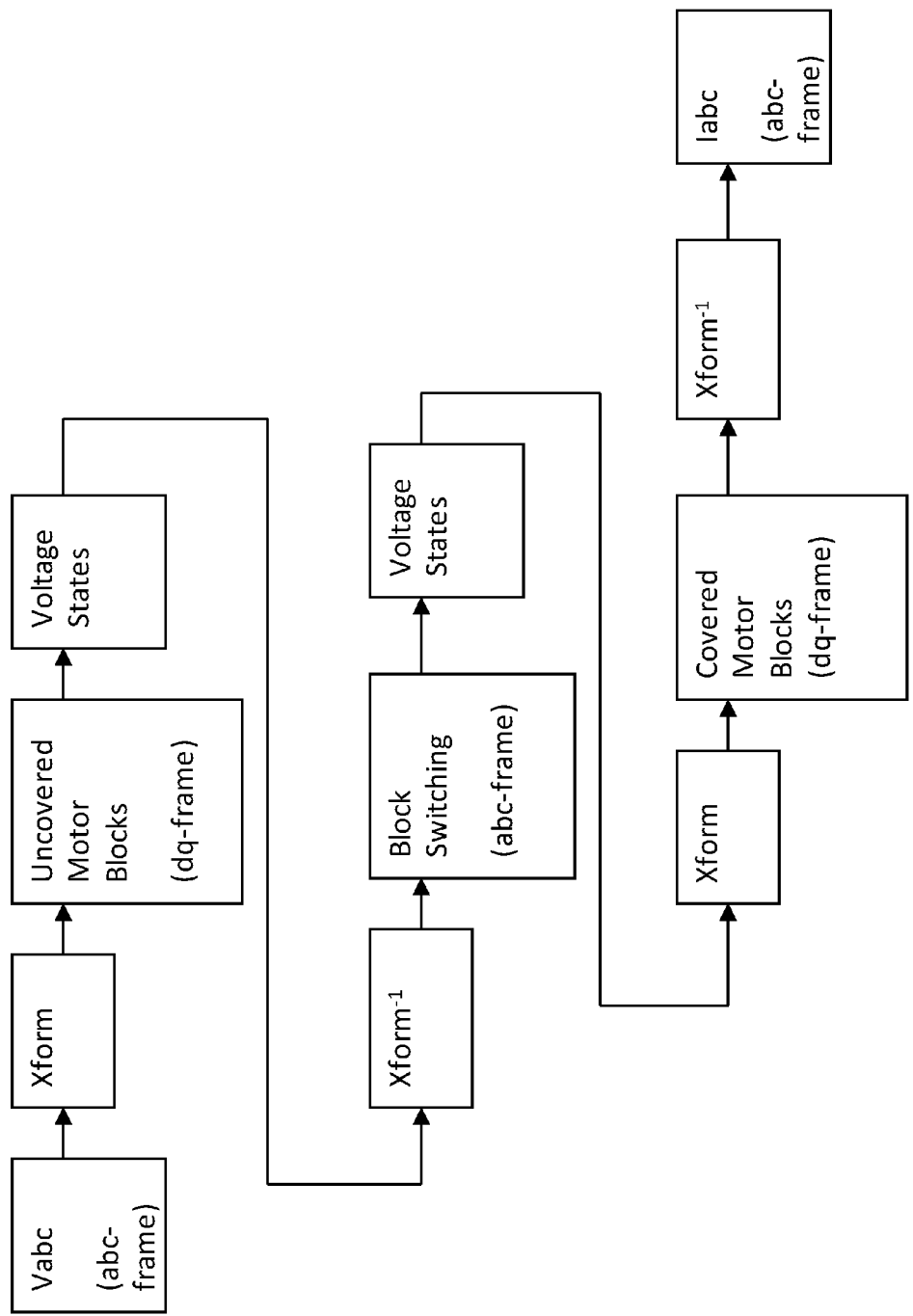
FIG. 20 illustrates a linear motor model highlighting order of subcomponents.

The voltage states are used to isolate the linear motor model subcomponents and are particularly useful at the interface between stator abc-reference frame and dq-reference frame model transitions. The voltage state model partitioning approach can be used even if the LIM model subcomponents are connected in a different order. The partitioning approach can also be omitted between subsystems if the subsystem isolation is not necessary. These particulars depend upon the specific system being modeled but the approach remains applicable. To see this more clearly, FIG. 20 is a simplification of FIG. 19 emphasizing the order of subcomponents in the linear motor model with block switching.

Figure 21:
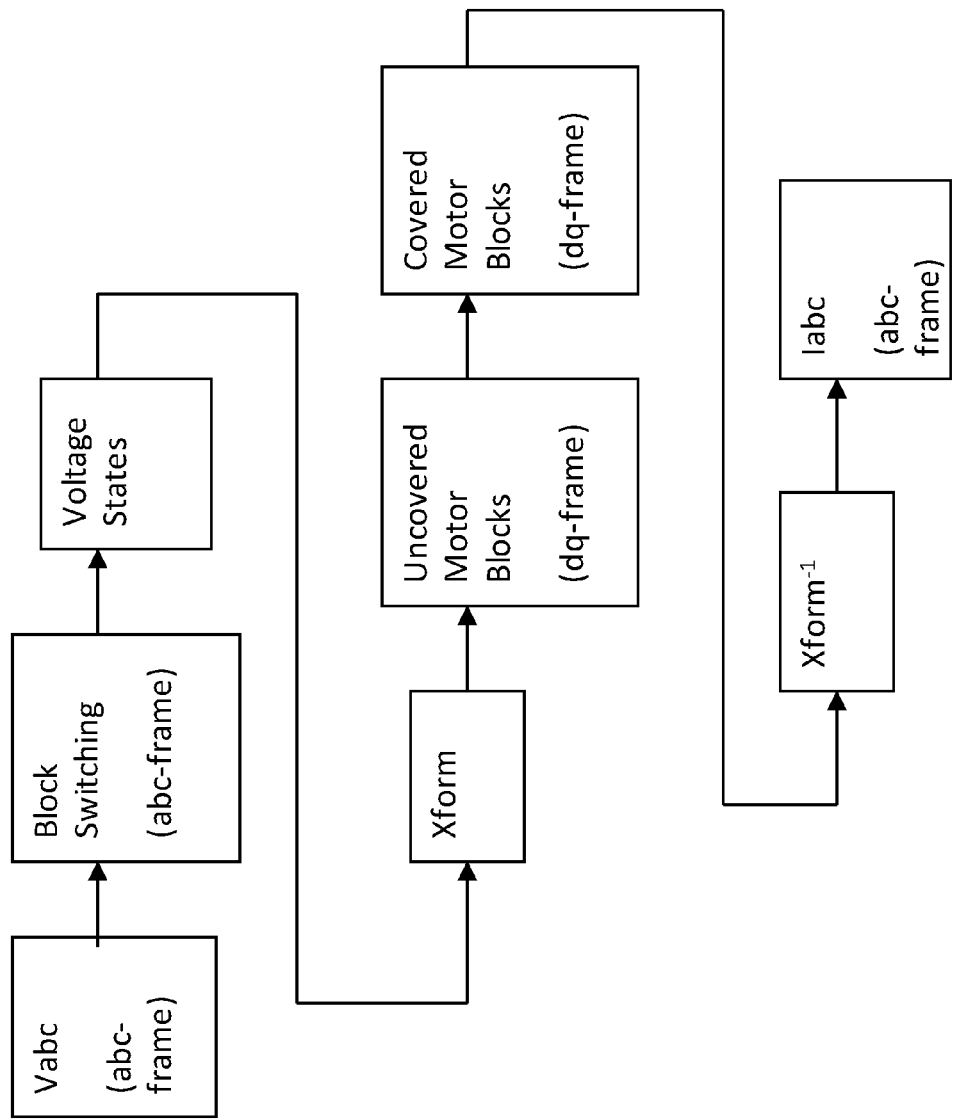
FIG. 21 illustrates a simplified linear motor model highlighting subcomponents.

The overall inputs to the linear motor model are the voltages Vabc and the outputs are the currents Iabc. However, the same inputs and outputs can be maintained while the number of reference frame transformations (Xform) and inverse transformations (Xform-1) can be reduced by changing the order of the subcomponents. In addition, if it is not necessary to isolate the model of the uncovered motor blocks from the covered motor blocks then one set of voltage states can be eliminated. This gives the system shown in FIG. 21. Notice the LIM inputs and outputs are the same, the block switching is still modeled in the stator abc-reference frame, and the uncovered and covered motor models are still in the dq-reference frame. The motor model subcomponents are still isolated from the block switching subcomponents but the uncovered and the covered motor models are now interdependent. The advantage of putting the model into this configuration is that it can reduce the computational load on the computer and therefore reduce the simulation time required to perform simulation runs. The partitioned modeling approach is still generally applicable and still affords considerable simplification when developing a linear motor model with block switching.

4.0 Reduced Generation of Block Switching Transients

A two pronged approach is taken to minimize block switching transients in the linear motor. The first is to design the system so as to reduce the size and occurrences of transient motor currents. The second is to apply closed loop current control to actively suppress the generation of any remaining current transients. This section details the design of the block switch system to minimize the creation of current transients.

As shown in Section 1, the commutation of current from the uncovered block switched motor coil 1 that trails the shuttle to the uncovered block switched motor coil 3 that is ahead of the shuttle (see FIG. 18) should be done at the instant of the current's zero crossing in that phase. Note that commutating the current between two motor coils means that one triac switch (triac-1) needs to be turned off at the same time that the other one (triac-3) needs to be turned on. As is well known, a characteristic of the triac switch is that it turns off when its gate is commanded to be off and its input current goes to zero. It turns on when its gate is commanded to be on. Therefore, its turn off condition is inherently synchronized with the current's zero crossing while its turn on condition must be externally synchronized with the current's zero crossing by properly timed application of the gate on command. Based on its analysis, experiments, and modeling, it has been determined that the proper control of the block switching event is achieved by synchronizing the turn off of triac-1 with the turn on of triac-3 with the zero crossing of the current in that phase. Two methods were developed to achieve this synchronization although other synchronization methods might also be applied. One method uses separate positive going and negative going current thresholds to detect the zero current crossing, while the other method uses a positive threshold above the zero crossing and a negative threshold below the zero crossing in conjunction with edge triggered digital detection circuitry. In both cases, the value of the current thresholds that define the zero crossing detection region can be determined by following the design guidelines developed in Section 2.0. The thresholds may also be moved dynamically to keep transient currents within desirable bounds, as illustrated in FIG. 10.

Figure 22:
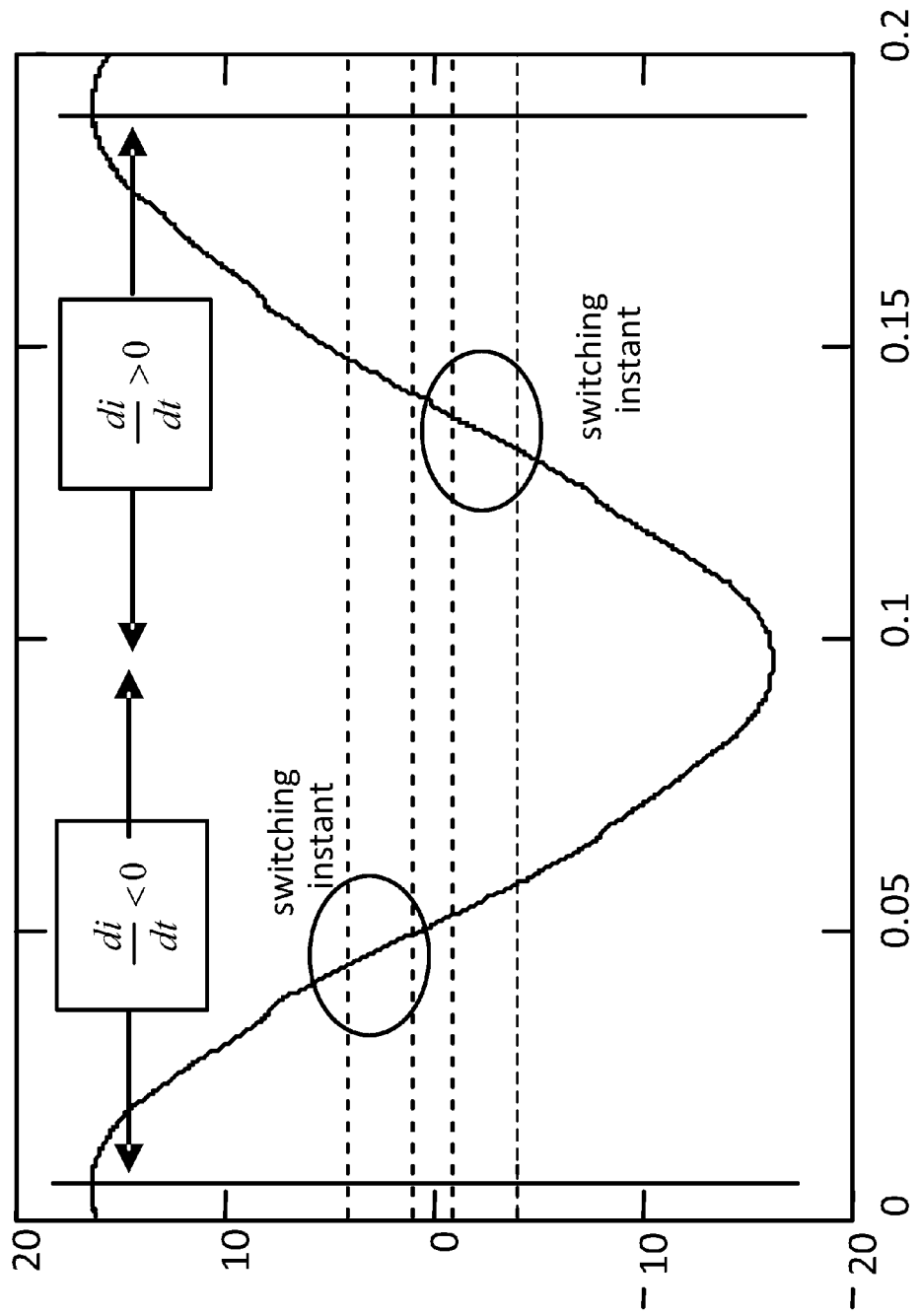
FIG. 22 illustrates Phase Current Switching using current thresholds which define separate detection regions for negative-sloping currents and positive-sloping currents.

4.1 Synchronization Using Separate Positive-Going and Negative-Going Detection Regions The block switching is performed in stages to prevent transients. Once the shuttle is in the appropriate position, the transition process starts. The algorithm starts to monitor the phase currents. There are positive-going and negative-going current threshold regions as depicted in FIG. 22 by the pair of positive-valued dotted lines and by the pair of negative-valued dotted lines, respectively. If a phase current has a negative slope, as demonstrated in FIG. 22, that phase can only be switched inside of the positive-valued current thresholds that are just greater than zero current. If a phase current has a positive slope, that phase current can only be switched inside of the negative-valued current thresholds that are just less than zero current as shown in FIG. 22. At the switching instants, the turn on command for the triac in the newly activated block and the turn off command for the triac in the trailing block occur at the same time. This gives the effect of make before break switching, with both phases conducting for a short time. The positive and negative current thresholds are symmetric.

Within each of the two possible switching regions, shown in FIG. 22, the switching band is delineated by an upper and a lower threshold. The higher magnitude threshold is determined such that the incoming phase block does not start to conduct a significant amount of current at the same time as the outgoing phase block. The lower magnitude threshold is set such that it gives the outgoing phase enough time to turn off. The turn off command must occur before the current zero crossing (the time delay required depends upon the particular switching device and drive circuitry) to allow the outgoing phase to turn off at the zero crossing. With insufficient turn off time, the device will not turn off and will continue to conduct in the next half cycle. This is one problem that can readily occur if a single region centered around the current zero crossing was used delineate the current zero crossing and to directly enable the switch turn on and turn off commands, rather than the two separate regions shown here. In that case, the current may have just passed the zero crossing point when the command is issued to turn off the trailing block switch and to turn on the leading block switch. The leading block switch will be activated but the trailing block switch will not be deactivated until the current crosses zero during the next half cycle. If a digital system is used to monitor the currents, then it must be ensured that the sample rate is high enough such that enough samples are detected within the threshold boundaries and that sufficient time is remaining to operate the switches. If an analog system is used to monitor the currents, then the circuit delays must be short enough to ensure detection of current within the thresholds and it must respond fast enough to operate the switches.

4.2 Synchronization Using Detection Region Around Zero Crossing

Figure 23:
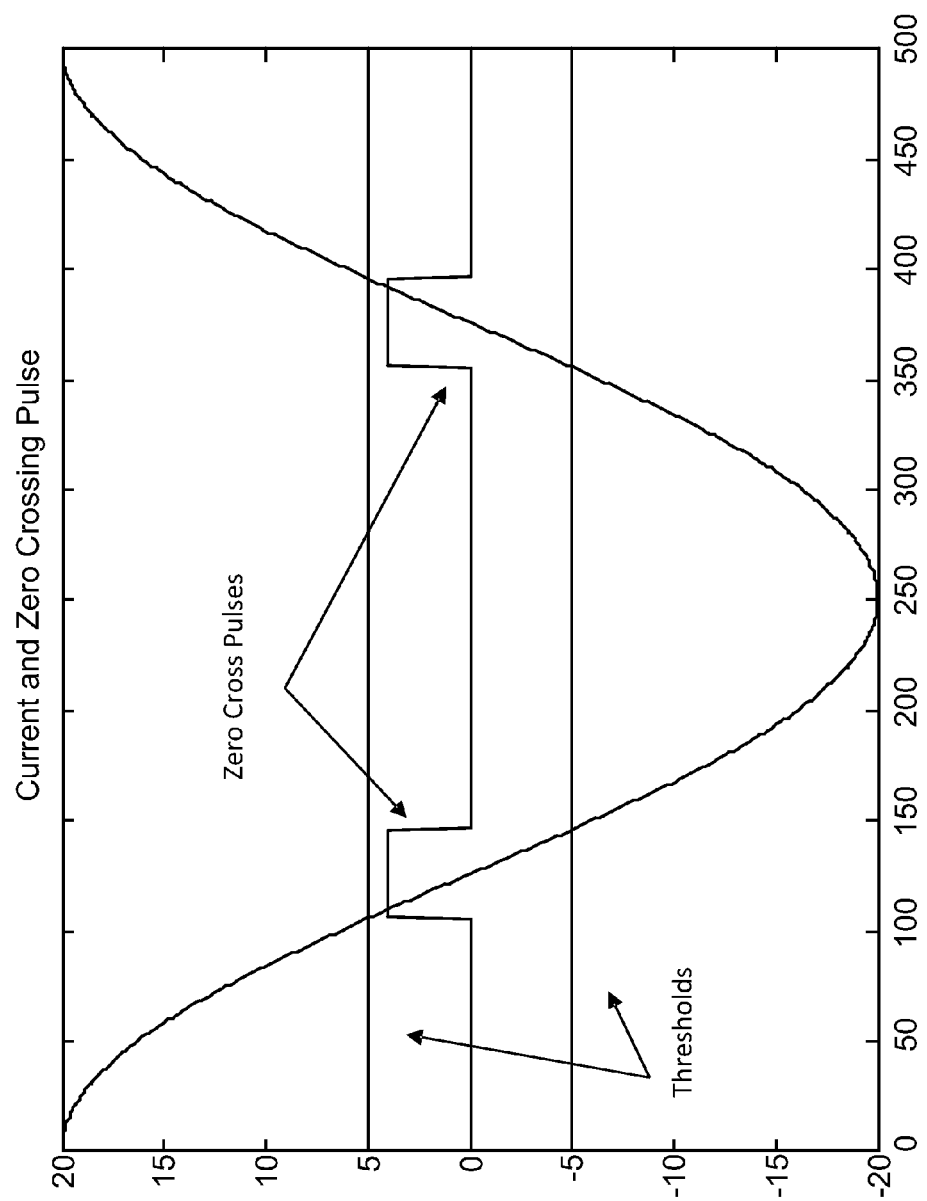
FIG. 23 illustrates a current, zero crossing thresholds and zero crossing pulse.

With this method of synchronization, a digital zero cross pulse is generated whenever the current is in a defined region around the current zero crossing as shown in FIG. 23. The zero crossing pulse has a positive edge when the current is entering the zero crossing detection region and a negative edge when it is leaving the region. The detection threshold above zero and the detection threshold below zero do not need to be the same magnitude. That is, a single detection region around zero is defined, but it may be asymmetric to satisfy the turn on and turn off timing needs of particular circuits used in the implementation.

Figure 24:
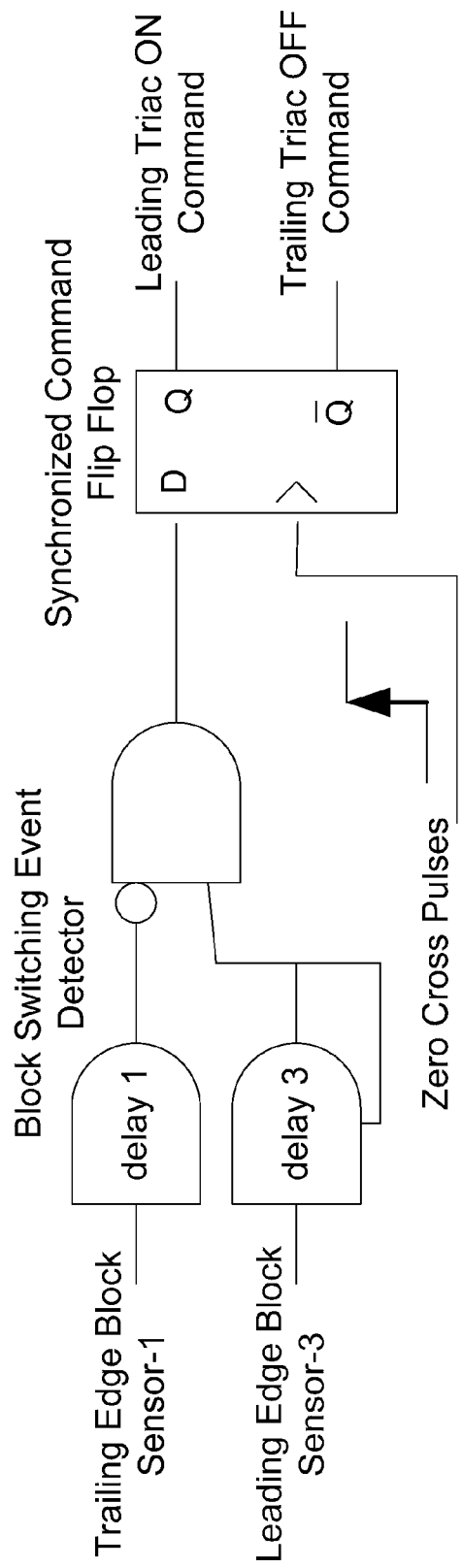
FIG. 24 illustrates block switching synchronization for single region zero cross detection.

The zero cross pulses of FIG. 23 can be used with a synchronization circuit comprising a positive edge triggered digital flip flop to synchronize the block switching operation as shown in FIG. 24. In an alternative embodiment, instead of using the zero crossing pulse of FIG. 23 that goes high upon entering the detection region and goes low when exiting the detection region, a zero crossing pulse that goes low upon entering the detection region and goes high upon exiting the detection region could be used in conjunction with a synchronization circuit comprising a negative edge triggered flip flop. As the shuttle is moving, the trailing edge block sensor becomes deactivated as the leading edge sensor becomes activated. When both conditions have been met a block switching event has been detected. The block switching event and the triac gate commands are then synchronized with the start of the next zero crossing region. As the current enters this region, the leading edge triac is commanded on and the trailing edge triac is commanded off. Issuing the commands at this time ensures that the trailing edge triac crosses zero and turns off while the leading edge triac is activated at the same zero crossing. Note that the trailing edge block sensor-1 and delay 1 could be omitted if it is desirable to trigger a block switching event with only the activation of the leading edge block sensor. Similarly, the leading edge block sensor-3 and delay 3 could be omitted if it is desirable to trigger a block switching event with only the deactivation of the trailing edge block sensor.

5.0 Closed Loop Mitigation of Block Switching Transients

This section details the design of the block switch system that will apply closed loop current control to actively suppress the generation of current transients. Torque transients are illustrated in the dq domain in open loop and under closed loop vector current control. It is shown that a further reduction in current and torque transients is accomplished at the expense of more aggressive voltage inputs using vector current control. These results are then extended by showing that increasing bandwidth on the vector current controller further reduces the block switching transients, but is limited by stability considerations. A novel approach to block switching current control is developed, according to the teachings of the present invention, where the approach allows the extension of the vector current controller's bandwidth for a given sampling rate such that maximum attenuation of remnant block switching transients is achieved.

5.1 Architecture of Three Phase Block Switching System

In this section, current is block switched between two three-phase linear motor sections. Each phase is switched in sequence as its current crosses zero. The motor blocks are delta connected but the same results apply to wye connected or individually controlled motor coils. Switching is performed with open loop applied voltages and with vector current control using different bandwidths to contrast performance. The dq currents are examined to show the effects of block switching transients in the system under these conditions.

Figure 25:
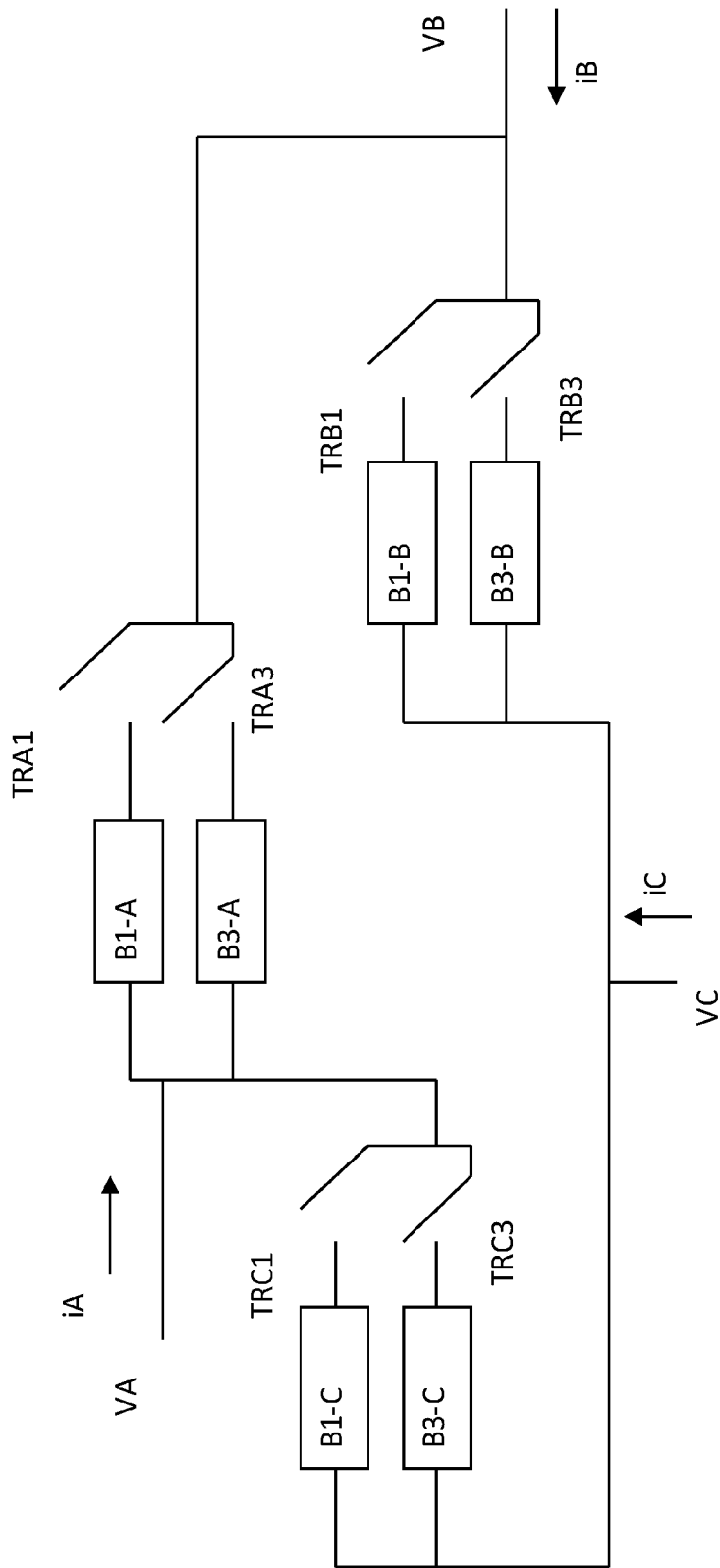
FIG. 25 illustrates the interconnection of two 3-phase delta connected blocks for block switching.

FIG. 25 shows a simplified diagram of two blocks of the three phase delta connected linear motor. The currents are switched on a per phase basis near the zero-current crossover. B1 and B3 refer to the motor blocks, A,B,C refer to the motor phases, and TRXX refers to the triac switches.

Figure 26:
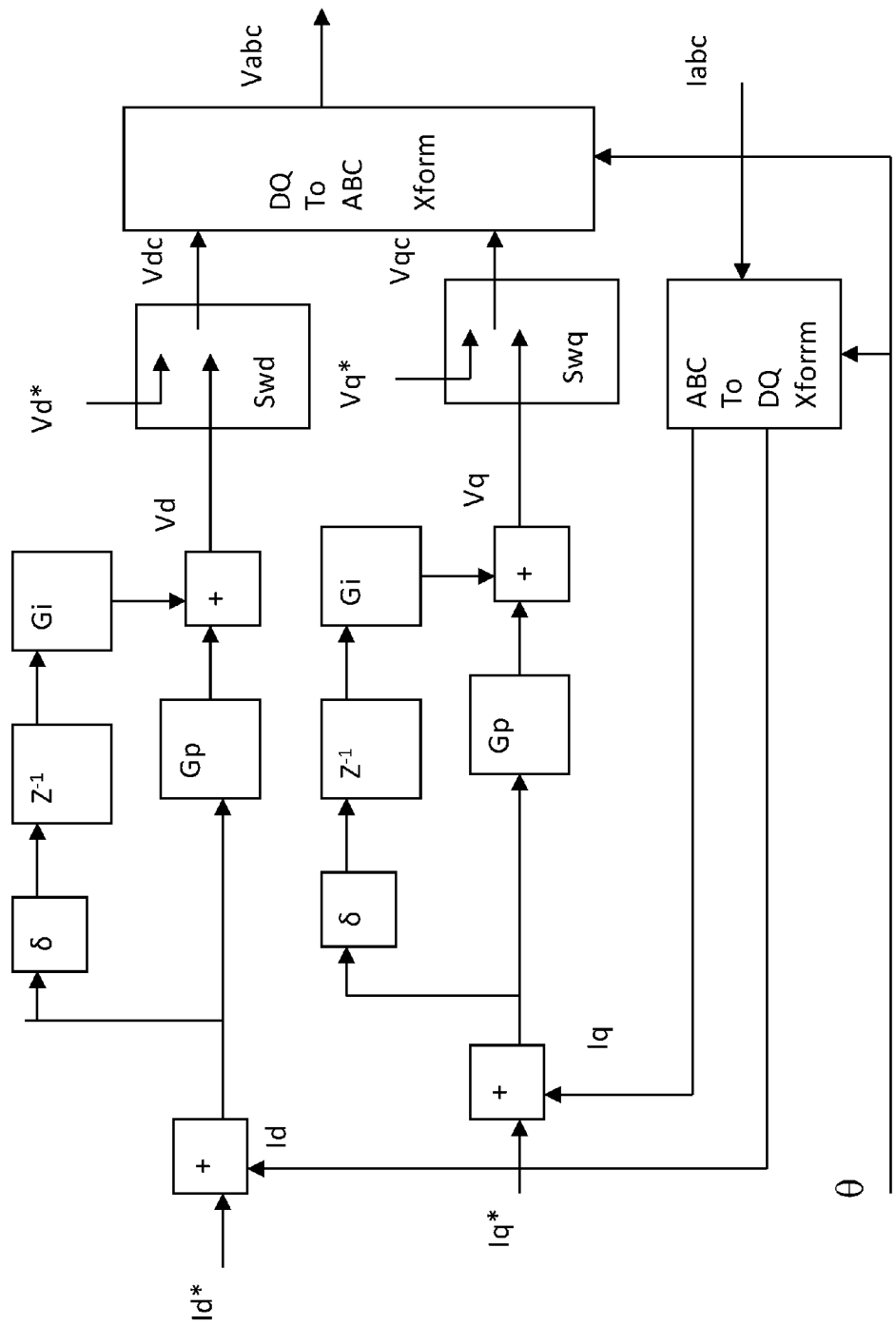
FIG. 26 illustrates a block diagram of a vector current controller with direct voltage injection points.

FIG. 26 is a block diagram of the control structure. The position of the switches determines if the system applies commanded open loop voltages Vd* and Vq* or closed loop vector current control. For open loop voltages, Vd* and Vq* are set to constant values equal to those from nominal operation of the current controller which will generate 3-phase balanced voltage sine waves. Under closed loop current control, Vdc and Vqc are set by the PI current controller commands Vd and Vq, respectively.

5.2 Block Switching with Open Loop Applied Voltages

Figure 27A:
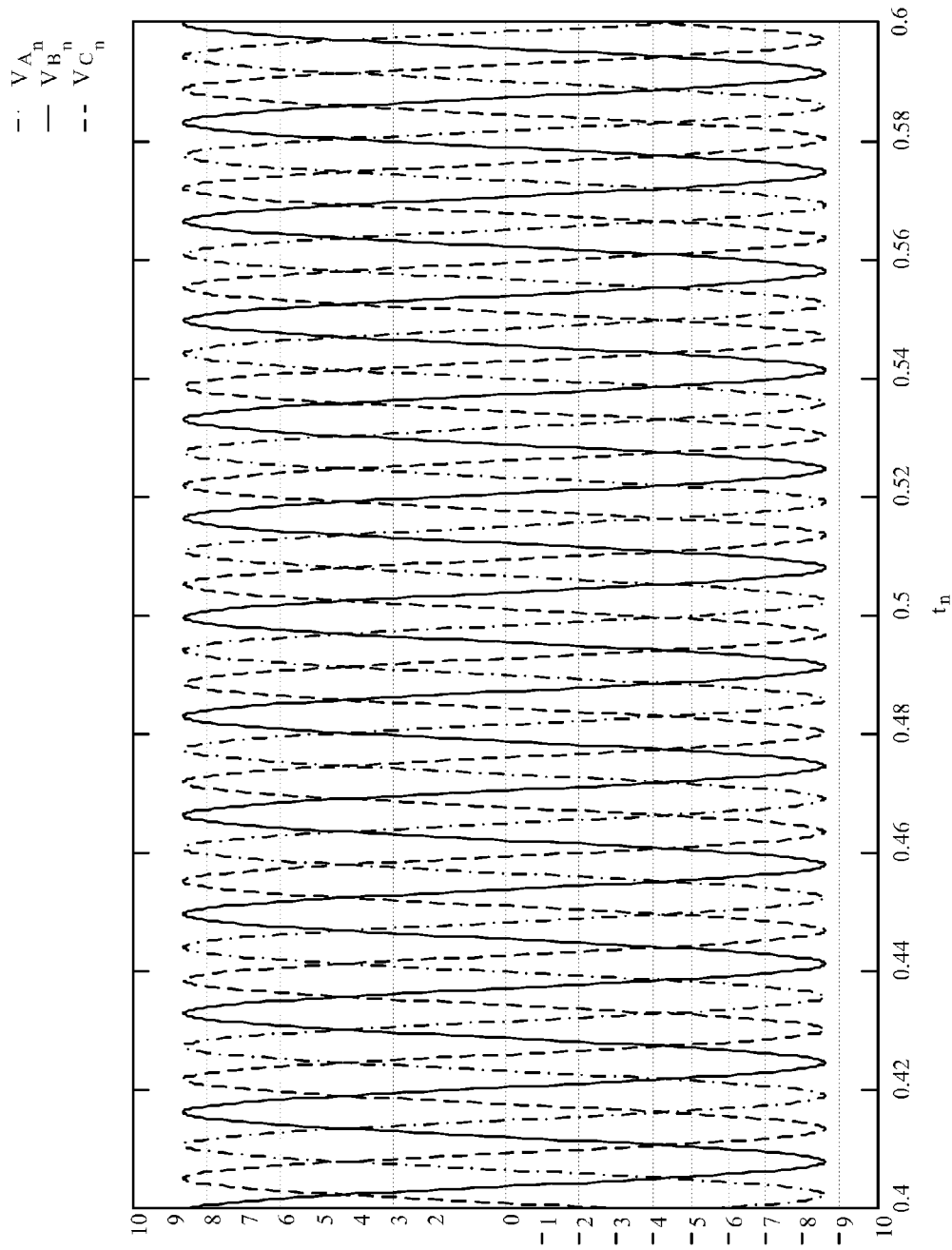
FIG. 27a illustrates the voltage sine waves produced by Vdc=−17.2 and Vqc=6.3 during block switching.
Figure 27B:
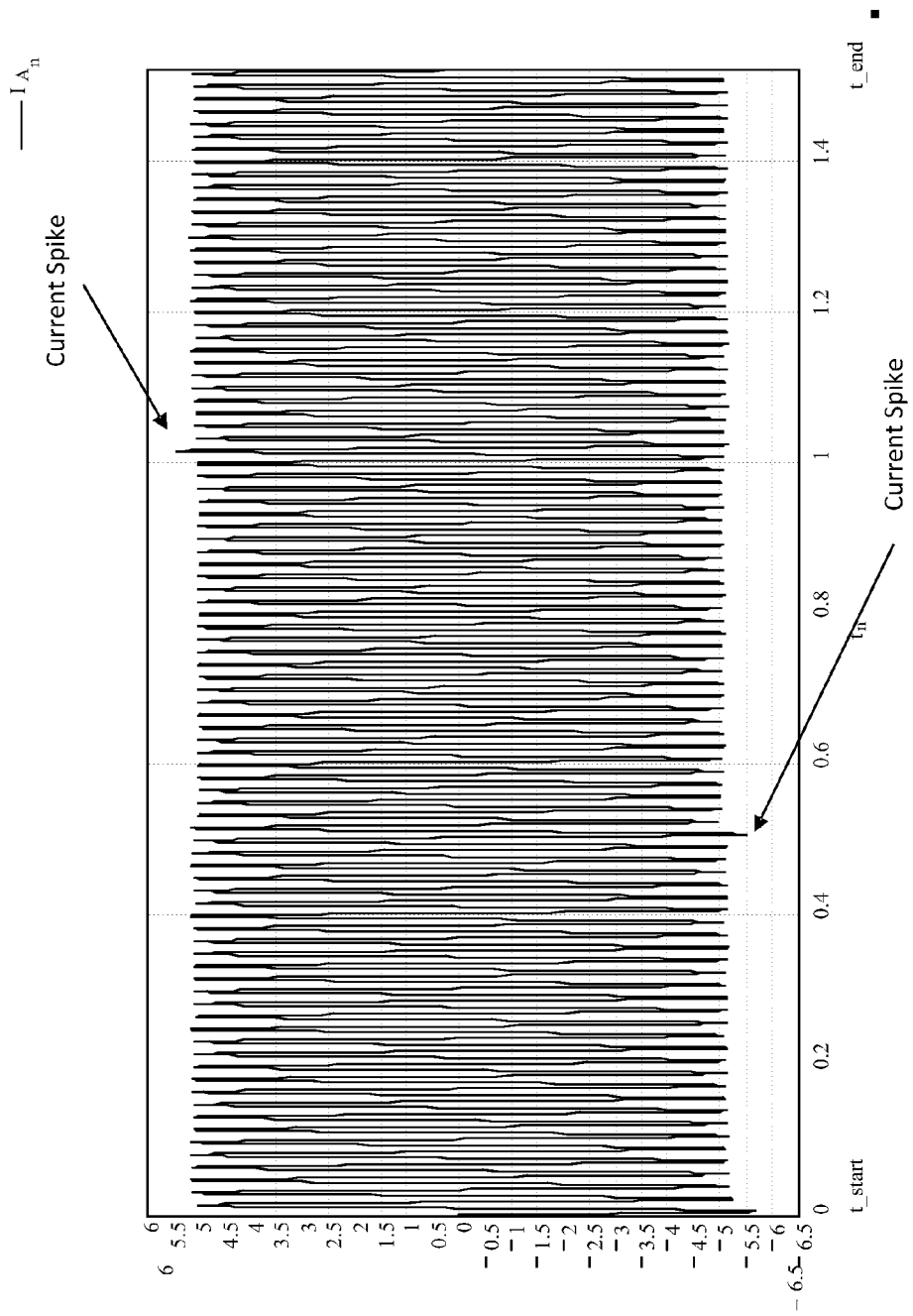
FIG. 27b illustrates the phase A current during block switching.
Figure 27C:
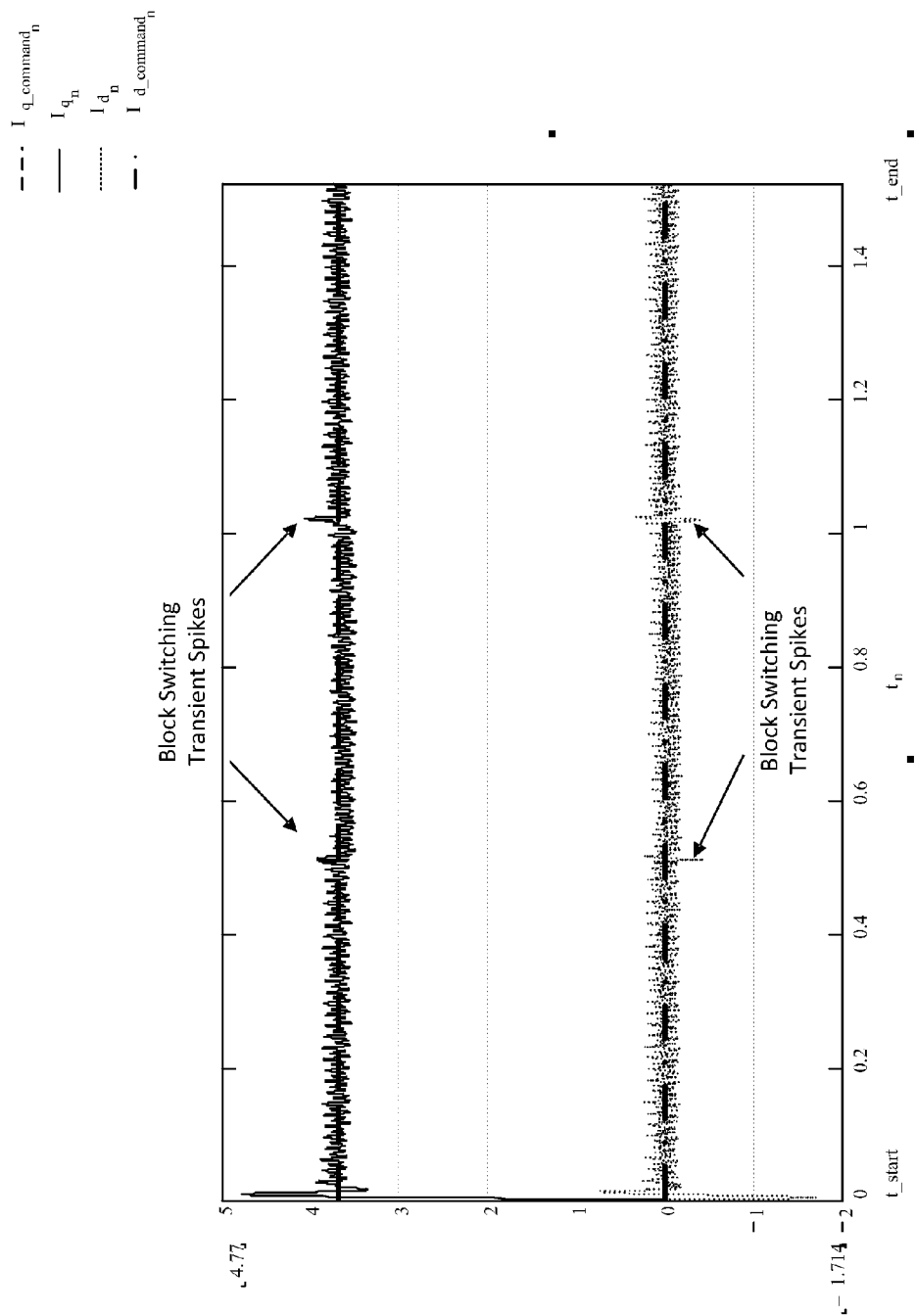
FIG. 27c illustrates the Id and Iq currents during block switching showing large transient spikes under open loop voltage operation.
Figure 27D:
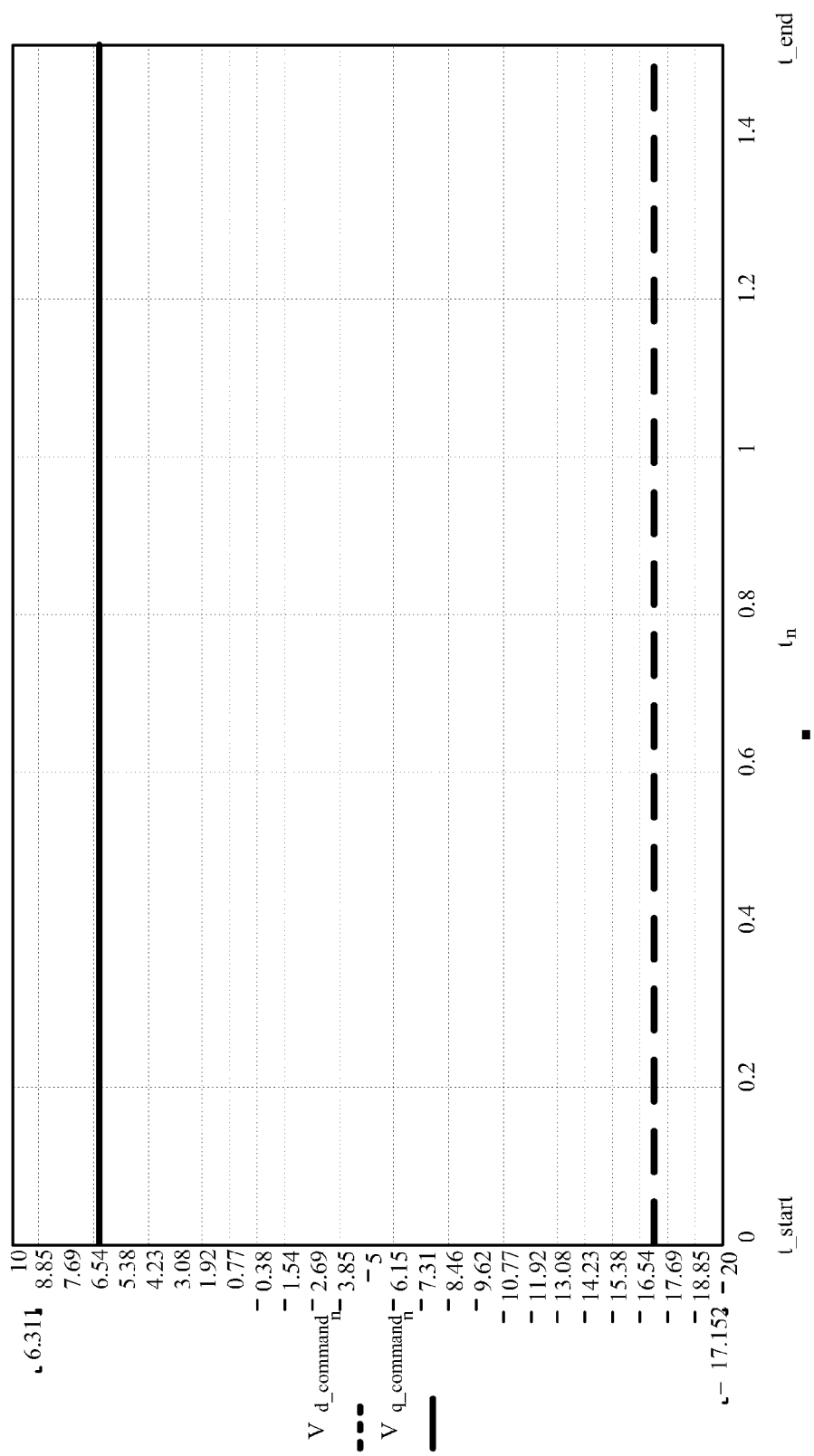
FIG. 27d illustrates the Vdc and Vqc voltages during block switching showing no transient response under open loop voltage operation.

Under open loop conditions, Vdc=Vd* and Vqc=Vq*. FIG. 27a shows the voltage waveforms Vabc for Vd*=−17.2 and Vq*=6.3. They are sine waves with no distortion. Block switching events occur at half second intervals, at t=0.5, 1.0, and 1.5 seconds. The block switching has no effect on the voltage waveforms. FIG. 27b shows the phase A current. A current spike can be seen at t=0.5 and t=1.0. FIG. 27c shows the resulting dq currents. The current spikes are due to the block switching and would cause torque or force transients in the systems. FIG. 27d shows that Vdc and Vqc do not respond and are constant during switching.

5.3 Block Switching with Vector Current Control

Figure 28A:
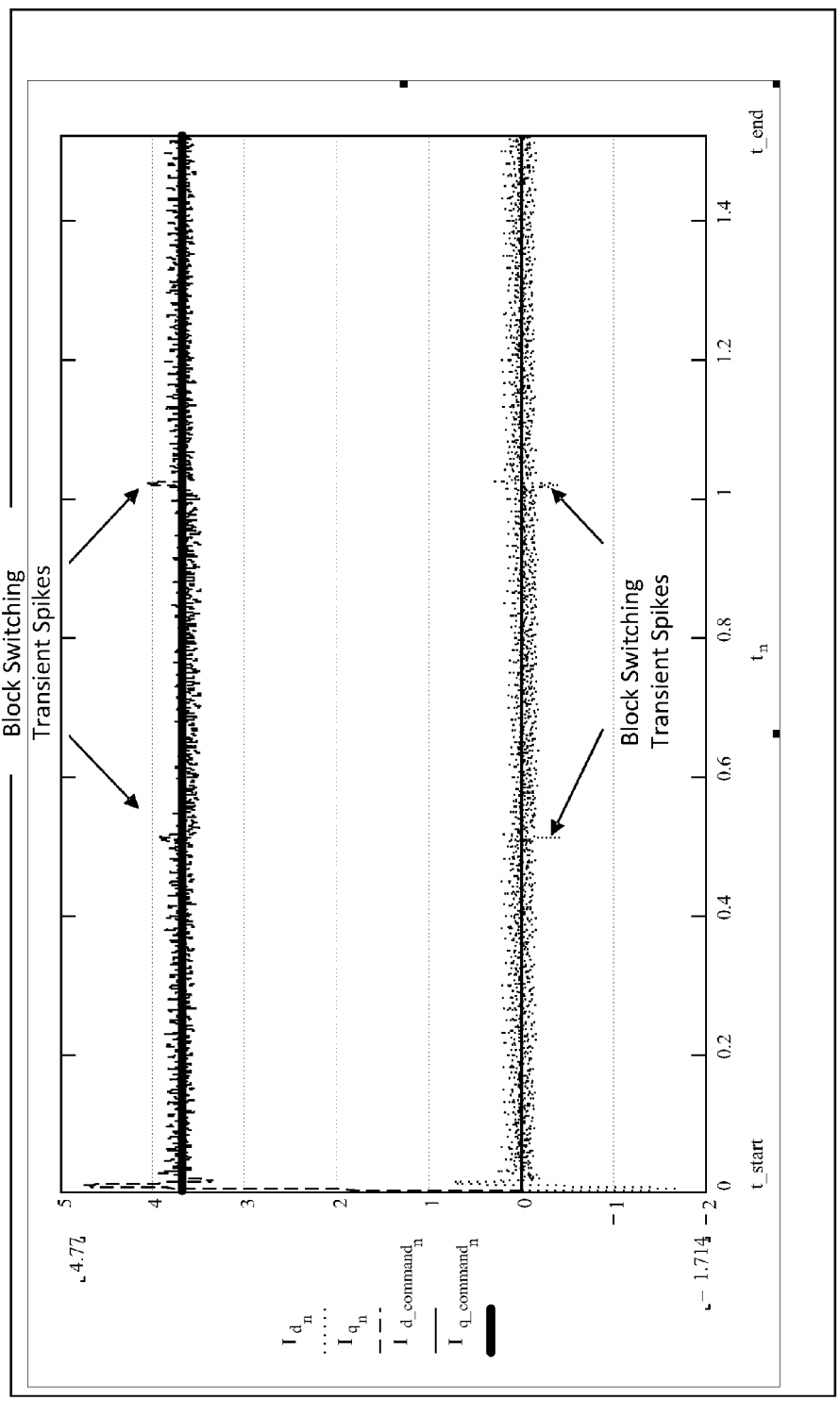
FIG. 28a illustrates the Id and Iq currents during block switching showing reduced transient spikes under closed loop vector current control operation.
Figure 28B:
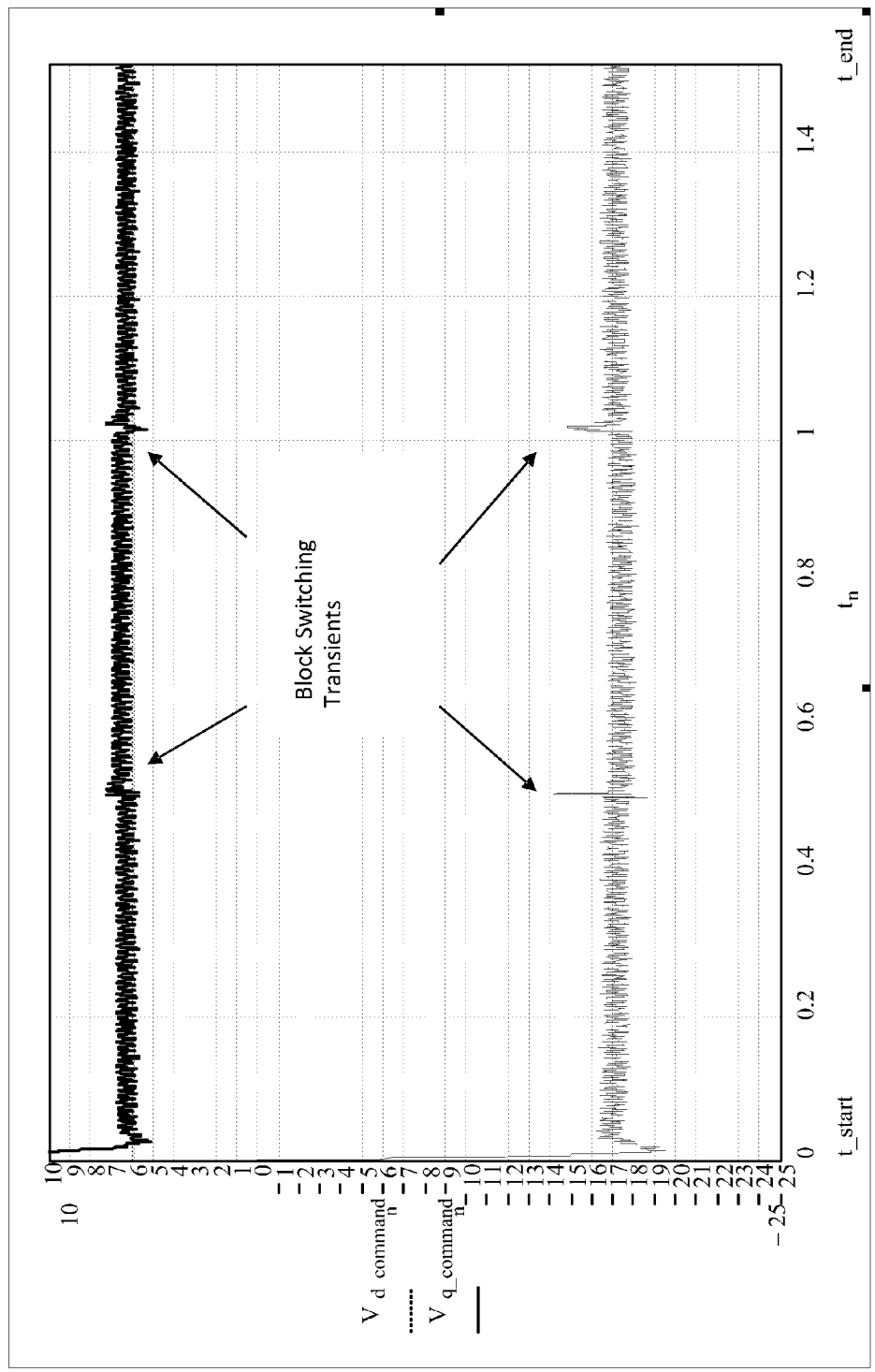
FIG. 28b illustrates the Vd and Vq voltages during block switching transients showing compensating spikes under closed loop vector current control operation.

In this section, the vector current controller is activated. In this example, the commanded currents are id*=0 and iq*=3.7. These result in nominal voltage commands from the controller of Vd=−17.2 and Vq=6.3. The controller sampling period is 150 microseconds. FIG. 28a shows the dq currents. In comparing with FIG. 27c, it can be seen that the current spikes, and hence the torque transients, have been reduced. FIG. 28b shows that the trade off in smoother currents is noisier voltages Vd and Vq. The controller takes more aggressive action with the voltages in order to compensate for any remaining block switching transients. This is not a substitute for proper per phase switching of the currents, however, since very aggressive voltages can lead to dv/dt problems. It also requires higher bandwidth current control. But, torque transients are caused by transients in current so moving the block switching transients from the currents to the voltages is preferred. FIG. 28b also shows that the controller is compensating for impedance differences between the two motor blocks. Notice that the average Vq is slightly larger during 0.5<t<1.0 seconds when the second motor block is engaged.

5.4 Block Switching and High Bandwidth Vector Current Control with Delay State Compensation Increasing the bandwidth of the vector current controller would allow the controller to compensate block switching transients more quickly and therefore further reduce any remaining current transients. However, there is an upper limit on the bandwidth that can be achieved for a given controller sampling rate. As the controller bandwidth is increased, phase lag due to sampling acts to destabilize the system. However, according to the teachings of the present invention, a delay state compensation component is developed and applied to the vector current controller in order to increase its ability to compensate for block switching transients and optimize LIM performance.

In the following tests, the controller sample period has been increased from 150 microseconds used in Section 5.3 to 500 microseconds in this section. This is more representative of the present EMALS system. The sample period used is based on the complexity of the processor's calculations and the system hardware.

Figure 29:
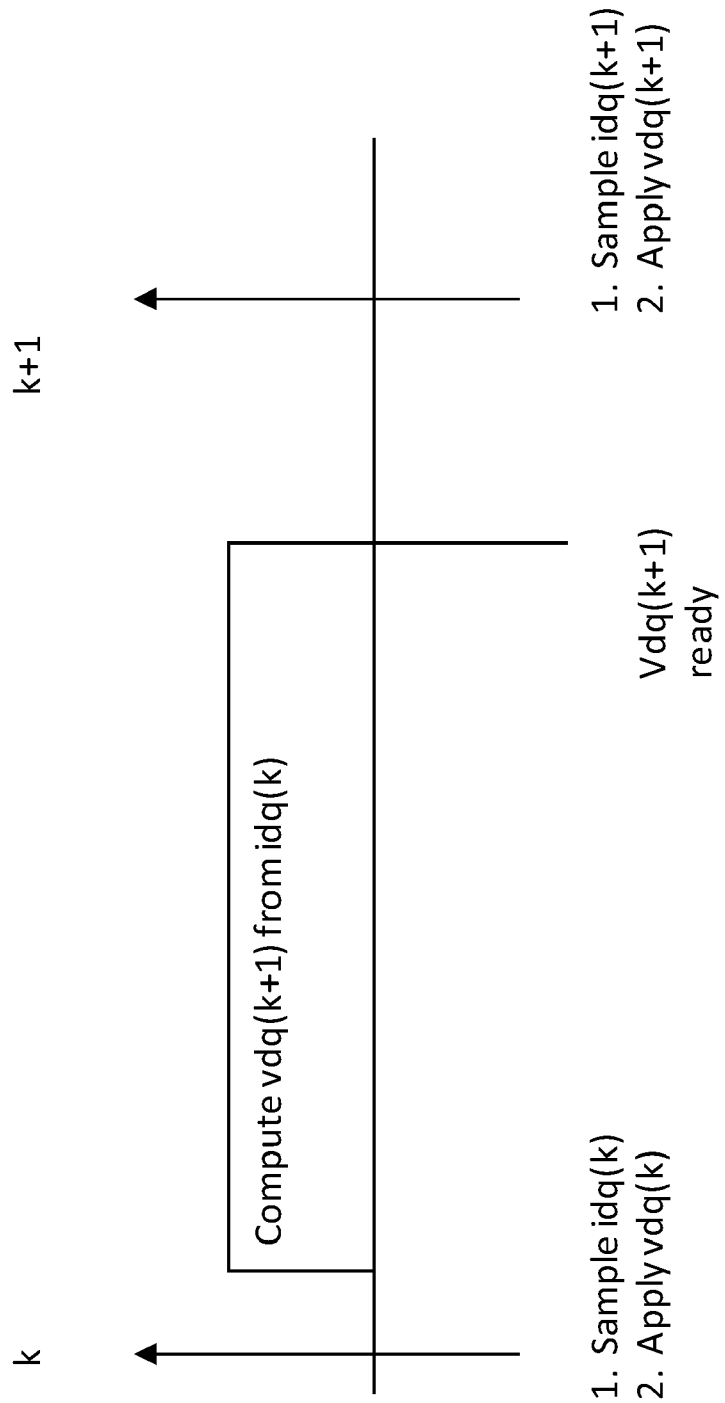
FIG. 29 illustrates the event timing during the controller's sample period.
Figure 30:
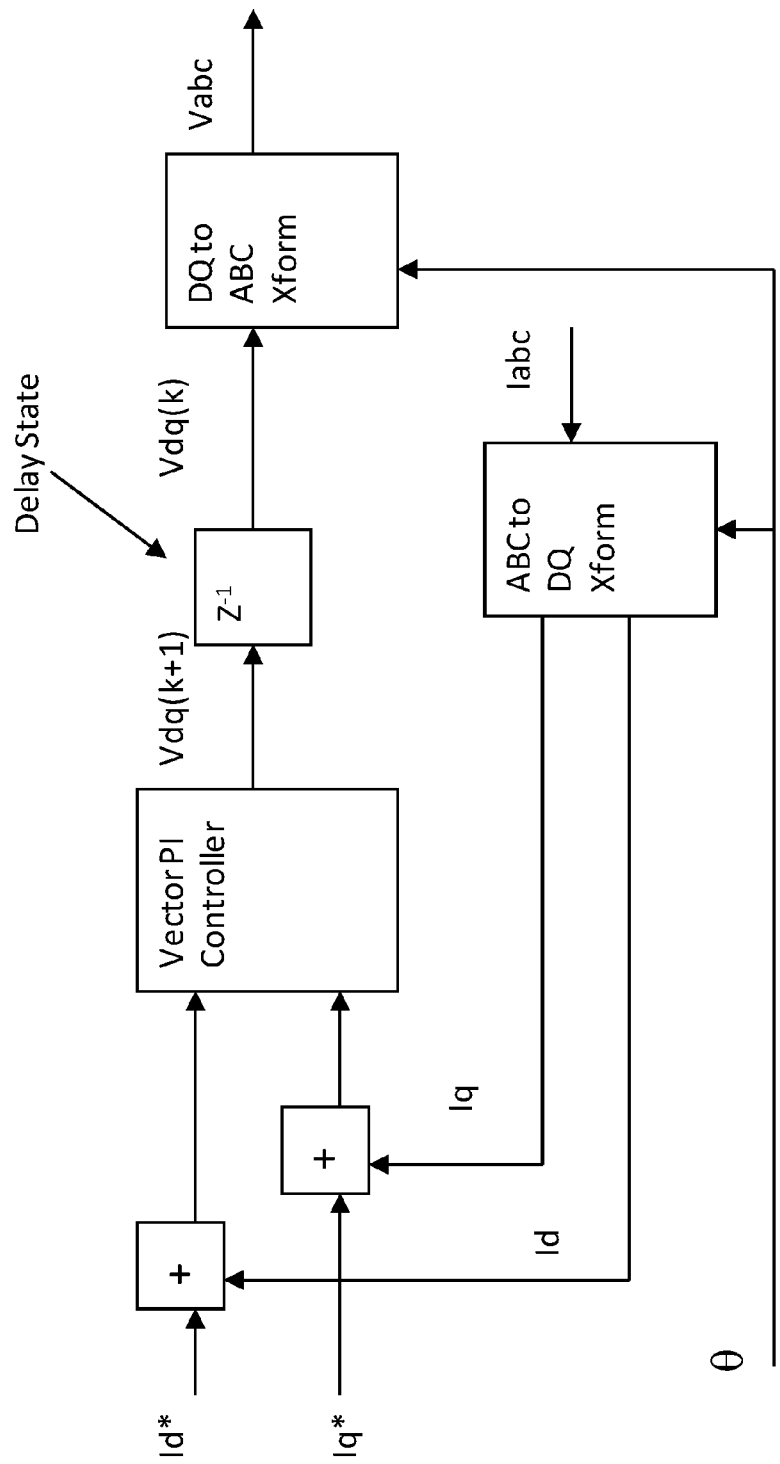
FIG. 30 illustrates the vector current controller with explicit delay state.

FIG. 29 shows the event timing during a controller's sample period. The currents are sampled at time k and the voltages for that period are also output exactly at time k. Next, the controller computes the voltages Vdq(k+1) based on the currents sampled at time k. These voltages are held until the interrupt at time k+1. At that time, the currents are sampled, giving iq(k+1), and the previously calculated voltages, Vdq (k+1) are output. This give precise sampling and voltage application synchronized to the sampling period interrupts. However, notice that the output voltage intended for a particular sampling period are actually calculated based on the currents from the previous sampling period. This actually introduces an output delay state in the controller that is often ignored in the design of the controller. However, this delay works to limit the bandwidth of the controller that can be achieved for stable operation. The effective controller block diagram from FIG. 26 is refined in FIG. 30 to explicitly show the delay state. In FIG. 30, the $P_I$ controller blocks have been collapsed into a single block and the switches have been removed for clarity.

Figure 31:
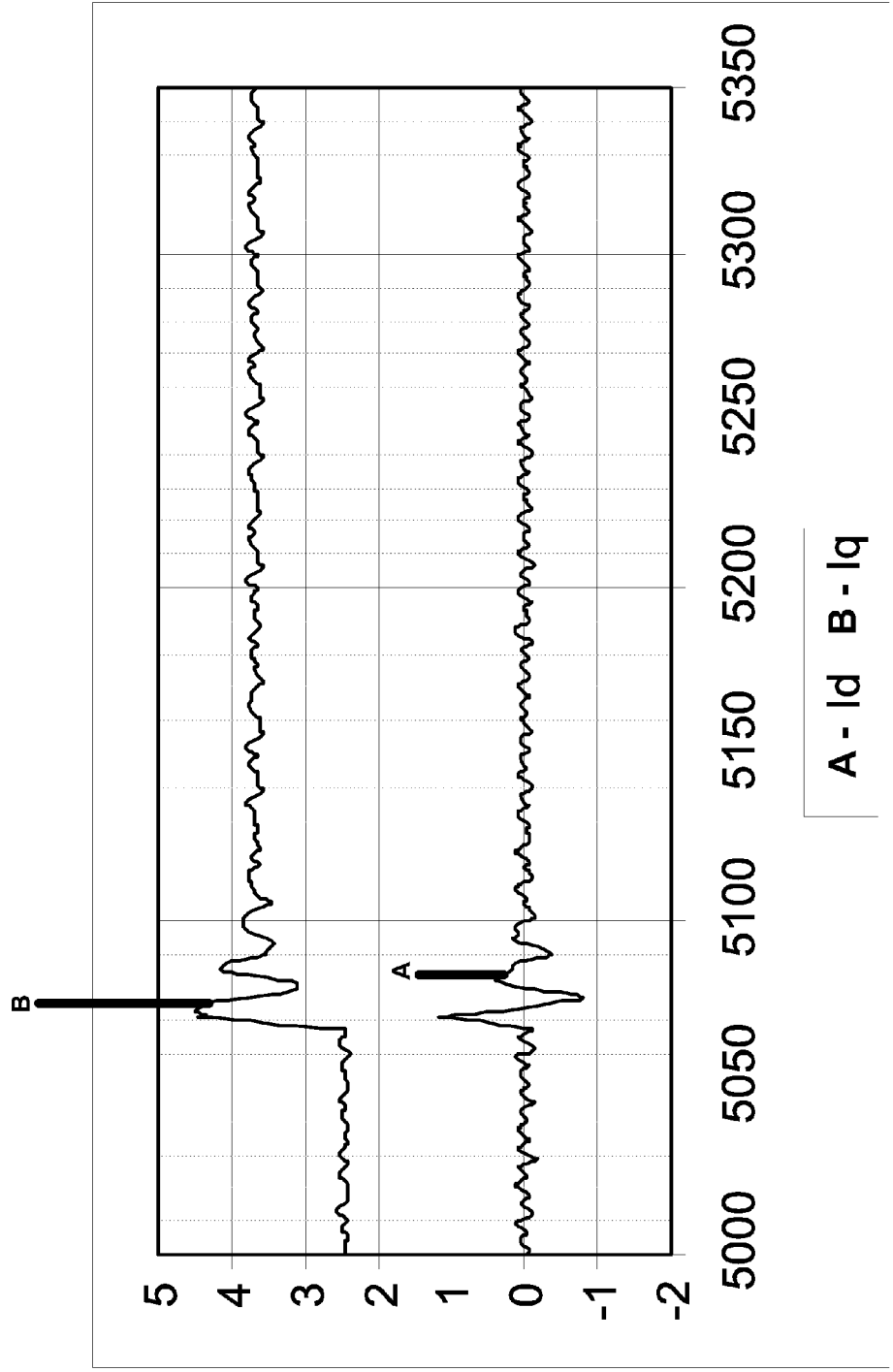
FIG. 31 illustrates the oscillatory behavior in Iq step response with gains increased for 3× bandwidth and no delay state compensation.
Figure 32:
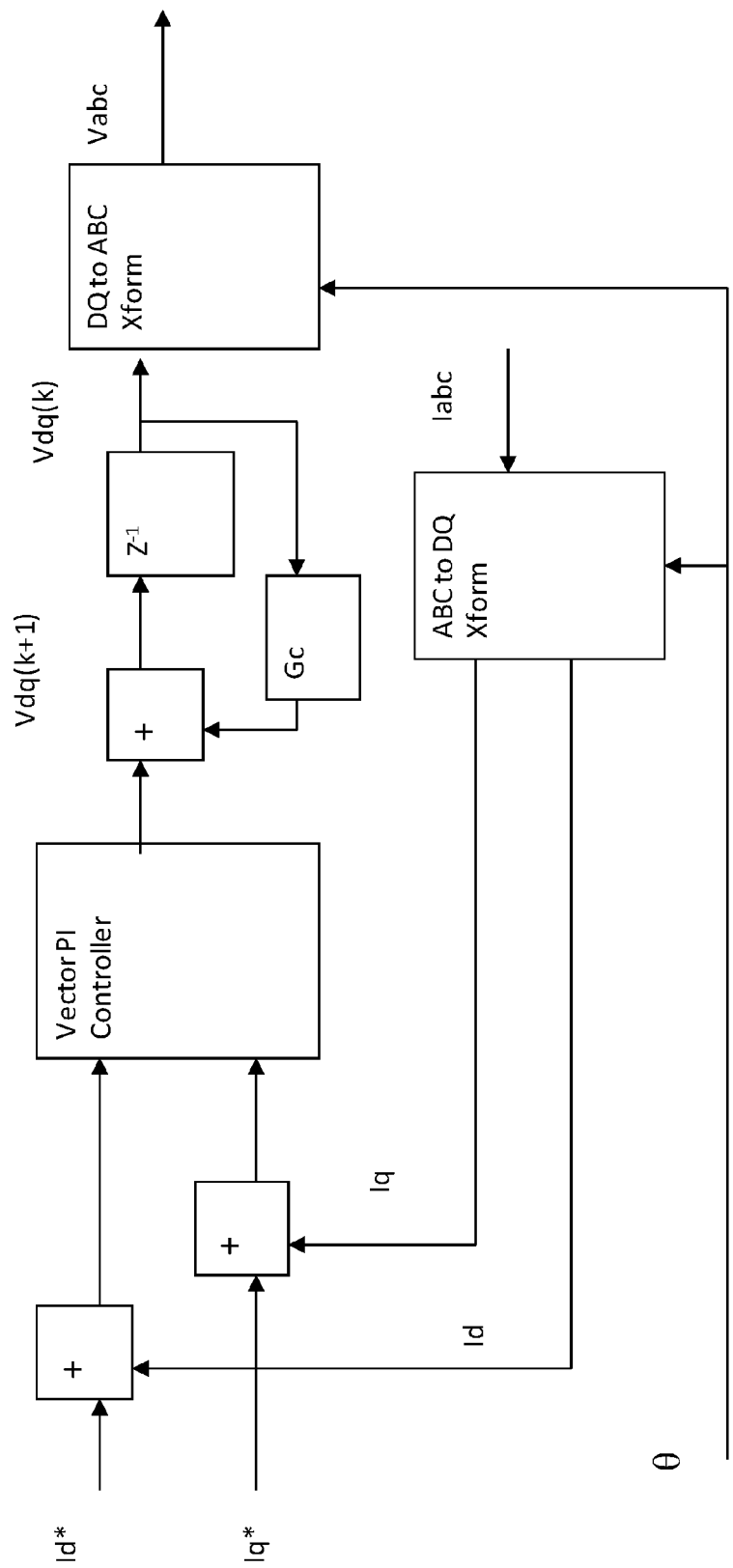
FIG. 32 illustrates the vector current controller with explicit delay state feedback compensation.
Figure 33:
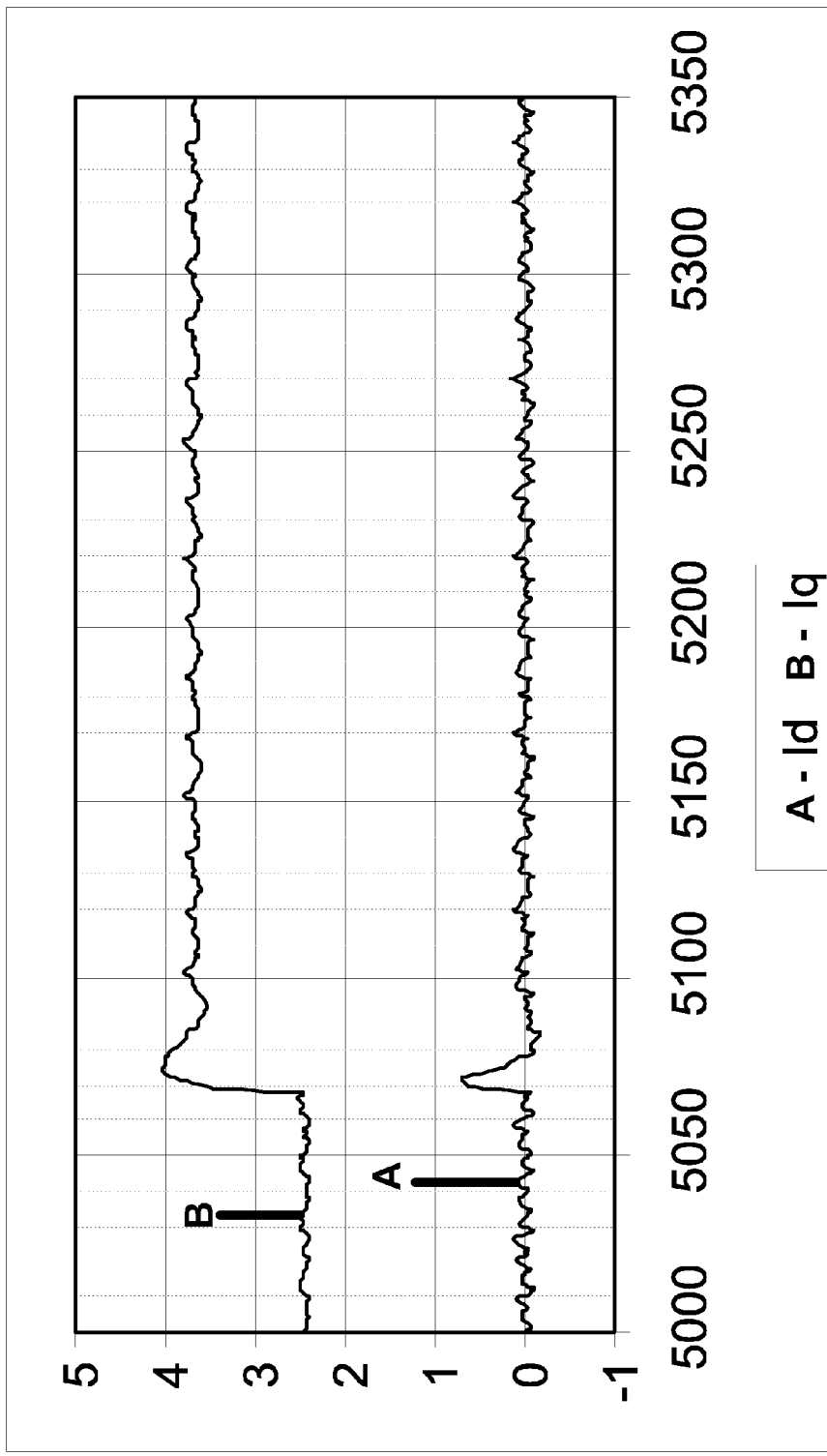
FIG. 33 illustrates the Iq step response with gains increased for 3× bandwidth and with delay state compensation to remove oscillatory modes.

The effect of the delay state on a current step response as the gains are increased is shown in FIG. 31. In this experiment, the gains are increased to achieve 3× the original bandwidth with a sampling period of 500 microseconds. The current step response begins to show oscillation. Further increase in gains will soon lead to instability. Even at this level of gains, the oscillatory behavior on the currents is not desirable since it actually injects additional disturbances into the system. Although the delay state is a virtual state in the controller, it is possible to place a feedback gain around that state and stabilize it. FIG. 32 shows the architecture that now includes a feedback gain Gc around the delay state. With this gain explicitly included in the control design, the added bandwidth can be achieved for the same sampling rate. FIG. 33 shows the step response of the system with 3× bandwidth and delay state compensations. Notice that the oscillations have been removed. With the increased bandwidth of the controller and the removal of its oscillatory modes, further improvement in block switching transient mitigation can now be achieved.

Figure 34A:
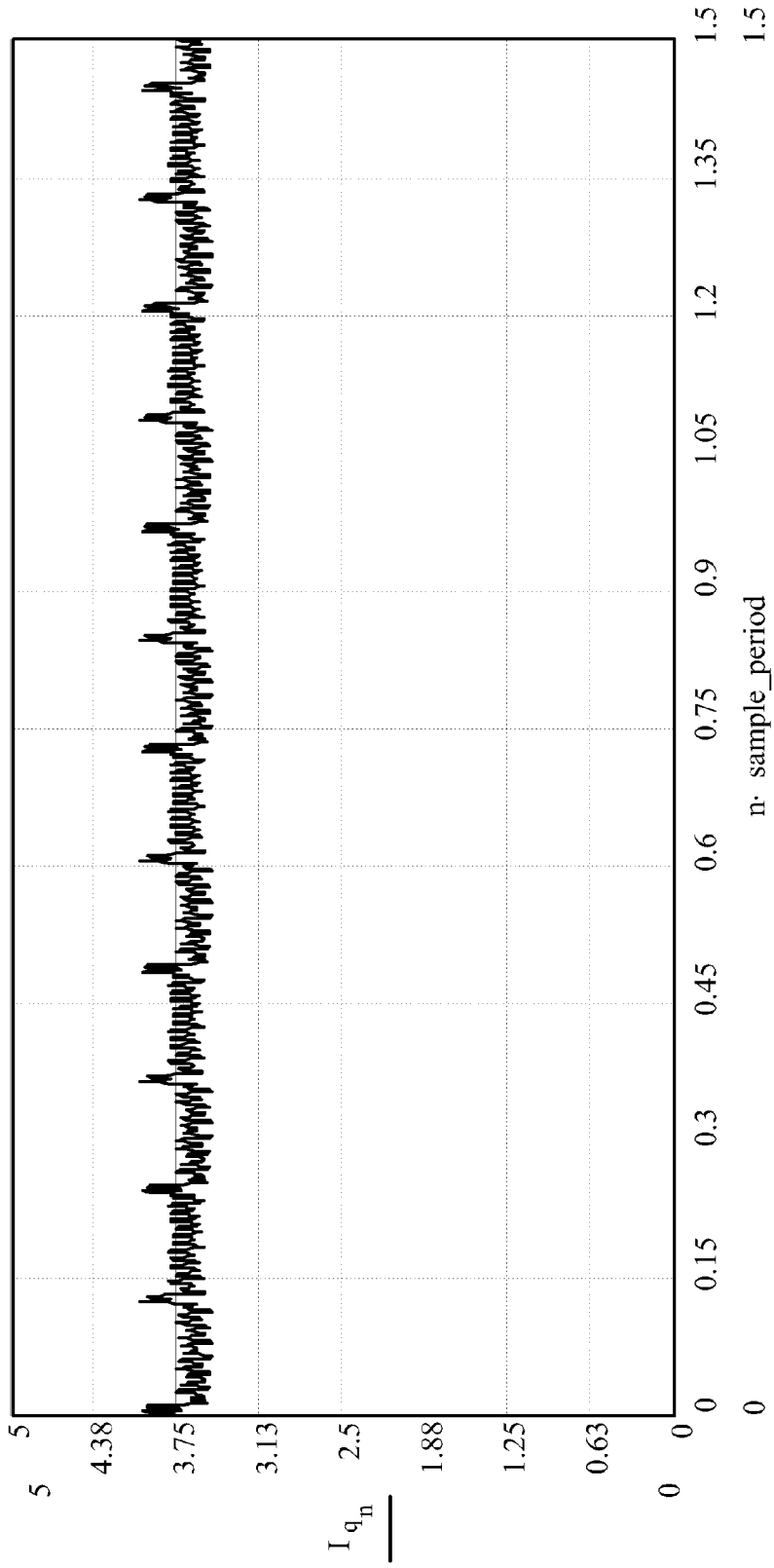
FIG. 34a illustrates open loop Iq with block switching.
Figure 34B:
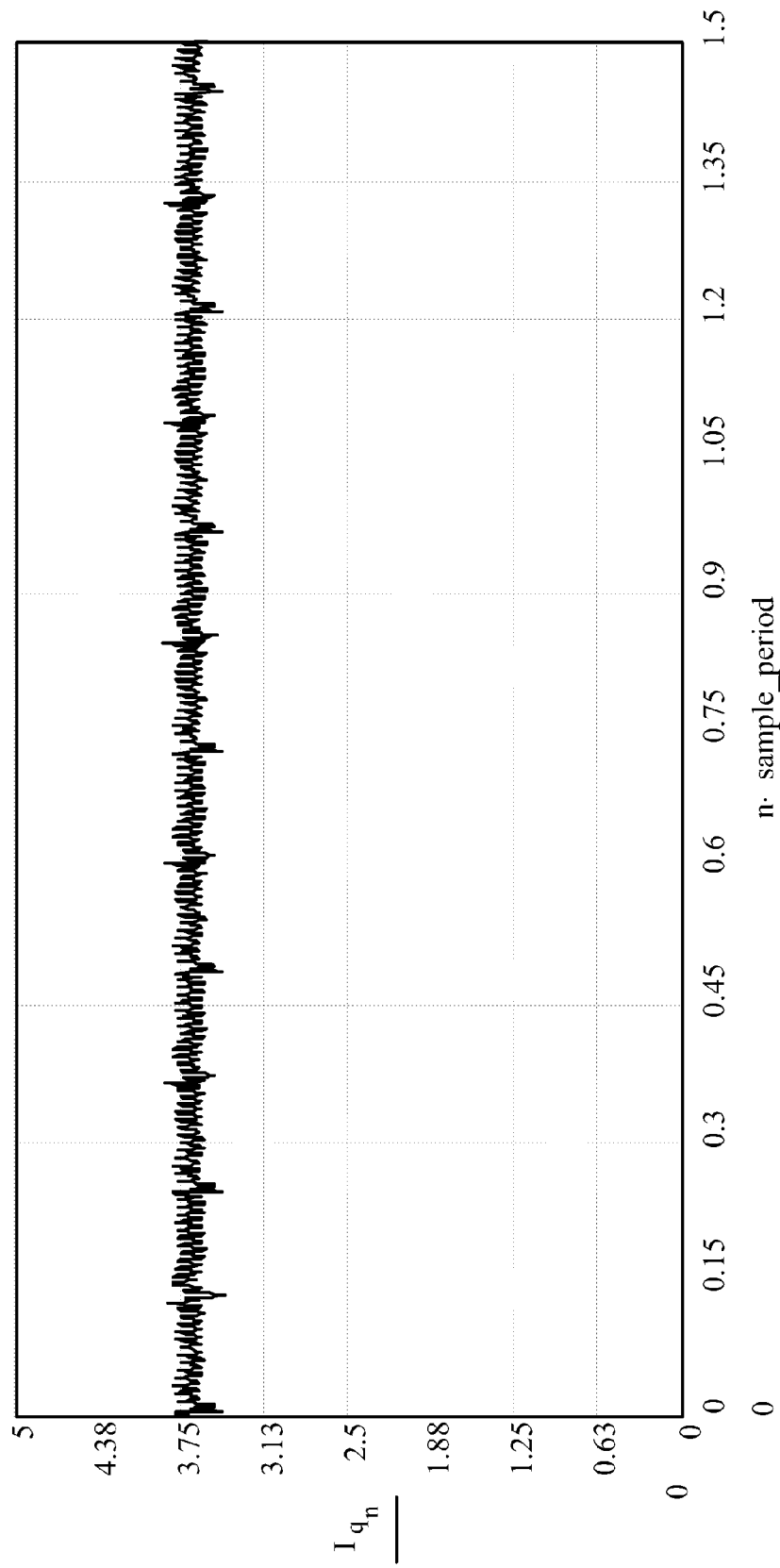
FIG. 34b illustrates closed loop Iq with 1× bandwidth vector control with block switching.
Figure 34C:
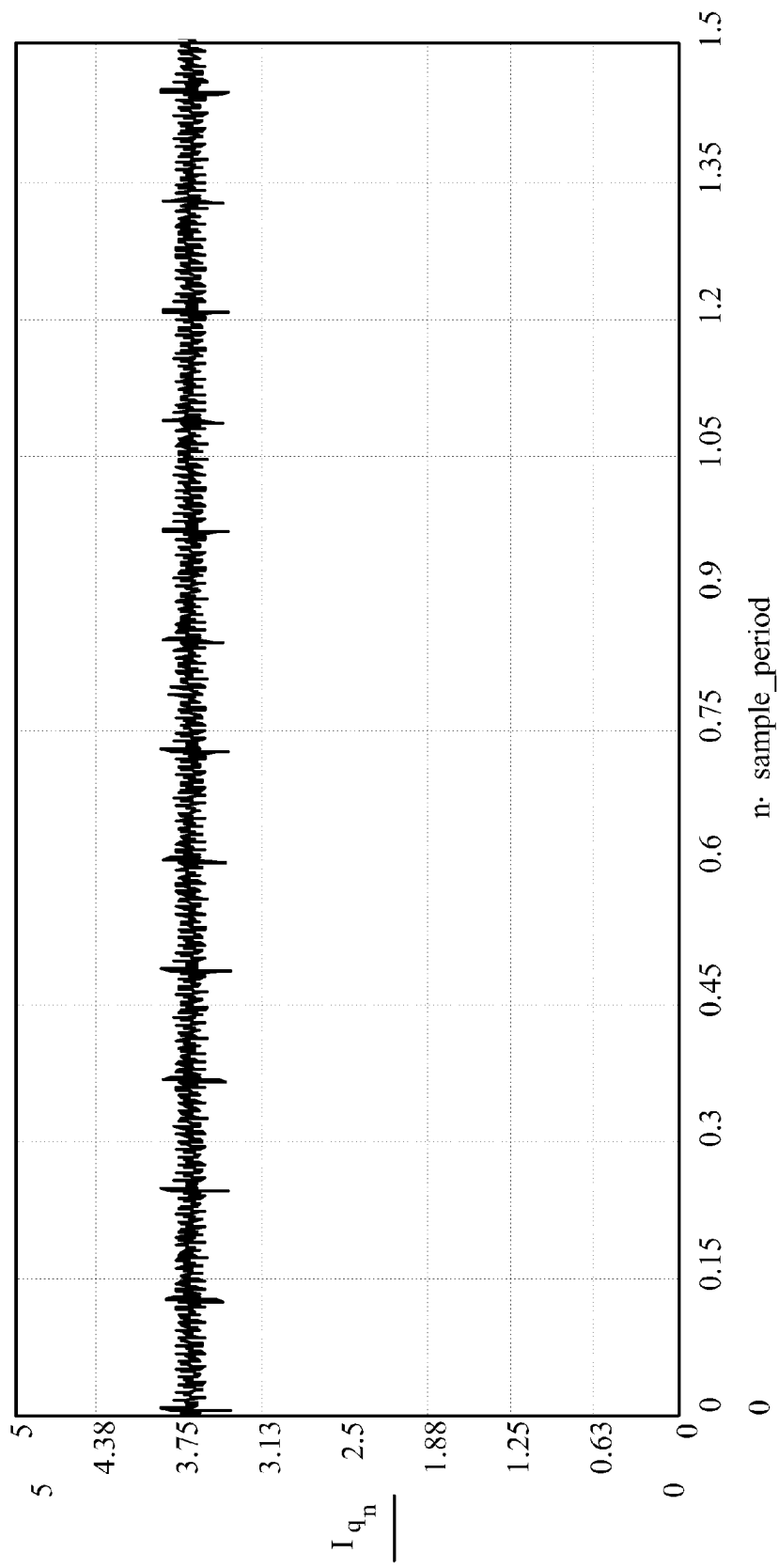
FIG. 34c illustrates closed loop Iq with 3× bandwidth vector current control with block switching and no delay state compensation.
Figure 34D:
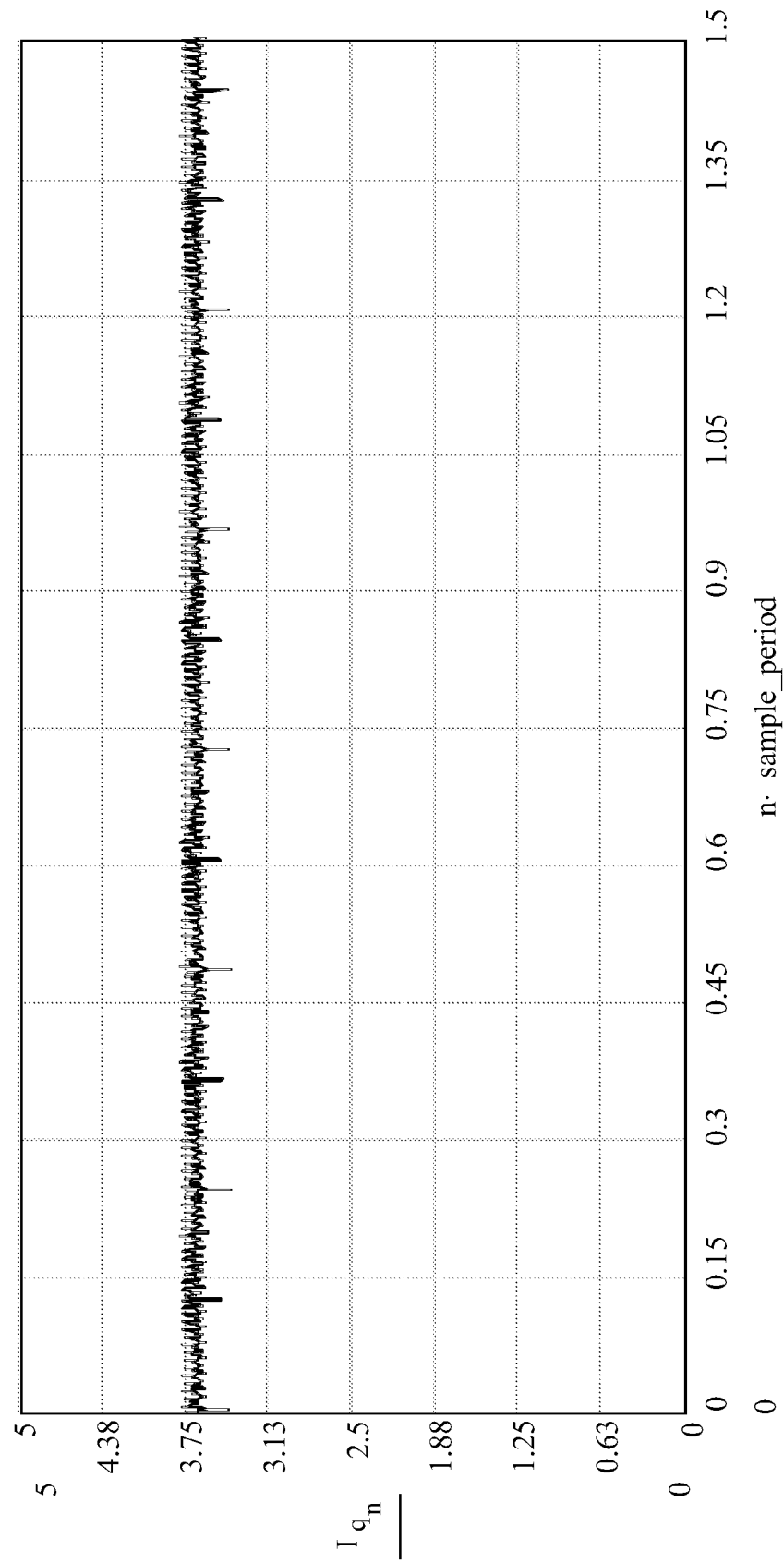
FIG. 34d illustrates closed loop Iq with 3× bandwidth vector current control with block switching and with delay state compensation.

The next set of figures show block switching transients on Iq for open loop in FIG. 34a, closed loop with 1× bandwidth in FIG. 34b, closed loop with 3× bandwidth and no delay compensation in FIG. 34c, and closed loop with 3× bandwidth and delay compensation in FIG. 34d. Notice by comparing FIG. 34b with 34c that the response with 3× bandwidth is actually worse than 1× bandwidth if no delay compensation is used. The best case is closed loop 3× bandwidth with delay compensation.

Figure 35:
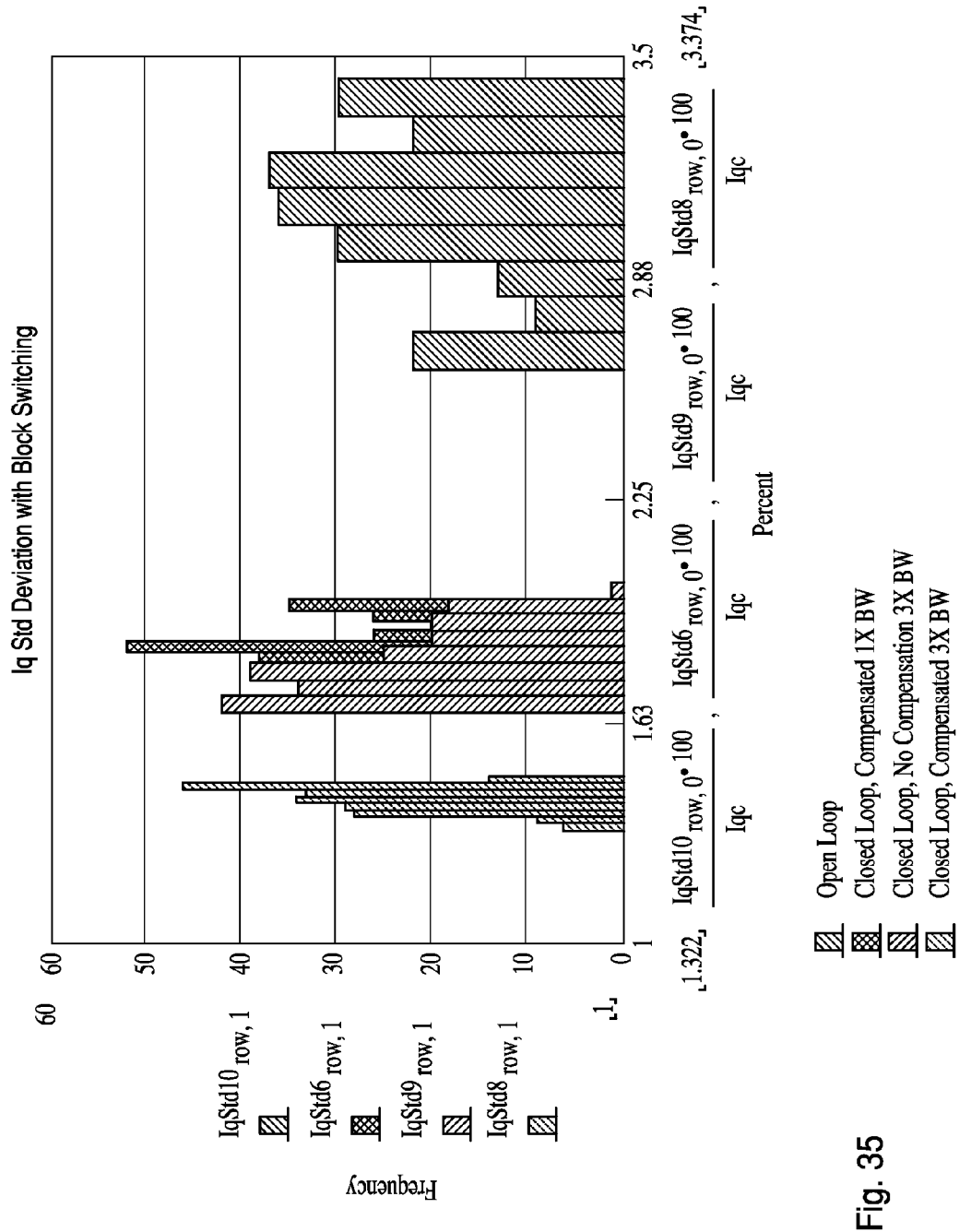
FIG. 35 shows a histogram of the standard deviation of Iq for different controllers during block switching events.

Because the level of distortion due to the block switching is not exactly the same each time a block switching event is encountered, it is appropriate to quantify the performance using a statistical analysis. The block switching commutation event was repeated 200 times and a window of data was collected around each event. The events were grouped together to form a sample set for data analysis. The standard deviation of Iq was calculated and a histogram was generated as shown in FIG. 35. Percent deviation from the mean (commanded) iq is along the horizontal axis and frequency of occurrence is along the vertical axis. This illustrates the frequency of occurrence of different standard deviations, shown for the blocked switched system under open loop, closed loop 1× bandwidth with delay state compensation, closed loop 3× bandwidth with no delay state compensation, and closed loop 3× bandwidth with delay compensation. The tighter spread along the horizontal axis indicates less variation in Iq, the value along the horizontal axis is the percent variation, while the vertical amplitude shows the frequency of occurrence. FIG. 35 shows that tighter variation in Iq and a lower standard deviation occurs for the closed loop 3× bandwidth with delay state compensation. Notice that the 3× bandwidth controller but without delay state compensation is only slightly better than the 1× controller.

Figure 36:
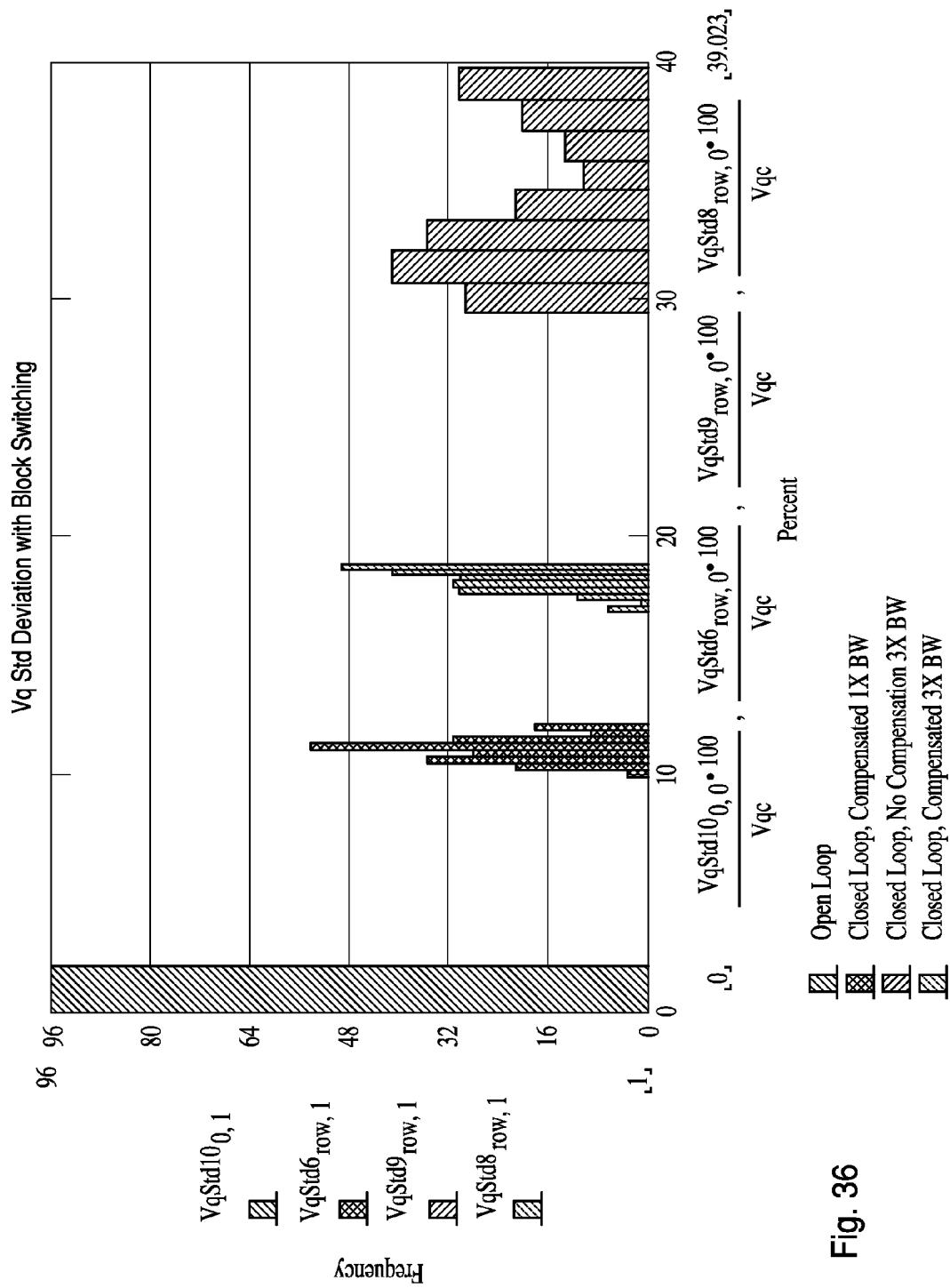
FIG. 36 shows a histogram of standard deviation of Vq for different controllers during block switching events.

Similarly, FIG. 36 shows the standard deviation histogram for the corresponding Vq. Notice that the closed loop with delay state compensation and 3× bandwidth has a high standard deviation because the Vq is more aggressive in order to reduce the transients in Iq. As before, variation in Vq is being traded off against variation in Iq. However, it is interesting to note that, without delay state compensation, the 3× bandwidth system gives a poorer performance in the standard deviation of Iq while generating more noise and a higher standard deviation in Vq, even higher than the 3× bandwidth when the delay compensation is used. The value of proper delay compensation is clearly visible. Examining the two 3× bandwidth cases, the controller without the delay state compensation actually generates more aggressive voltages but still gives poorer performance on the currents than the same controller with delay state compensation.

CONCLUSION

A system and method has been shown in the above embodiments for the effective implementation of a system and method for block switching transient minimization for linear motors and inductive loads. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

Additionally, the present invention provides for an article of manufacture comprising computer readable program code contained within implementing one or more modules to create a computer model of a system, the system comprising at least a linear motor and a block switching controller. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) generating a model of the system, the model having a plurality of sub-models, the plurality of sub-models comprising at least a sub-model of the linear motor and a sub-model of the block switching controller; (b) inserting at least one simulation artifact into the system model between two sub-models, the simulation artifact creating a virtual voltage state; and (c) simulating the operation of the system using the generated model.

The invention claimed is:

1. A block switch controller for a linear motor, the linear motor comprising a plurality of motor blocks, a shuttle which is propelled by the magnetic forces generated by a motor current passing through the motor blocks, a plurality of motor block switches selectively passing the motor current through the motor blocks, and a plurality of position sensors determining the position of the shuttle relative to the motor blocks, the controller comprising:
   a. a memory storing a motor current threshold profile, the motor current threshold profile providing for variable current detection thresholds;
   b. a communications interface that enables external communication;
   c. a processing core controlling the plurality of motor block switches, the processing core comparing a measurement of the motor current against the motor current threshold profile stored in memory to determine an effective zero crossing point of the motor current, and
      the processing core controlling the plurality of motor block switches based on the determined effective zero crossing point of the motor current and shuttle position information obtained from the position sensors.

2. The block switch controller of claim 1, wherein the variable current detection thresholds of the motor current threshold profile are developed from design data of the linear motor and a graph of current detection thresholds as a function of frequency for a specified current overshoot, and an expected current amplitude and frequency profile over a stroke of the linear motor.

3. The block switch controller of claim 2, wherein the graph maps a peak overshoot as a function of an angular deviation from the motor current's zero crossing points for a family of motor current frequencies.

4. The block switch controller of claim 2, wherein the graph maps a maximum angular deviation from the motor current's zero crossing point for a given maximum percent overshoot as a function of the motor current's frequency.

5. The block switch controller of claim 2, wherein the graph maps a maximum symmetrical deviation from the motor current's zero crossing point for a given maximum percent overshoot as a function of the motor current's frequency.

6. The block switch controller of claim 2, wherein the graph maps motor current detection thresholds needed as a function of the motor current's frequency in order to keep the motor current's peak overshoot below a predetermined percentage.

7. The block switch controller of claim 2, wherein the graph maps a maximum sampling period as a function of the motor current's frequency, wherein the maximum sampling period is used to ensure that the motor current's peak overshoot is within predetermined limits.

8. The block switch controller of claim 2, wherein the graph maps a maximum delay as a function of the motor's current frequency, wherein the maximum delay is used to ensure that the motor current's peak overshoot is within predetermined limits.

9. The block switch controller of claim 2, wherein the motor current threshold profile enables the processing core to synchronize activation of a motor block switch of an uncovered motor block leading the shuttle and deactivation of a motor block switch of a motor block trailing the shuttle with the zero crossing point of the motor current.

10. The block switch controller of claim 9, wherein the motor current threshold profile comprises two pairs of motor current thresholds, the first pair of motor current thresholds being of positive current values defining a zero crossing point detection and switching region for a negative going motor current that is greater than zero and the second pair of motor current thresholds being of negative current values defining a zero crossing point detection and switching region for a positive going motor current that is less than zero.

11. The block switch controller of claim 9, wherein the motor current threshold profile comprises a single pair of motor current thresholds that define a motor current detection and switching region, wherein a zero crossing pulse is provided to a synchronization circuit when the motor current enters the motor current detection and switching region.

12. The block switch controller of claim 11, wherein the zero crossing pulse comprises a signal that goes from low to high when the motor current enters the motor current detection and switching region and goes from high to low when the motor current exits the motor current detection and switching region, and the synchronization circuit comprises a positive edge triggered flip flop.

13. The block switch controller of claim 11, wherein the zero crossing pulse comprises a single that goes from high to low when the motor current enters the motor current detection and switching region and goes from low to high when the motor current exits the motor current detection and switching region, and the synchronization circuit comprises a negative edge triggered flip flop.

14. The block switch controller of claim 9, wherein the motor current comprises one or more current phases that are detected and switched independently, with switching for each phase occurring at the zero crossing point for that phase.

15. The block switch controller of claim 2, wherein the block switch controller is part of an electromagnetic aircraft launch system.

16. The block switch controller of claim 2, wherein the block switch controller comprises a closed loop vector controller that incorporates a delay state having a feedback gain.

17. A method of controlling a plurality of motor block switches in a linear motor with a block switch controller, the linear motor comprising a plurality of motor blocks, a motor current, a shuttle which is propelled by the magnetic forces generated when the motor current is passed through the motor blocks, a plurality of motor block switches which selectively pass the motor current through the motor blocks, and a plurality of position sensors which determine the position of the shuttle relative to the motor blocks, the block switch controller executing the following steps:
  a. receiving a measurement of the motor current and position data indicating the position of the shuttle;
  b. retrieving a motor current threshold profile from memory, the motor current threshold profile providing for variable current detection thresholds;
  c. comparing the received motor current measurement with the retrieved motor current threshold profile to determine an effective zero crossing point of the motor current; and
  d. controlling the plurality of block switches based on the determined effective zero crossing point of the motor current and the received shuttle position data.

18. The method of claim 17, wherein the variable current detection thresholds of the motor current threshold profile are developed from design data of the linear motor and a graph of current detection thresholds as a function of frequency for a specified current overshoot, and an expected current amplitude and frequency profile over a stroke of the linear motor.

19. The method of claim 18, wherein the motor current comprises one or more current phases wherein each of the steps a though d are executed independently for each phase of the motor current.

* * * * *

UNITED STATES PATENT AND TRADEMARK OFFICE
CERTIFICATE OF CORRECTION

| | | |
|---|---|---|
| PATENT NO. | : 7,969,103 B2 | |
| APPLICATION NO. | : 12/120531 | |
| DATED | : June 28, 2011 | |
| INVENTOR(S) | : Raymond B. Sepe, Jr. | |

It is certified that error appears in the above-identified patent and that said Letters Patent is hereby corrected as shown below:

Col. 22, line 58, delete "single" and insert --signal--.

Signed and Sealed this
Twentieth Day of December, 2011

David J. Kappos
*Director of the United States Patent and Trademark Office*